United States Patent
Clark et al.

(10) Patent No.: US 11,317,480 B2
(45) Date of Patent: *Apr. 26, 2022

(54) SMART PACKAGING, SYSTEMS AND METHODS

(71) Applicant: Inductive Intelligence, LLC, Grand Rapids, MI (US)

(72) Inventors: Gregory L. Clark, Ada, MI (US); David W. Baarman, Fennville, MI (US)

(73) Assignee: Inductive Intelligence, LLC, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/591,698

(22) Filed: Oct. 3, 2019

(65) Prior Publication Data

US 2020/0053839 A1 Feb. 13, 2020

Related U.S. Application Data

(63) Continuation of application No. 15/939,236, filed on Mar. 28, 2018, now Pat. No. 10,477,627.

(Continued)

(51) Int. Cl.
*H05B 6/12* (2006.01)
*H05B 6/06* (2006.01)
(Continued)

(52) U.S. Cl.
CPC .......... *H05B 6/065* (2013.01); *A47J 31/4492* (2013.01); *A47J 31/52* (2013.01);
(Continued)

(58) Field of Classification Search
CPC combination set(s) only.
See application file for complete search history.

(56) References Cited

U.S. PATENT DOCUMENTS

| 2,912,336 A | 11/1959 | Perino |
| 3,662,150 A | 5/1972 | Hartung |

(Continued)

FOREIGN PATENT DOCUMENTS

| EP | 1 193 584 | 12/2004 |
| EP | 2 528 415 | 11/2012 |

(Continued)

OTHER PUBLICATIONS

International Search Report and the Written Opinion of the International Searching Authority for International Application No. PCT/US2018/024961, dated Jun. 27, 2018, 9 pages.

(Continued)

*Primary Examiner* — Mazda Sabouri
(74) *Attorney, Agent, or Firm* — Warner Norcross + Judd LLP

(57) ABSTRACT

Various smart package configurations may include a package intelligence and communication module (PICM) intelligently interacting with smart heating appliances and users. A thermodynamic load profile may correlate thermodynamic response characteristics of the package and be stored in or associated with a unique identifier in the PICM. The TLP enables efficient and safe heating of packages on a smart appliance as well as package validation and authentication. Package configurations also include structural elements for efficient heating of food, beverage, cosmetic and personal care products.

18 Claims, 47 Drawing Sheets

Related U.S. Application Data

(60) Provisional application No. 62/478,000, filed on Mar. 28, 2017.

(51) Int. Cl.

| | | |
|---|---|---|
| *A47J 36/02* | (2006.01) | |
| *A47J 31/52* | (2006.01) | |
| *A47J 31/44* | (2006.01) | |
| *A47J 36/32* | (2006.01) | |
| *H04M 1/72412* | (2021.01) | |
| *A47J 36/24* | (2006.01) | |
| *G06K 7/10* | (2006.01) | |
| *G06K 19/077* | (2006.01) | |
| *G06K 7/14* | (2006.01) | |

(52) U.S. Cl.
 CPC ......... *A47J 36/027* (2013.01); *A47J 36/2466* (2013.01); *A47J 36/321* (2018.08); *G06K 7/10386* (2013.01); *G06K 19/07758* (2013.01); *H04M 1/72412* (2021.01); *H05B 6/1209* (2013.01); *A47J 36/2472* (2013.01); *G06K 7/1417* (2013.01)

(56) References Cited

U.S. PATENT DOCUMENTS

| | | | |
|---|---|---|---|
| 3,829,654 | A | 8/1974 | Eisler |
| 3,830,944 | A | 8/1974 | Dimitriadis |
| 6,028,293 | A | 2/2000 | Nagle et al. |
| 6,046,678 | A | 4/2000 | Wilk |
| 6,953,919 | B2 | 10/2005 | Clothier |
| 7,080,593 | B1 | 7/2006 | Frankel |
| 7,096,221 | B2 | 8/2006 | Nakano |
| 7,489,246 | B2 | 2/2009 | Himberger et al. |
| 9,027,840 | B2 | 5/2015 | Baarman et al. |
| 9,546,916 | B1 | 1/2017 | Crane et al. |
| 2002/0008632 | A1 | 1/2002 | Clothier |
| 2002/0157411 | A1 | 10/2002 | Ishikawa et al. |
| 2003/0006633 | A1 | 1/2003 | Clothier |
| 2006/0213904 | A1 | 9/2006 | Kates |
| 2008/0130520 | A1 | 6/2008 | Ebrom et al. |
| 2008/0174436 | A1 | 7/2008 | Landt et al. |
| 2009/0212919 | A1 | 8/2009 | Selgrath et al. |
| 2010/0000980 | A1 | 1/2010 | Popescu |
| 2010/0015313 | A1 | 1/2010 | Harris |
| 2010/0213187 | A1 | 8/2010 | Bandholz et al. |
| 2011/0022211 | A1 | 1/2011 | McIntyre et al. |
| 2011/0291806 | A1 | 12/2011 | Hoofman et al. |
| 2013/0214938 | A1 | 8/2013 | Kim et al. |
| 2014/0008355 | A1 | 1/2014 | Chaffey et al. |
| 2014/0033744 | A1 | 2/2014 | Kim |
| 2014/0295822 | A1 | 10/2014 | Koo et al. |
| 2014/0364972 | A1* | 12/2014 | Minville .......... G06Q 30/0207 700/90 |
| 2015/0046364 | A1 | 2/2015 | Kriss |
| 2015/0242660 | A1 | 8/2015 | Baarman et al. |
| 2015/0245421 | A1 | 8/2015 | Heczko |
| 2016/0196739 | A1 | 7/2016 | Naber et al. |
| 2016/0295640 | A1 | 10/2016 | De Samber |
| 2017/0013681 | A1 | 1/2017 | Lee et al. |
| 2018/0189626 | A1 | 7/2018 | Gila et al. |
| 2019/0104571 | A1 | 4/2019 | Clark et al. |
| 2019/0104572 | A1 | 4/2019 | Clark et al. |
| 2019/0250653 | A1 | 8/2019 | Conlon |
| 2020/0210948 | A1 | 7/2020 | Shanmugavelayudam et al. |

FOREIGN PATENT DOCUMENTS

| | | |
|---|---|---|
| EP | 2 709 035 | 3/2014 |
| JP | 2016-167279 | 9/2016 |
| WO | 2012/124084 | 9/2012 |

OTHER PUBLICATIONS

International Search Report and the Written Opinion of the International Searching Authority for International Application No. PCT/US2018/024975, dated Jun. 26, 2018, 9 pages.

\* cited by examiner

Heating & Safety Profile

Number of Steps 6   Ambient Starting Temp 70F   Altitude 1222   Popcorn 55.560KHz

| Steps | Command Function | Target Temp | | Material Probe Low | | Material Probe High | | Package Probe | | Time to Target | | Charge Surface Temp (End) | | Tag Temp (Target) | | Voltage | | Frequency | | Duty Cycle | Trajectory | Measured Power | |
|---|---|---|---|---|---|---|---|---|---|---|---|---|---|---|---|---|---|---|---|---|---|---|
| Step 1 | Test System | 90 | F | 94 | F | 75 | F | 82 | F | 5.5 | s | 86 | F | 90 | F | 165 | V | Test Seq | KHz | 50% | >->+> Target | 32 | W |
| Step 2 | Heat | 340 | F | 352 | F | 333 | F | 340 | F | 236 | s | 110 | F | 340 | F | 165 | V | 55.56 | KHz | 100% | > Target | 64.5 | W |
| Step 3 | Hold heat | 340 | F | 352 | F | 333 | F | 340 | F | 26 | s | 140 | F | 340 | F | 165 | V | 55.56 | KHz | 100% | Hold Target | 64.5 | W |
| Step 3 | Finish heat | 360 | F | 372 | F | 353 | F | 341 | F | 10 | s | 145 | F | 360 | F | 165 | V | 55.56 | KHz | 100% | < Next Target | 64.5 | W |
| Step 4 | Pause | 130 | F | 140 | F | 121 | F | 128 | F | 55 | s | 129 | F | 130 | F | 165 | V | 0 | KHz | 56% | Pause | 0 | W |
| Step 5 | Hold heat | 130 | F | 139 | F | 120 | F | 127 | F | 300 | s | 122 | F | 130 | F | 165 | V | 52.2 | KHz | 50% | Hold Target | 28.2 | W |
| Step 6 | Off | A | F | A | F | A | F | A | F | 0 | s | A | A | A | F | 165 | V | 0 | KHz | 0 | Off | 0 | W |
| | (1) | (9) | | (10) | | (11) | | (2) | | (3) | | (4) | | (5) | | (6) | | (7) | | (8) | | | |

Power Bases, Connected Essential Oil Diffusers, Connected-Heatable Packaging, Novelty Gifts and More.

SMART PACKAGING, SYSTEMS AND METHODS

BACKGROUND

1. Technical Field

The disclosure relates to smart or intelligent packages containing packaged contents. Such contents may include consumable products, such as food products, beverages, liquids or liquefiable materials, cosmetic products and personal care products. The terms "smart" or "intelligent" as used herein may refer to information storage, processing and communication features and capabilities that enhance operation and enable interfacing with users and with other devices, such as smartphones or external computers. The disclosure also relates to smart packaging, which may also include elements and features to support information storage, processing and communication. The disclosure also relates to smart appliances, systems and methods of operation for heating smart packages. Such appliances may include induction heating stoves, cooktops, cookers and ranges.

The disclosure also relates to devices, systems and methods for monitoring and controlling the heating experience of a package and/or its contents. Heating "experience" refers to the heating process undergone by a package and/or package contents during a heating operation. The disclosure also relates to control systems for ensuring that safety standards are adhered to during the heating process and that safety measures relating to post-heating consumption are followed (i.e., avoiding high temperature of food, beverages, cosmetics or personal care products that could injure a consumer). The disclosure further relates to systems for communicating and analyzing data and other information related to package heating and generated prior to use, during use and after use and or during heating.

The disclosure also relates to devices, systems and methods for validating the integrity of packages and packaged content, such as validating that a package is properly constructed and contains the proper amount of product, prior to or during a heating operation. The disclosure also relates to devices, systems and methods for authenticating packages and packaged content, such as ensuring that a package and packaged content are genuine and truly originate from a known source or provider.

2. Prior Art

Energy transfer and heating or cooking appliances, such as induction cooking appliances, are generally well known in the prior art. Such systems involve a heating element that transfers energy, typically by induction, to a receptor or cooking vessel which ultimately results in heating of package contents. Moreover, automated cooking systems and packaging systems that utilize energy transfer components, such as microwave popcorn packaging with an internal heating element, are generally known. However, known energy transfer appliances, systems, packaging systems and automated control systems utilized with such systems suffer from a number of drawbacks.

For example, in the past automating cooking appliances do not adequately customize the appliance heating function to the requirements of the package contents. Known solutions rely on human operator input to set the programming for the heating appliance based on knowledge of what is to be heated, such as amount of content, water content, desired cooking temperature, starting temperature, etc. All of these factors and others influence the cooking process and energy to be delivered to the package contents. For example, a present problem with induction cooking is that an induction range will apply the same process for energy transfer to heat any object that is conductive and is on conductive surface, regardless of the specific heating requirements for the package contents or contents within a cooking vessel. In other words, any device that can be inductively heated will be heated. For example, in the past microwaves may typically use 1500 watts to heat a small bag of popcorn, whereas the actual energy requirements for properly cooking the contents is only 60 watts. Thus, precise control of energy transfer, tailored to specific contents, offers the opportunity for dramatic energy savings. An additional drawback of the prior art is that known microwave packaging does not facilitate control to limit or adjust energy to compensate for foreign objects in the heating field, or to anticipate safety issues that may arise by heating unwanted objects in the field.

Other known issues with previous solutions are that they are not automated and controlled based on specific contents, and they do not limit the risk of unattended usage appropriately. Enabling the additional understanding by an appliance of package safety limits, experience set points, user set points and to deliver a controlled cooking experience for packages and contents would vastly improve known appliances. An example of this is cooking in a metal pan with an inductive range. The type, amount and condition of ingredients used create variables to the cooking process undergone by the ingredients—the cooking experience. Unless they are exactly measured and exactly the same, the cooking experience will vary by some degree. Thus, determining and understanding the energy requirements of a particular product package and package contents and efficiently controlling cooking energy has been a challenge.

Another issue with prior art solutions relates to the lack of adequate package/product validation—the ability to determine whether or not a package and contents have an assumed level of integrity. And still another issue relates to the lack of adequate package/product authentication—the ability to determine whether or not a package and contents truly originate from a legitimate and known source. Package validation and authentication may be vital to verifying the operational and functional characteristics of a package to be heated. Such verification can be important if improved operation, such as support for unattended or remote operation of a heating appliance to heat a package is to be provided. Some prior art solutions control heating based on sensing parameters. For example, some prior art solutions may control heating based on a change in impedance in heated materials. For further example, other solutions, such as those provided by Hestan Cue, include smart cooking systems in which temperature and time of a cooking pan may be automatically set. However, such systems do not control based on a predefined or pre-modeled thermodynamic load of a heated package and suffer from a number of other shortcomings and disadvantages.

Still further, prior art packages lack structures that provide for efficient and effective heating and that are cost-effective to mass produce.

SUMMARY

Aspects of the disclosure provide smart packaging to facilitate improved control of energy delivered to package contents and improved efficiency and safety of the heating operation experienced by the package and package contents. The smart packaging may include a package intelligence and communication module (PICM), which includes a machine-readable element, such as an RFID tag or other near field communication (NFC) element, including a light-energized microtransponder, that can store and transmit a unique identifier, such as an electronic serial number (ESN), that may be pre-associated with a particular smart package and contents, and/or an instance thereof (i.e. a certain one of a type of smart package). The thermodynamic response characteristics of the package may be modeled during a testing/calibration operation as part of the manufacturing process. Package size and weight, composition and content amounts may be standardized in order to maintain a predictable and repeatable thermodynamic response across a manufactured lot of product and packaging. Data representing correlations of parameters that represent the package's thermodynamic response characteristics may be stored within the PICM or stored in remote databases and retrieved based on the package unique identifier when the package undergoes a heating operation on a smart appliance. The smart appliance may include an energizing unit for applying energy to the package contents; a package interface for interacting with the package intelligence and communication module, the package interface including: a transmitter for transmitting a signal to the package intelligence and communication module; and a receiver for receiving the package-content related data; the energizing unit including a control subsystem, including a processor for controlling the energy applied to the package contents based on the content-related data. These features enable not only efficient package heating but package validation, authentication and safety.

According to an aspect of the disclosure, the smart package may include a light-energized microtransponder (LEM) such as microtransponders manufactured under the name P-CHIP® by Pharmaseq Corporation of Monmouth Junction, N.J., USA. LEM's are of a small size compared to RFID tags and therefore permit placement on packaging without significant modification of the package structure, as well as other advantages. The appliance may include an integrated P-CHIP® reader, which reads the information from the smart packaging and permits a control system to provide appropriate control of the cooking process to provide safe and efficient heating. Aspects of the disclosure enable a new level of control of energy delivered to contents, such as food, beverages, or cosmetics or personal care products and an improved heating experience delivered to the package and contents and for users.

According to another aspect, example packages may utilize data sets associated with a unique product identifier and thus the smart package and contents to control package heating operations and to validate and authenticate packages. The data sets may be stored on a PICM or retrieved from local or remote databases in a wide area network (i.e., cloud) based on a unique package identifier obtained from a reader on the appliance. The data sets may include respective thermodynamic load profiles ("TLP's") for different packages to be heated. The TLP's may include data representing correlations of thermodynamic and other parameters established during a previous manufacturing, calibration or testing step. The TLP may correlate data representing, for example, frequency and field voltage related to mutual inductance, current related to power such as the voltage and current at a frequency related to the expected information provided by and read from the package over a specific time sequence. Because package contents can be repeatedly filled into a package by the manufacturer with a high level of accuracy, and the parameters of the package are also known, this information can be predefined, preconfigured and characterized to deliver specific and repeatable experiences. The retrieved information may be used to inform control systems on the appliance, according to other aspects of the disclosure, to provide an improved cooking/heating process for the package contents. Power consumption of heating appliances may be reduced thru more efficient and precise control of cooking operations. Data sets retrieved by the appliance over a wide area network or locally may be utilized to efficiently control or validate energy transfer operations. The data sets may include information regarding the energy response of the contents, including how the contents within the package or vessel respond to energy over time and for a range of ambient temperatures. For example, for food contents, such as oatmeal, requiring the addition of a liquid, such as water, the energy response of a package being heated can be compared to a stored normal response for a given ambient temperature. If, for example, the package temperature increases faster than the normal response, a determination can be made that insufficient water was added to the package and the user can be notified via a user-interface, such as a display on the appliance. In addition, the energy applied to the package can be limited to prevent unsafe conditions, such as package or content temperatures increasing to an unsafe level. It should also be noted that the limits and variations of the packaging manufacturer also become part of these parameters. If the packaging manufacturer has a best case 7% fill accuracy, that may build into the thermodynamic profile as an error percentage.

According to another aspect of the disclosure, product-identifying data may be utilized on smart packaging to authenticate product packaging and contents and improve product and heating safety. Authentication may be improved by combining the product identifying data obtained from a product package with pre-stored actual performance criteria and operation data profiles. A manufacturer of the authentic food, food package other product can determine a precise heating/energy response profile for that specific product. The response from a smart appliance during a validation or authentication operation will be dependent upon the precise composition of the authentic food product. Databases may associate the smart package identifying information with parameters relating to authenticity, including the energy response, as well as parameters relating to product freshness and heating profiles, including profiles for various ambient conditions. A smart heating appliance may retrieve this information via network for a particular package serial number or other identifying information. The smart package identifying information read by the appliance may be used to authenticate the legitimacy and quality of the product, protect against counterfeit or sub-standard products, identify products that are part of a recall, and ensure that any expiration date has not passed. For example, if a machine-readable tag, such as an RFID tag, is placed on a counterfeit or substandard product, appliances according to an aspect of the disclosure may detect this based on deviations of the heating profile of the counterfeit product compared to the profile known to be associated with a legitimate product and/or package.

To improve safety, the control system may sense any deviation, even a small deviation, and in response may cause a fault condition compared to specified operating parameters, which in turn will initiate suitable control steps, such as shutting off the heating power. A package design system is employed to measure and assure temperatures, measure power levels and offsets, recording and testing the package operating characteristics over usage. It is this test system used by the package manufacturer that sets the experience criteria and logs the operating transforms and safety limits. By monitoring and controlling delivered heating energy very closely, the system and packaging, according to aspects of the disclosure, may provide safe, preconfigured and controlled cooking/heating processes and cooking/heating experiences for the user. Stored profiles may include temperature profiles (temperature over time) and may include minimal liquid temperature, maximum liquid temperature, ideal profile, max material safety profile (surface and package) time and temperature, stir times, altitude offsets and ambient temperature offsets. Material safety properties may change over time and based on the materials database these parameters may shift as additional knowledge is gained.

According to aspects of the disclosure, various smart package structures are provided to facilitate improved heating for personal care, home care, cosmetic, food and beverage products.

According to an aspect of the disclosure, smart packaging is provided with an insulating layer or spacer for an inductive element. This permits higher temperature heating and materials to be used and increased safety.

According to an aspect of the disclosure, smart packaging structures may utilize liquid components of a food product or heating/steaming material (water) for insulating an inductive receptor.

According to an aspect, smart packaging may utilize controlled steaming in a steamer package for improved preparation of food products or other products using water or other vapor.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto. The following FIGURES, unless otherwise noted, depict example devices according to aspects of the disclosure.

FIG. 3 illustrates a data correlations in a thermodynamic load profile for controlling an example smart appliance.

DETAILED DESCRIPTION

Figure 1:
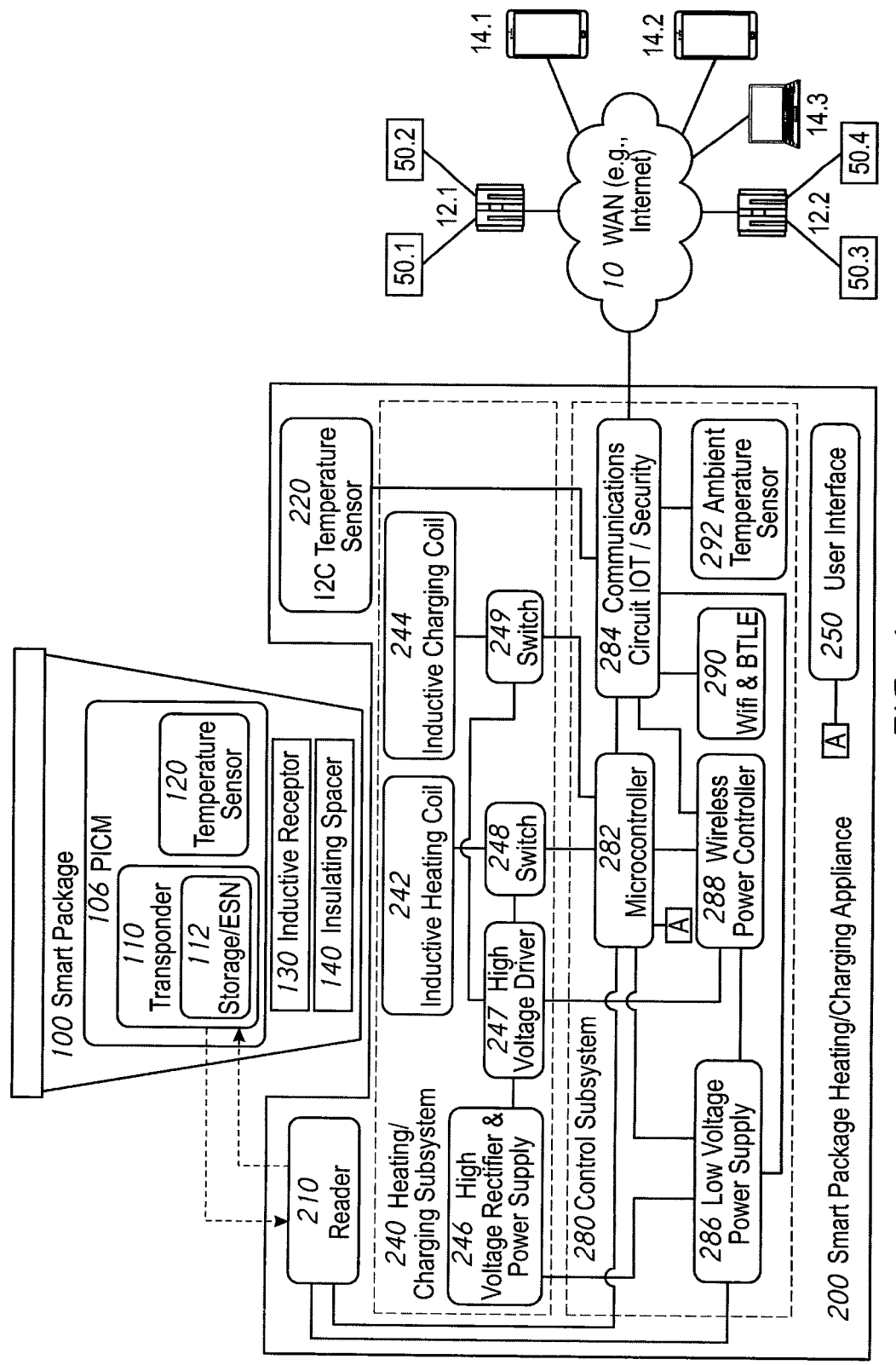
FIG. 1 is a block diagram of components and their functional relationships for a smart appliance and smart package.

FIG. 1 is a block diagram of example components and their functional relationships for an example smart appliance and smart package. The smart package 100 may be a sealed package having a tamper-proof lid. The smart package 100 may include a package intelligence and communication module (PICM) 106, which may include a transponder 110 having a storage or memory 112 containing a stored unique identifier, such as an electronic serial number (ESN), and other data previously stored during a package manufacturing, test, calibration or initialization operation, as will be explained. A temperature sensor 120 may be disposed on or within the smart package 100. The smart package 100 may include an inductive receptor 130 and an insulating spacer 140 disposed therein.

According to an aspect of the disclosure, the transponder 110 may be a near-field communication tag, or more particularly, an electromagnetic energy (EME) energized RFID tag, or may be a light-energized microtransponder ("LEM"), such as the semiconductor product marketed under the name P-CHIP® by Pharmaseq, Inc., of Princeton, N.J. Such microtransponders have a small size, typically 500×500 microns and nominally 100 microns thick—and may store a unique serial number (ID) which is transmitted in response to energization of photocells on the microtransponder by received light, such as pulsed laser light. Light-energized microtransponders offer advantages over electromagnetic energy (EME) powered RFID tags, including lower cost and elimination of interference from surrounding metal, such as packaging materials (i.e., metal cans). As such LEM's do not require a coil for generating power, their size is dramatically reduced compared to RFID tags and permits embedding of the microtransponder in packaging elements, such as container caps and package bottoms.

According to an aspect of the disclosure, RFID or NFC tags, or any similar device with an inductive antenna that generates current, can be used to harvest energy from an external source, such as from electromagnetic pulse energy received from a reader, and use the energy not only to power the transponder but to power other components in the system. For example, any excess power available from the inductive antenna can be used to additionally power other sensors in the system, such as sensors for pressure, temperature, tamper seals, and moisture sensors. The RFID or NFC chip harvests power and be configured in conjunction with a small microprocessor that may communicate with and control other components to deliver excess harvested power additional sensors. Energy may be stored in a small storage device integrated into the PICM 106. The use of extra available power harvested from the RFID or NFC components can be used to ensure other components, such as sensors, such as temperature sensor 120 of PICM 106, or other sensors, such as pressure sensors that may be included in a package and that require power, may operate more dependably and with the overall system having more stability than in cases where power available to the sensors is in short supply or interrupted. Temperature sensors may be used to control package heating according to preset thresholds, for example. Pressure sensors may be used to control a heating operation involving steaming and an internal package pressure. Components may communicate using known protocols or interface, such as I2C, also known as "I Squared C" is used interface to one or multiple sensors based on the required experience.

Still referring to FIG. 1, an example smart package heating and charging appliance (SPHCA) 200 may cooperate with the smart package 100 to heat the contents thereof. SPHCA 200 may include a reader 210 for communicating with the transponder 110 via radio-frequency. As will be explained further herein, the reader 210 may incorporate an optical simulator (pulsed laser) or an RF simulator to energize transponder 110. Transponder 110 may respond with an RF signal representing a unique identifier stored in storage 112 and other stored information. SPHCA may further include an integrated light harvesting circuit using an (I2C) interface and an I2C temperature sensor 220 for sensing heating surface temperature. SPHCA may include a heating/charging subsystem 240 and a control subsystem 280. In cases where a light source, such as laser, and a P-CHIP implementation is used, alignment for the SPHCA with the light source may be facilitated by locating the laser at the center of a circular recess for holding the package on the SPHCA 200 and placing the P-CHIP on the center of the circular bottom of package 100, as will be further detailed.

Heating/charging subsystem 240 may include one or more inductive heating coils 242 and an inductive charging coil 244. These coils may be integrated into a single unit, or separate, and are selectively energized by respective switches 248 and 249 and driven by a high voltage driver 247 which may receive rectified high voltage power from a power supply 246. Inductive heating coils 242 may be positioned to provide energy to the bottom and sides of a smart package 100 in order to provide rapid cooking times, as in the case where the SPHCA may be a hot food vending machine. The heating coil is designed with Litz wire for lower ESR of about 0.131 ohms with 13 turns per layer and a Litz configuration of 5/40/42 for a 0.251" wire at a pitch of 0.002" for a 6.19 uf coil. Half or full bridge drivers are used to drive the coils configuration. High voltage and low voltage coils are designed for automotive and AC based systems. The initial system is designed for 19 VDC. It should be noted that this coil configuration can be adjusted work with lower and higher voltages and also using a switched external power supply for added consumer safety.

Heating/charging subsystem 240 and reader 210 are controlled by control subsystem 280, which may include a microcontroller 282 having a microprocessor, powered by a low voltage power supply 286. A wireless power controller 288 utilizes the microprocessor and a communications circuit to communicate to a wireless device when a wireless device is to be charged rather than a smart package heated. A Texas Instruments Bq series wireless power transmitter, such as bq501210 bqTESLA™ Wireless Power Transmitter or similar product may be used for the wireless power controller. The wireless power controller may utilize the Qi standard for wireless charging. It may also include authentication to determine whether or not the device is a registered product and whether or not the appliance is an approved product. As will be explained further, the control subsystem 280 and microcontroller 282 may determine whether a rechargeable device is present or a package is present. A "ping" may be used for to detect impedance changes and wake the system to start the identification process for an object placed on or in the appliance. The wireless power process starts first checking the proper impedance. If this meets the proper criteria of impedance a digital ping starts to identify the needs of the device to be charged. Then the charging process begins using the Qi standard where the device provides a target control point and the transmitter delivers and adjusts as required to meet the device demands.

According to aspects of the disclosure, power may be harvested using the RFID/NFC antenna. Using a rectifier, possibly an asynchronous rectifier and a tuned resonant frequency, energy may be harvested from the RFID tag and stored to power a microprocessor and switch capacitor network. The microcontroller 282 includes a microprocessor and includes logic to decide when to power the I2C interface and accessory based on available power.

A dedicated user interface 250 may be included on the SPHCA 200 and may be supported by microcontroller 282. User interface 250 may include a visual output device, which may be a visual status bar on the appliance 200, and an audio output device, which may be a speaker for rendering simulated human voice responses, integrated into the appliance or standalone. User interface may also include one or more input devices for receiving input from a user, including a touchscreen interface, microphone and voice recognition support, which may be integrated into the appliance or in a standalone component communicating via WAN, and one or more pointing devices or pushbuttons.

A communications circuit 284 provides communication and interfacing Internet of Things (IOT) and security/authentication, as well as other capabilities accessed over a wide area network 10. This connection may be utilized for appliance, package and device authentication. This adds an additional layer of safety in an attempt to eliminate counterfeit products, as will be explained. A number of database or web service servers, for example 12.1 and 12.2 may be accessed via WAN 10. These servers may store any number of data sets—four are shown by example—50.1, 50.2, 50.3 and 50.4 that include package or package-content related information. A number of user devices, for example, 14.1 and 14.2 may access database or web service servers and the SPHCA 200 via WAN 10. In addition, user devices 14.1 and 14.2 may store and execute one or more applications to enable interaction by a user with the SPHCA 200, either via the WAN 10 or via near field communication (NFC) technologies, such as Bluetooth.

According to an aspect of the disclosure, the storage 112 in the PICM 106 (FIG. 1) may include a product cooking data set including parameters utilized by the control subsystem 280 to perform an optimal cooking operation on the contents of package 100. An example product cooking data set may include: a start at ambient temperature, a first temperature set point and a holding temperature, then a time required to heat a product, such as a time to pop popcorn, then temperature corresponding to an "off" status. The start at ambient is the first temperature setpoint and required/expected energy to be used. The holding temperature is the temperature setpoint and required/expected energy we expect to pop the corn within the hold time. Data representing the thermodynamic mass cooling over time based on the actual volume of the package and the given heat applied may be used to control operations, and energy may be supplemented during an operation to maximize the heating experience. Even in the off cycle the proper cool down may be specified as a package constraint. For example, a packaged food item may require that the contents of that package be heated to a temperature above the desired or specified temperature for consumption during the food preparation process. The package will continue to provide temperature data to the consumer even after the heating process is completed indicating when the package is safe to touch or the contents have cooled to the desired/pre-determined temperature for consumption. The product cooking data set may also include an optimal inductive receptor temperature, to which the heating operation is controlled, the receptor temperature is tracked as a predetermined and measured offset for that package using both the PICM temperature and the surface temperature 220 offset by the 292 ambient sensors for receptor references and other parameters may be represented as parameters in the storage 112 (FIG. 1) and may be determined in a calibration and testing system during a package manufacturing operation done prior to the heating operation on the appliance.

According to aspects of the disclosure, data stored in storage 112, or retrieved from a remote database server 12.1, based on a product's unique identifier may include, without limitation, a stock-keeping unit (SKU) ID, product data (name, viscosity, specific gravity, % of liquid), package data (fill accuracy, change over time, altitude offsets, limits, base pressure), a target cooking temperature, encryption codes for an authentication step, a used/not used status indicator, production date, production batch and lot, data defining recommended stirring intervals, a maximum package temperature, expiration date, cooking instructions, a desired heating coil frequency, amplitude, power profile over temperatures (surface and RFID tag), ambient operating offsets, package and receptor temperature vs. time vs. temperature appliance vs time is stored as a transform function over time). The altitude and ambient temperature are stored as offsets to the transform function as seen in Table A. The receptor temperature is assumed based on measuring operating characteristics and storing the offsets of the surface temperature and package temperature.

The above operational data may be developed during a manufacturing step, where a package may be tested and calibrated for an optimal cooking operation a given experience. A manufacturer may use a test platform to perform a series of predetermined heating or heating related operations on a given package in order to determine the thermodynamic response characteristics. Data tracked, logged and/or acquired during this operation may include data representing placement of the package to be heated on the appliance, in various offsets, which may be physical offsets at 0.1" increments. Package response characteristics at each of these offsets may be determined. This data may be saved or associated with the particular package and stored as package offsets, temperature and power adjustments, expected ranges of operation and variations. These offsets, adjustments and variations are suitable modifiers to operational curves or correlated data representing package thermodynamic response characteristics. If a particular set of correlated data or operational curve is sensed by the system, the placement (i.e., centered or offset) of the package on the appliance can be determined and control parameters adjusted accordingly. This data is recorded and stored in the test equipment and may be reduced to more simple data curves or correlations (i.e., flat files with table data) for storage in the RFID tag or storage on a server in association with a unique identifier for the package. According to aspects of the disclosure, these operational parameters and control curves/correlations for that package may be utilized by the control subsystem 280 (FIG. 1) to control the cooking operation. Use of this data can thus provide a level of awareness and intelligence on the part of both the user and the appliance 200 that is improved compared to the prior art.

Figure 2:
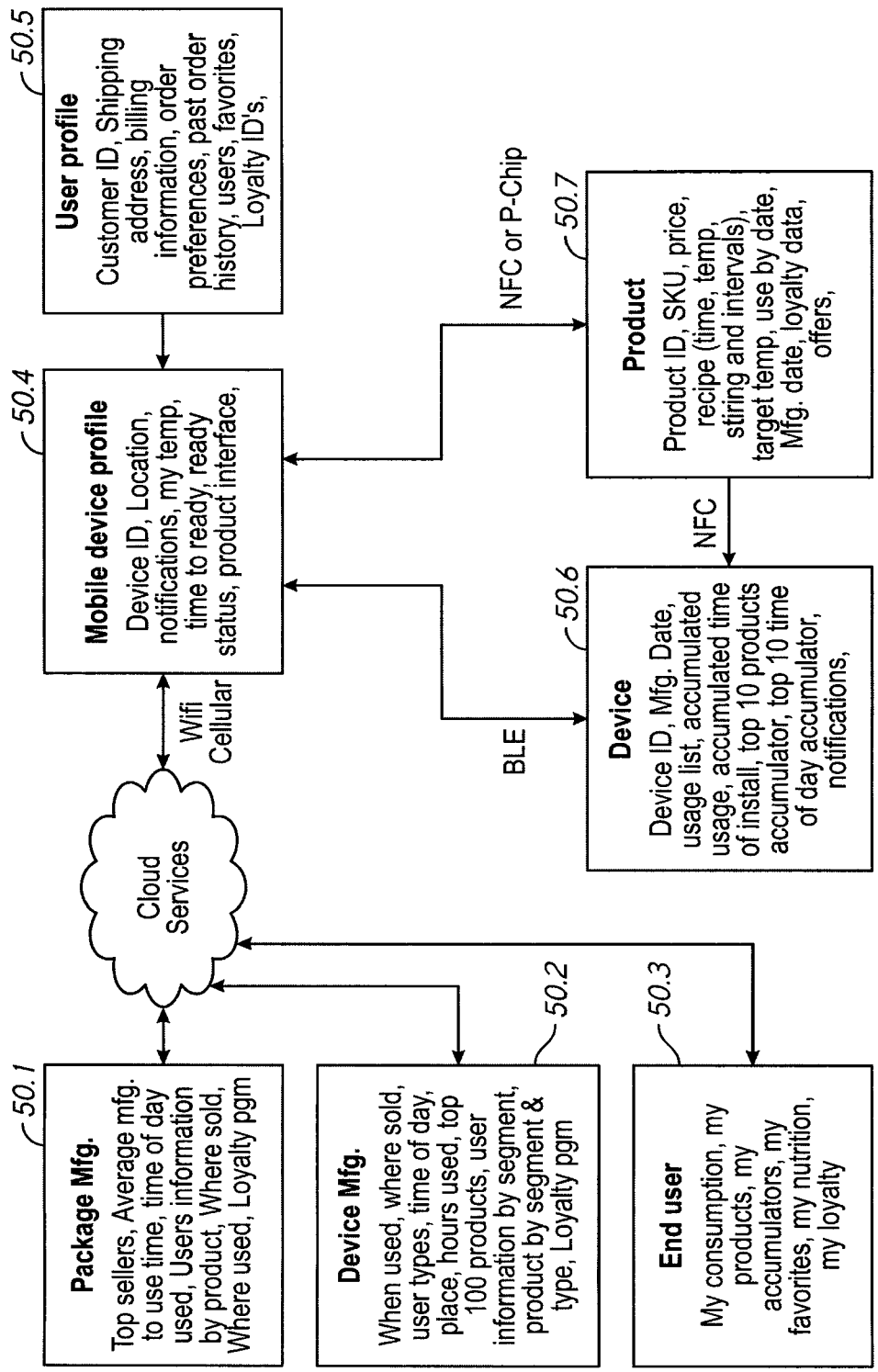
FIG. 2 is a block diagram of data sets and a data architecture that may be used by a smart appliance.

FIG. 2 is a block diagram showing an example data architecture that may be utilized by example appliances in accordance with aspects of the disclosure. A package manufacturing data set 50.1 may include data identifying top sellers, average manufacturing to use time, time of day used, user's information by product, where sold, where used, and loyalty program information. A device manufacturing data set 50.2 may include data regarding where the appliance will be used, where it was sold, user types, time of day, place, hours used, top 100 products used, user information by segment, product by segment and type, and loyalty program information. An end user data set 50.3 may include information relating to a user's consumption, products used, accumulator information, favorites, nutrition information and loyalty information for the user; an end user data set 50.3 may include user consumption data, an identification of products used or researched, accumulated values of amounts consumed, favorite products, user nutritional information and user loyalty data. The package manufacturing data set 50.1, device manufacturing data set 50.2 and end user data set 50.3 may be accessible via a cloud service via the WAN 10 (FIG. 1).

Still referring to FIG. 2, other data sets in an example data architecture may include data from a mobile device profile 50.4 which may include a device ID, device location, various notifications, a sensed local temperature or other environmental conditions, a time indicating when a product is ready (i.e., cooking is complete), a ready status indicator or flag and product interface data which relates to the mobile device interaction with a given product. Mobile device profile data 50.4 may be conveyed and received via WiFi or cellular data connection to the cloud services. A user profile data set 50.5 may reside on the mobile device associated with the mobile device profile 50.4. User profile data set may include a customer identifier, shipping address, billing information, order SKU preferences, past order SKU history, additional users of the device by customer identifier, favorite SKU's list, and loyalty information. A device (appliance) data set 50.6 may include a device ID, manufacturing date, product SKU usage list, accumulated usage by SKU, accumulated time of install, top 10 product SKU's accumulator, top 10 time of day SKU use accumulator, notifications. The device (appliance) data set 50.6 may be linked to the mobile device profile 50.4 via a Bluetooth low energy link (BLE).

Still referring to FIG. 2, a product data set 50.7 may include a product identifier, SKU, price information, recipe information, such as cooking time, cooking temperature, stirring time and intervals, requested end time, altitude, location, a target cooking temperature, target serving temperature, an expiration or use by date, a manufacturing date, loyalty program data and promotional offers data. The product data set 50.7 may include data that represents one or more thermodynamic load profiles (TLP) for a given product package SKU. As will be explained, the TLP may be used to control a heating operation and other operations related to safety or other functions when the package interacts with a smart heating appliance.

FIG. 3 illustrates a table representing a thermodynamic load profile (TLP), in this example, also termed a heating and safety profile, for use in controlling a smart appliance for a particular smart package according to aspects of the disclosure. In this example, a TLP for a microwave popcorn smart package is used. The data in TLP 300 may be generated during a package test and calibration operation that may occur prior to production and shipping of a large number of packages to consumers. Package testing and calibration may occur on a data logging and test appliance, which has the components of the SPHCA of FIG. 1 as well as additional sensors for environmental conditions, for example. Data in TLP may represent environmental parameters such as ambient temperature 302 (i.e., 70 degrees F.), altitude (1222 feet) 304. It will be understood that test or calibration data may be generated for a number of different environmental parameters, such as for different ambient starting temperatures and different altitudes. Data may include a food or product type identifier (popcorn) 306 and a known inductive heating coil frequency (55,660 KHz) 307.

According to aspects of the disclosure, TLP may also include parameters representing thermodynamic response of the package for a number of different steps. In the example shown, data for six steps may be acquired and logged during a packaging testing and calibration operation. For each step, thermodynamic response data correlations are obtained and stored for later use in appliance and package heating control and safety operations. The data correlations may include correlations of heating coil power and duty cycle, heating surface temperature, package internal temperature, time and any other parameters the correlation of which may represent a thermodynamic load or response of the package.

The TLP may include data that represents testing and calibration inputs or "functional measurements", represented by the data in columns (1) thru (8) in FIG. 3—Target Temperature, Time to Target, Charge Surface Temperature, Tag (sensor) Temperature, Voltage, Frequency, Duty Cycle and Measured Power. In addition, data representing direct measurements may be logged as shown in columns (9) thru (11)—Material Probe Low Temp, Material Probe High, Package Probe Temp, which may represent direct temperature measurements made on the package materials and contents.

An example process for testing/calibration and acquisition and logging of the TLP data will now be explained. The TLP data may be developed on a packaging test and calibration system (PTACS). In Step 1, a Test System command function may be executed to bring the package contents to a 90 degree F. Target Temperature within a 5.5 second period. The PTACS allows packaging companies and research personnel to test and design custom experiences. The PTACS may comprise a computer with control steps that records data from the package and typical transmitter or transponder with an output as seen in FIG. 3. The experience designer can use the calibration and test system to set target temperatures and measure what actual temperatures the package achieves and in what time frames. The package fill formula is logged and thermodynamics of the package and materials are recorded with several temperature probes as well as the package LEM or package information system. This system provides for the calibration of the package sensor and various safety offsets for several measured points of the package. The temperature sensor of the transmitter is also measured and when the desired experience is designed the data is output to a data file such as represented in FIG. 3. This TLP data may enables a transmitter to extrapolate measured values while processing the real time data. This system calibrates the package to a variety of thermodynamic properties and builds a thermodynamic profile with the various offsets related to various temperature sensing. This enables the experience to be tracked, and detailed modeling of the package thermodynamic response characteristics, which not only enable efficient control of heating but also enable the package to be authenticated by its thermodynamic properties as compared to the package data read by the transmitter and to assure altitude and high and low temperature operation and safety considerations. A National Instruments Lab View control system may be used to read the thermocouples and communicate to the transmitter device to gain transmitter data and read package date remotely. This system may be used by designers and package suppliers to properly and safely characterize an experience for a given package. The operation related to FIG. 3 may work in the following manner. Probes may be placed on the target package at the top of package (Material Probe High, column (10)) and at the bottom of the package (Material Probe Low, column (9)), these may typically be the receptor locations and it may be desirable to see this temperature related to the offsets and differences as test personnel seeks to insulate this temperature from the outside package. The receptor temperature (column (9)) is directly measured. The package probe data (column (11)) is data from a calibrator for the tag temperature reading and places in close proximity to that tag sensor. The system may be connected to a test transmitter that operates at a known the frequency 308, power (column (8)), duty cycle (column (7)) and voltage of the rail (DC into the drivers) (column (5)) as well as the surface temperature (column (3)) and ambient temperatures. The system tracks the thermodynamic load for the specific package contents. The system may test thermodynamic responses for minimum fill and maximum fill conditions of a package to get a statistical view of the thermodynamic package and each curve can be loaded into memory on the tag for use by the transmitter if that manufacturer want to see post fill levels. The system commands are then loaded and the test system predefines the energy, frequency and trajectory of the experience. This pre-characterization is important to define the experience and the operational steps to heat properly. The frequency and power may be tuned to the material, material size and proximity of the receptor. The duty cycle may be designed to deliver the best power just off resonance, typically just below or just above resonance for better control. The temperature set point may actually be a combination of the receptor (column (9)) and package probe (column (11)) and top material probe with the material to be heated also being measured. Stirring, shaking and kneading may be needed at specific points to encourage additional even heating. The experience steps and timing are recorded as the experience becomes repeatable. The tag temperature (column (4)) is recorded with the offsets for the related additional calibration probes (columns (9), (10), (11) and (3)) to calculate an average temperature for this package with given thermodynamic load over specific times. The best trajectory and timing is determined by the user and that experience may be loaded as the experience for that package and stored as an image for that tag. That tag is then replicated for production until that formulation or package changes, assuring a great experience that can be replicated and authenticated by the appliance.

Still referring to FIG. 3, use of the TLP in controlling a heating operation will now be explained. In this example, which may be for making popcorn, the process may begin by checking the package. The system may determine the type of package by monitoring the measured inductive coil power vs. inductive coil frequency over a range of frequencies, both higher and lower than a target value. The system may also utilize typical offsets determined in the package testing and placement operation. Thus, this data may be a form of package identification, validation and determination of placement. Test frequencies may also be used to determine placement adjustment. Frequency selection may be determined by the control system once an actual heating process starts. These initial validation steps can be used by the system to confirm that the actual package type placed in the appliance is the expected type of package. Thus, the TLP may be used in initial operations for package validation. Once package validation (and authentication, as will be explained) occur, the package heating operations may be undertaken by the system using previously determined heating trajectories and ranges of the operation, as will be explained.

Still referring to FIG. 3, the TLP includes information that correlates system parameters, such as surface temperature, with different steps in a heating operation. Because the monitored parameters vary linearly, the data points in the table representing the TLP may represent a continuous control curve and the system may calculate the expected change of a given parameter over time using the data set stored in the TLP.

According to aspects of the disclosure, each of the sensed parameters may include an error threshold such that when sensed values, such as temperature, deviate from the prescribed curve (data correlation) by an amount that exceeds the error threshold, the system indicates a fault and the heating operation may be interrupted or terminated. This provides a very safe operating system with no single point of failure. In prior art systems, this has been an issue, especially in relation to enabling unattended or remote heating/cooking.

Still referring to FIG. 3, various commands, each representing a heating process or heating process related operation may be represented in the TLP. For example, step 2 represents a heat to target operation. Step 3 represents a hold heat and finish heat operation. Step 4 may be a pause cook operation. Step 5 may be a hold heat operation. Step 6 may be an "off" status operation. During each of these operations, the appliance may control the package heating while tracking power, surface, package and time. Offsets may be adjusted for ambient temp and altitude offsetting the linear performance of time and temperature curves. Duty cycle or frequency may be used to offset power and tune to a better package power. Tests can be made with known frequency interactions. For example, if the ideal for the package is 55.56 KHz, there will be a different reaction at 50 KHz and 60 KHz and these frequencies provide guide points for validation. A safe guideline for the starting error may about 7% of target for each area of monitored interest. Once the package or end manufacturer determines the optimal heating experience steps for a given package type, using a test or calibration platform, and the data is stored in a TLP corresponding to that particular package, a heating appliance according to aspects of the disclosure may retrieve the TLP that corresponds to that package and may perform the same operations and according to the same control parameters to replicate the heating experience according to the initially determined test/calibration steps.

The TLP's according to aspects of the disclosure may include power expectation information, which may include data that correlates time with package temperature, receptor frequency, receptor temperature, surface temperature, current, voltage and power as set forth in example Table A below:

TABLE A

| Time | Package Temp | Receptor Frequency | Receptor Temp | Surface Temp | Tx Current | Tx Voltage | Power |
|---|---|---|---|---|---|---|---|
| 0 | 70.00 | 555000 | 70 | 70 | 2.9 | 27 | 78.3 |
| 0.1 | 72.19 | 555000 | 76.44 | 72.8 | 2.9 | 27 | 78.3 |
| 0.2 | 74.38 | 555000 | 82.88 | 75.60 | 2.9 | 27 | 78.3 |
| 0.3 | 76.56 | 555000 | 89.31 | 78.4 | 2.9 | 27 | 78.3 |
| 0.4 | 78.75 | 555000 | 95.75 | 81.2 | 2.9 | 27 | 78.3 |
| 0.5 | 80.94 | 555000 | 102.19 | 84 | 2.9 | 27 | 78.3 |
| 0.6 | 83.13 | 555000 | 108.63 | 86.8 | 2.9 | 27 | 78.3 |
| 0.7 | 85.31 | 555000 | 115.06 | 89.6 | 2.9 | 27 | 78.3 |
| 0.8 | 87.50 | 555000 | 121.50 | 92.4 | 2.9 | 27 | 78.3 |
| 0.9 | 89.69 | 555000 | 127.94 | 95.2 | 2.9 | 27 | 78.3 |
| 1.0 | 91.88 | 555000 | 134.38 | 98 | 2.9 | 27 | 78.3 |

According to aspects of the disclosure, other data that may be stored in the TLP may include use by (expiration) date; minimal and maximal power profiles with ambient offsets, ambient temperature measurement for profile time and temperature offsets; temperature profiles; minimum liquid, maximum liquid, ideal profile, time and temp, altitude offsets by location and heating methods. The energy required to heat the package may have some major modifiers for profiles. The first is a starting or ambient temperature. This is a time and energy offset to the profiles as the starting point. It may determine a new cooking time and either adds to or subtracts to the energy and cook time required. Another parameter may include pressure for altitude also has an offset requiring different temperatures for altitude. These altitude offsets may be saved as a table and when the user inputs the altitude the system may utilize the offsets. If not, the profile will not match and the system will shut off when attempting to meet a package profile. These parameters are both safety related and operational modifiers.

Figure 4:
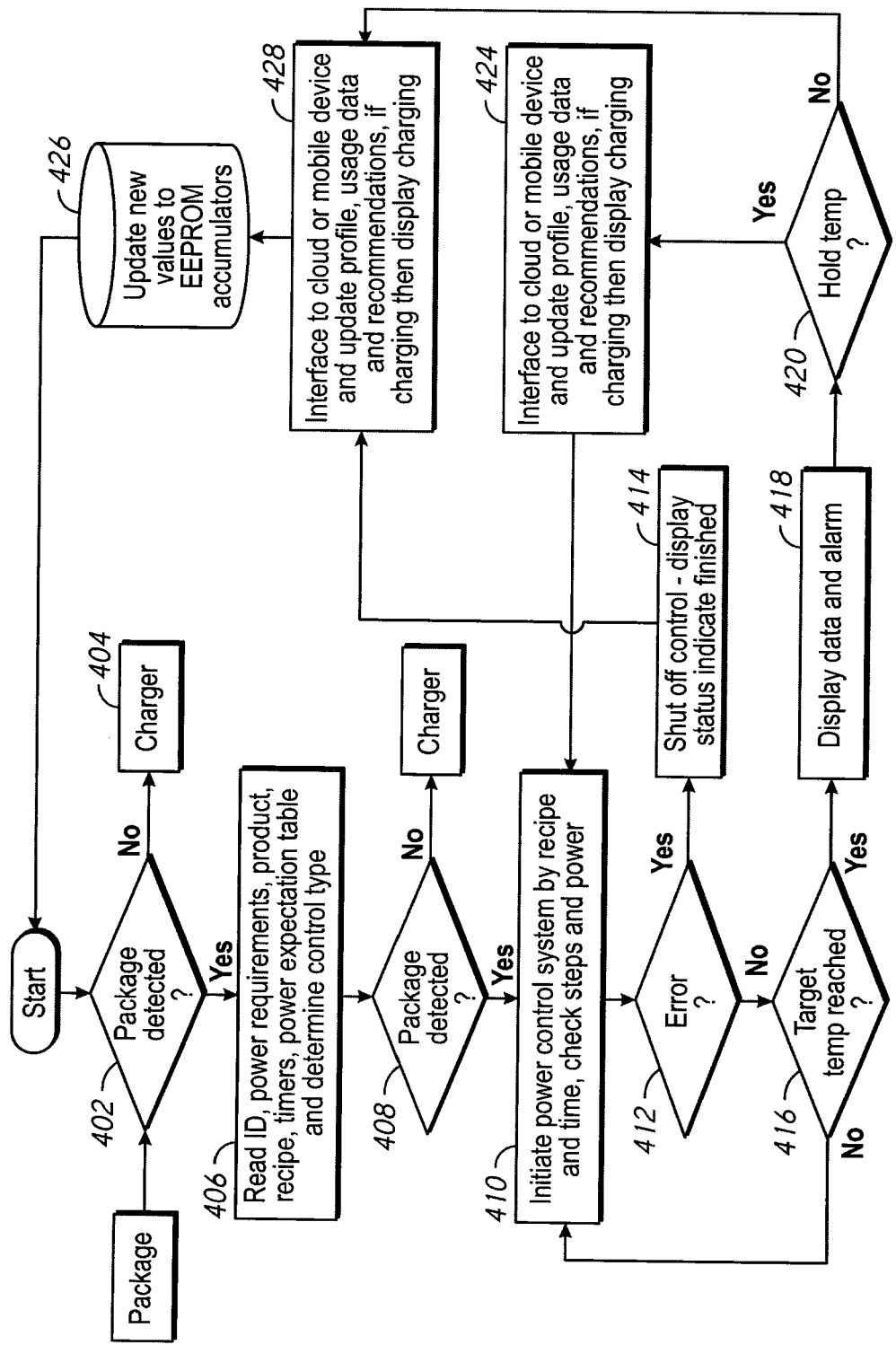
FIG. 4 is a logic flow diagram for a smart appliance for controlling the heating of a smart package.

FIG. 4 is an example logic flow diagram showing logic that may be performed by the SPHCA microcontroller 282 (FIG. 1) to detect a smart package to be heated and to initiate a heating operation for the smart package. At 402, a decision is made as to whether or not a package is detected. This may be done using the transponder or a device analog and digital authentication ping, for example, using the wireless power Qi standard. If no package is detected at 402, the logic proceeds to a charger routine at 504, which will be described herein. If a package is detected at 402, the logic, at step 406, causes the SPHCA reader to obtain a unique identifier as read from the microtransponder, and retrieves from appropriate databases via the WAN 10 (FIG. 1) operating parameters, such as power requirements, product information, profile information, time information, power expectation information, and determines control type. The power expectation may be the power expected with a given offset as discussed earlier. The control system may match a heating curve over time based on the efficiency of power transfer. An ideal match may be determined based on the package placement and operating curve. The system will undertake steps to find a match. If no match is found, the system may indicate that package cannot be validated and that the package has been tampered with. A test stage (FIG. 3, Step 1) may be used to quickly find the starting match for the proper curve. Identifying the proper curve allows additional adjustments to be applied as needed. If the package identified to be offset by 0.5" or more the system may choose to adjust the frequency and power for additional resonant efficiency as one example.

Still referring to FIG. 4, at decision step 408, the logic determines if a package is present and operating temperature as expected in the profile identified in FIG. 3 and Table A. Current vs frequency is also tracked with range limits and surface temp vs power is also checked with range limits. At step 410, the power control system is initiated by profile and time. In a very short time during a power-up step, the system can determine whether or not a given package is performing according to an appropriate TLP. If not, operations are halted. The control system may use all inputs and profile settings to identify present parameters and operation ranges over time and temp to validate against RFID data and expectations. At step 412, an error check is made. If an error is detected control is shut off at step 414 and an interface to cloud step at 428 is performed. New values to EEPROM accumulators are updated at 426 and the logic returns to step 402. If at step 412 no error is detected, a determination is made at 416 as to whether a target temperature is reached. If not, the logic returns to step 410. If yes, the logic displays data and alarm at step 418 and then determines at 420 if the temperature should be held. If yes, the system interfaces to the cloud at 424 and proceeds to step 410. If not, the system interfaces to the cloud at 428 and proceeds to steps 426 and 402 as previously described.

As will be recognized, specific operating thresholds may be stored in a TLP based on materials used in packaging, product attributes and other parameters. A packaging manufacturer may be very conservative in setting limits for materials and profiles. Each material will have specific operating thresholds and pretested limits that may be programmed based on a package test system. The authentication process is required for unattended modes where the user would like to heat in the absence of a user. This is required to authenticate the package and the control system thresholds from the updated control database. An additional authentication also occurs when the package behaves as the RFID profile indicates. If a material has an updated threshold or has been recalled we want to identify each package configuration so we can track performance. When the package data is read and the unique ID is obtained that data is shared to the cloud along with the unique appliance ID. The system provides a token for use to operate the system based on an approved test and validation question. The updated information can be used to recall or update the operating information on the fly. Either the product is disabled or it functions under the new profiles.

Figure 5:
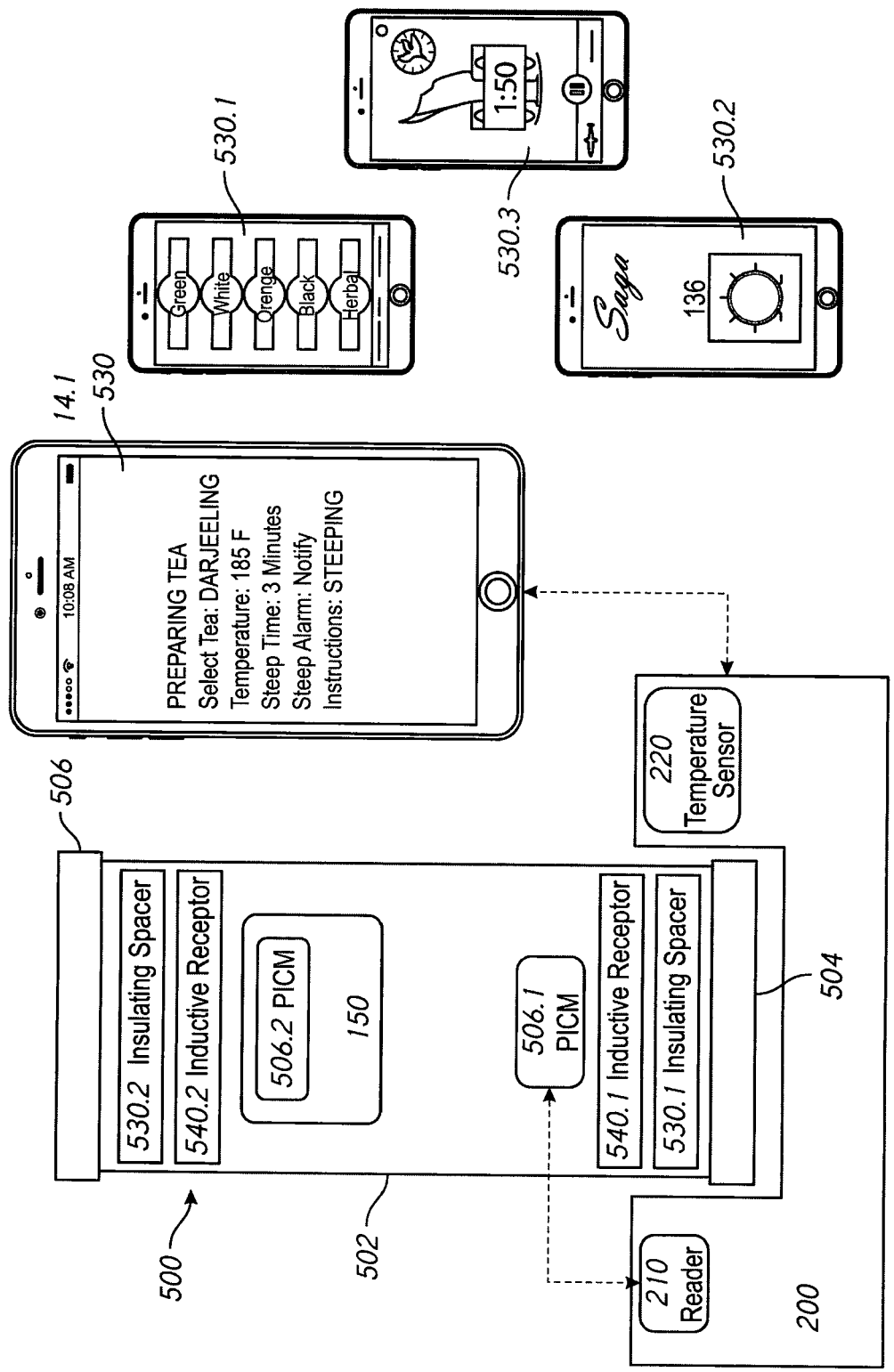
FIG. 5 is a smart package and smart appliance for brewing and heating tea.

An example smart package configuration and process for heating a smart package according to aspects of the disclosure will now be explained with reference to FIGS. 5 and 6. An example smart package 500 for brewing tea may include a tea tumbler having cylindrical container body 502 having a container base 504 and a removable (i.e., screw-on) cap 506 at an opposite end. The container 500 may include a first inductive receptor 530.1 and first insulating spacer 540.1 positioned near the base 504. A second inductive receptor 530.2 and second insulating spacer 540.2 are positioned near the cap. A first package intelligence and communication module 506.1 is positioned near the base. A second package intelligence and communication module 506.2 is associated with a tea package 150 secured within the container 500, for example, in a tea basket associated with the cap 506. Container 500 may include a supply of brewing liquid, i.e., water contained therein. The insulating spacer may be a material such as paper or plastic corrugated insulators such as that used for the rings that protect a cup of hot coffee. Smart package 500 may be first positioned on appliance 200 in a heating position shown in FIG. 5 in which the tea container 150 is oriented above the water supply and appliance 200 provides energy to the receptor 530.2 to heat the water to a brewing temperature. When the water attains a desired brewing temperature as sensed by a temperature sensor in PICM 106.2. the tumbler 500 may be inverted and thus oriented in a brewing position for brewing tea. The presence of inductive receptors on each end of the container enable it to be heated in a water heating orientation and flipped to assume a tea steeping/brewing orientation. A mobile device 14.1 running an application for user interaction with the appliance 200 may include a display 530 of relevant information to a user including a tea selection (DARJEELING); brewing temperature (185 F); Steep Time (3 minutes); Steep Alarm Status Setting (Notify) and Instructions (Steeping). User interface may also include displays and user input prompts for tea selection 530.1; steeping temperature 530.2 and steeping time 530.3.

According to aspects of the disclosure, a data set representing a desired steeping temperature for the water may be retrieved based on a user interaction with a mobile device 14.1 that interfaces with appliance 200. The data set may include information representing brewing temperatures and times for different types of tea, for example, as represented in TABLE B below:

TABLE B

| Tea Type | Water Temp (F.) | Brewing Time (min) |
|---|---|---|
| White | 175-185 | 1-3 |
| Green | 180-185 | 3 |
| Black | 206 | 3-5 |
| Darjeeling | 185 | 3 |

Figure 6:
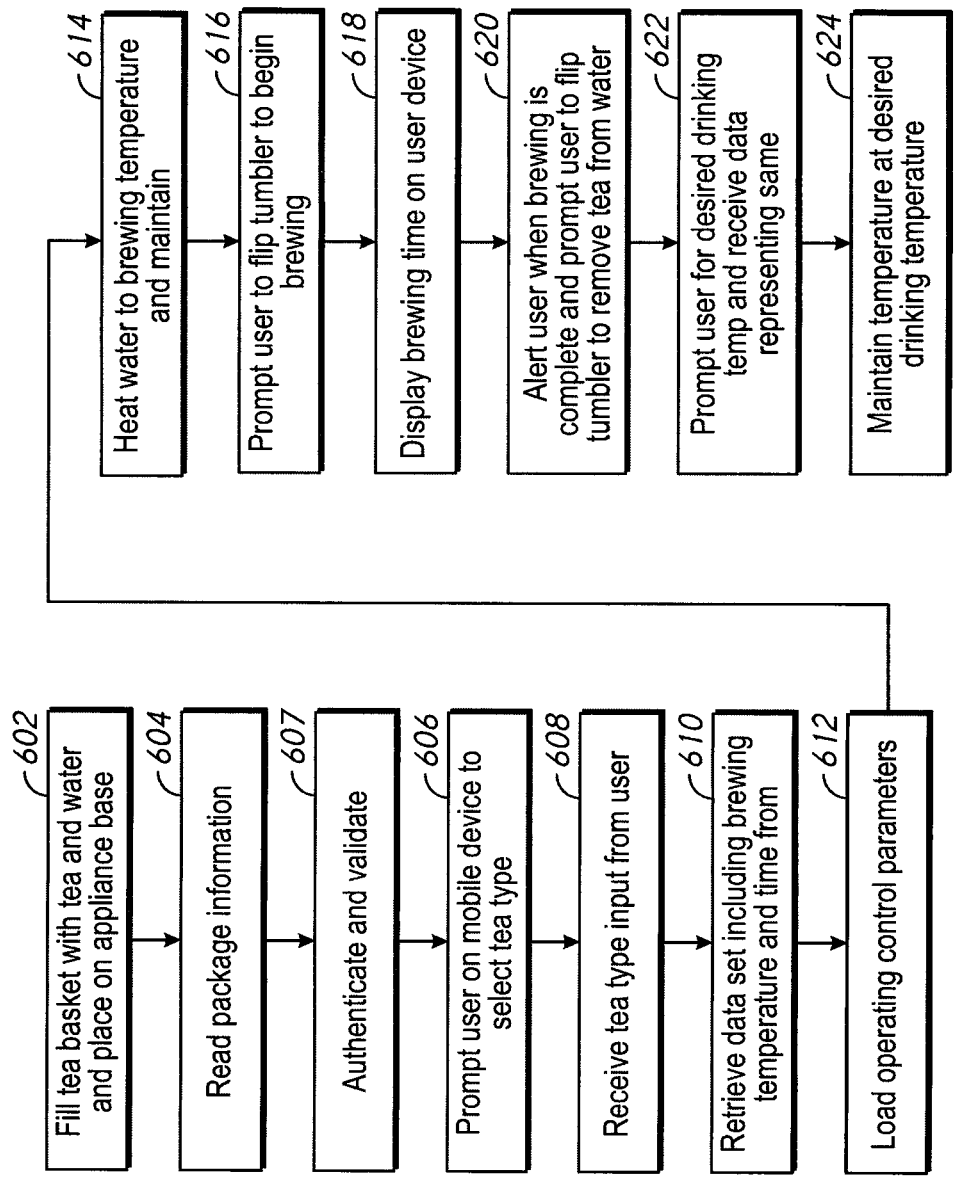
FIG. 6 is a logic flow diagram for operating a smart appliance in a tea brewing and heating operation.

Referring additionally to FIG. 6, a method of operating a smart appliance 200 according to an aspect of the disclosure for brewing tea in the smart package, such as the tea tumbler, described above is further detailed. At step 602, a user may insert a smart tea package into a basket in the container cap, fill the container with a suitable amount of water and place the container on the heating appliance 200 in the heating orientation shown in FIG. 5 in order to apply inductive heating energy to the water. At step 603, an authentication step may occur for the tea package, container and even the appliance, according to systems and methods that will be described. At step 604, the smart appliance reader 210 (FIG. 1) may receive identifying information for the tea package. In addition, identifying information for the brewing container may also be received from the PICM 506.2 (FIG. 1). The identifying information may include a unique serial number for the tea packet and for the container. This identifying information may be used to retrieve additional information, such as brewing times and temperatures, to automatically control the brewing operation. At 606, a user device, which may be in communication with the heating appliance 200, may display the type of tea being brewed and prompt the user for a selection of the tea type. At 608, information about the type of tea selected is received by the appliance 200. At 610, one or more data sets are retrieved for the brewing operation, based on the tea package information, container information and input by the user. The retrieved data set may include ideal brewing temperature and time for the type of tea selected. At 612, the heating appliance 200 may set operational parameters based on the retrieved data sets, including temperature thresholds, rate of energy applied to the container, thresholds for detection of foreign objects or faulty packaging and others as described above. At 614, the water is heated to the desired brewing temperature by the heating appliance 200 under control of the control subsystem 280 (FIG. 1). The ideal water temperature may be retrieved from a database, based on the unique identifier associated with the tea packet. The temperature of the water may be monitored by a temperature sensor associated with PICM 506.2 and conveyed to the heating appliance 200. Information may be displayed real-time to the user on a user device or on the user interface 250 (FIG. 1) of the appliance 200. At 616, after the desired brewing temperature is attained, the user is prompted via the user interface to flip or invert the tumbler to a brewing orientation. Water in the container then surrounds the PICM 506.1 and may continue to be heated or maintained at a desired temperature using inductive receptor 130.1. At 618, a desired brewing time is displayed to the user to indicate the time remaining for brewing. At 620, after the desired brewing time has passed, the user is alerted that brewing is complete and prompted to flip the tumbler back to the heating position. At 622, the user may be prompted for a desired drinking temperature and the data entered by the user corresponding to the selection is conveyed to the appliance 200. At 624, the appliance maintains the desired drinking temperature until the user consumes the tea.

Figure 7:
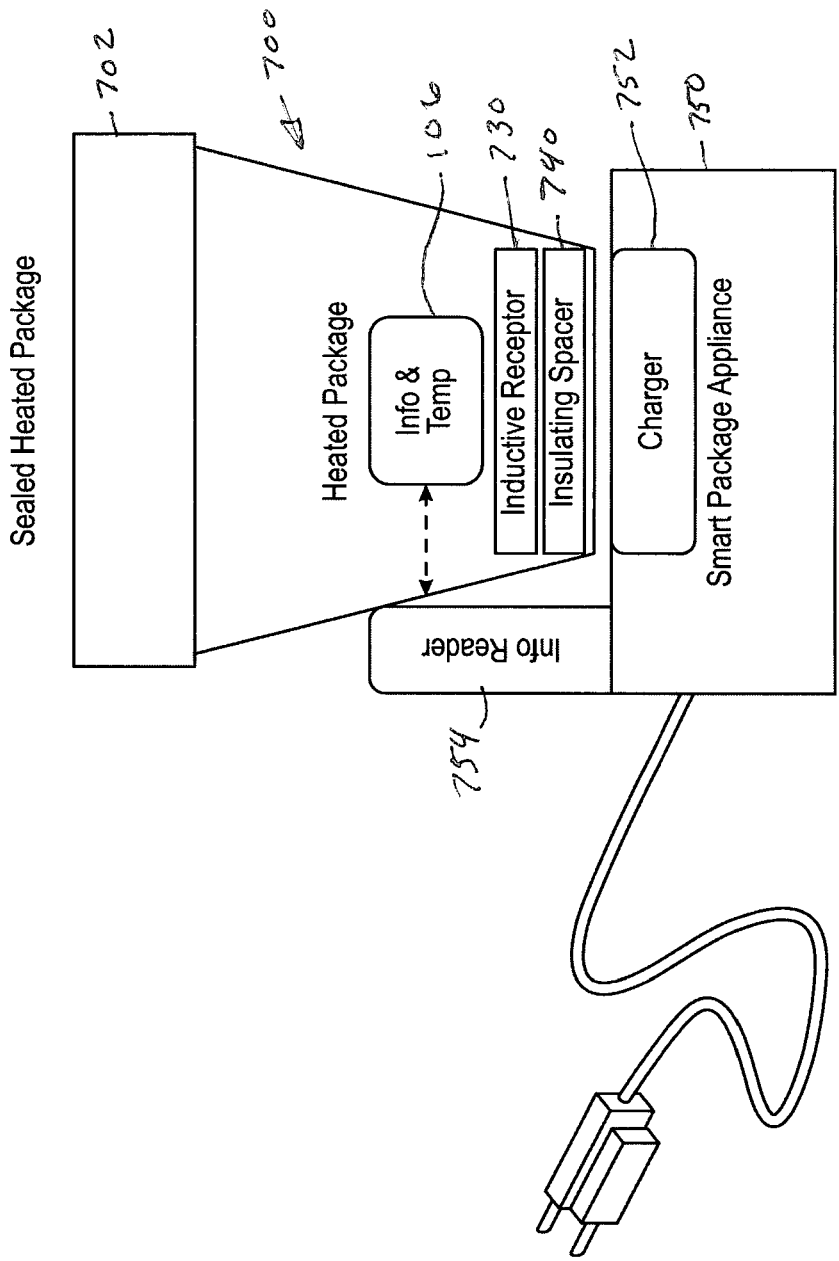
FIG. 7 is a schematic diagram of a smart package and smart appliance utilizing a light powered microtransponder and reader.

FIG. 7 is an illustration of an example package configuration in which the package may be cup-shaped package 700 with a sealed lid 702 and wherein a PICM 106 with a temperature sensor is disposed in a location within the package 700 for permitting reading by an information reader 754 on a smart appliance 750 and disposed for reading from the side of the package 700. A charging coil 752 may be located on the appliance 750 for wirelessly charging chargeable objects that may be placed thereon. An inductive receptor 730 may be supported on an insulating spacer 740, which also maintains the receptor 730 in a position in which it is free from direct contact with the package walls and may be surrounded by liquid or other components of the contents that provide insulating and heat transfer capabilities.

Figure 8:
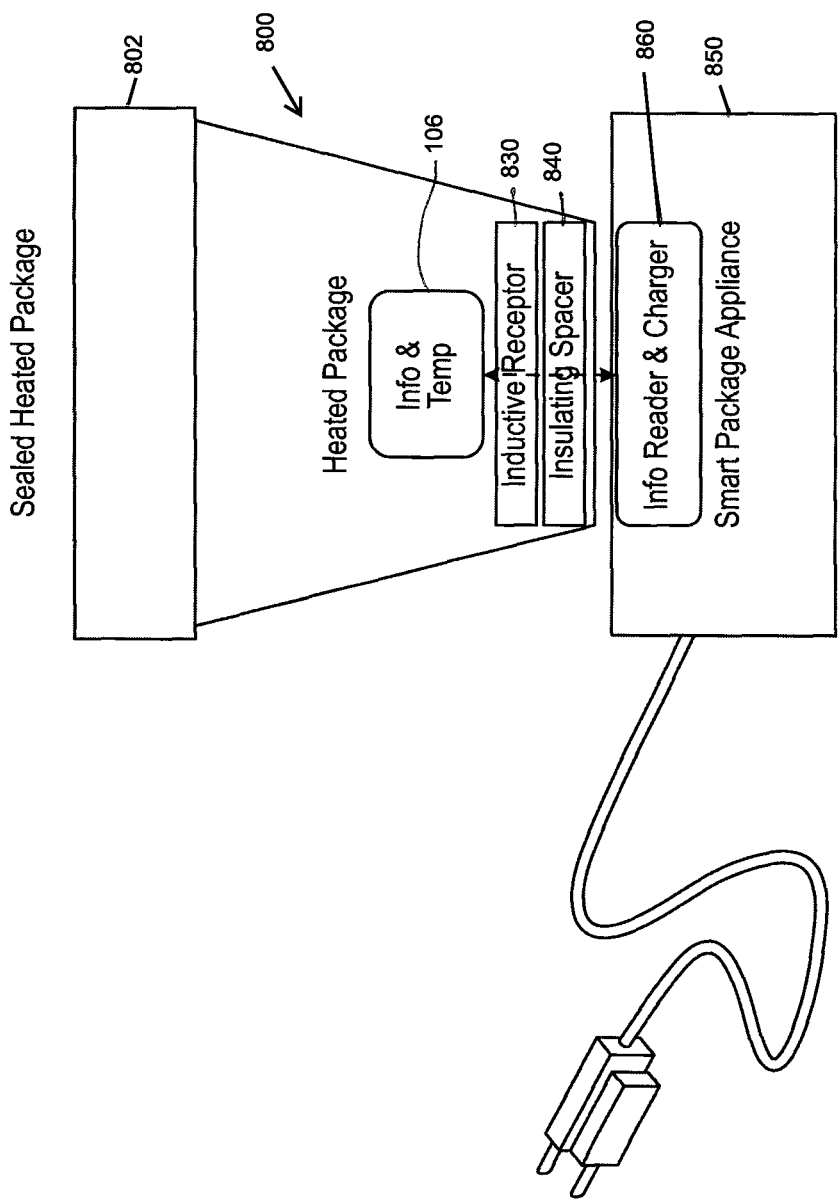
FIG. 8 is a schematic diagram of another example smart package and smart appliance utilizing a light powered microtransponder and reader.

FIG. 8 is an illustration of an example package configuration in which the package may be cup-shaped package with a sealed lid and wherein a PICM 106 is disposed in a location within the package for permitting reading by an information reader disposed beneath the package. The package may be cup-shaped package 800 with a sealed lid 802 and wherein a PICM 106 with a temperature sensor is disposed in a location within the package 800 for permitting reading by an information reader 860 on a smart appliance 850 and disposed for reading from the bottom the package 800. A charging coil and information reader may be integrated into a single unit 860 for heating and for wirelessly charging chargeable objects that may be placed thereon. An inductive receptor 830 may be supported on an insulating spacer 840, which also maintains the receptor 830 in a position in which it is free from direct contact with the package walls and may be surrounded by liquid or other components of the contents that provide insulating and heat transfer capabilities.

Figure 9:
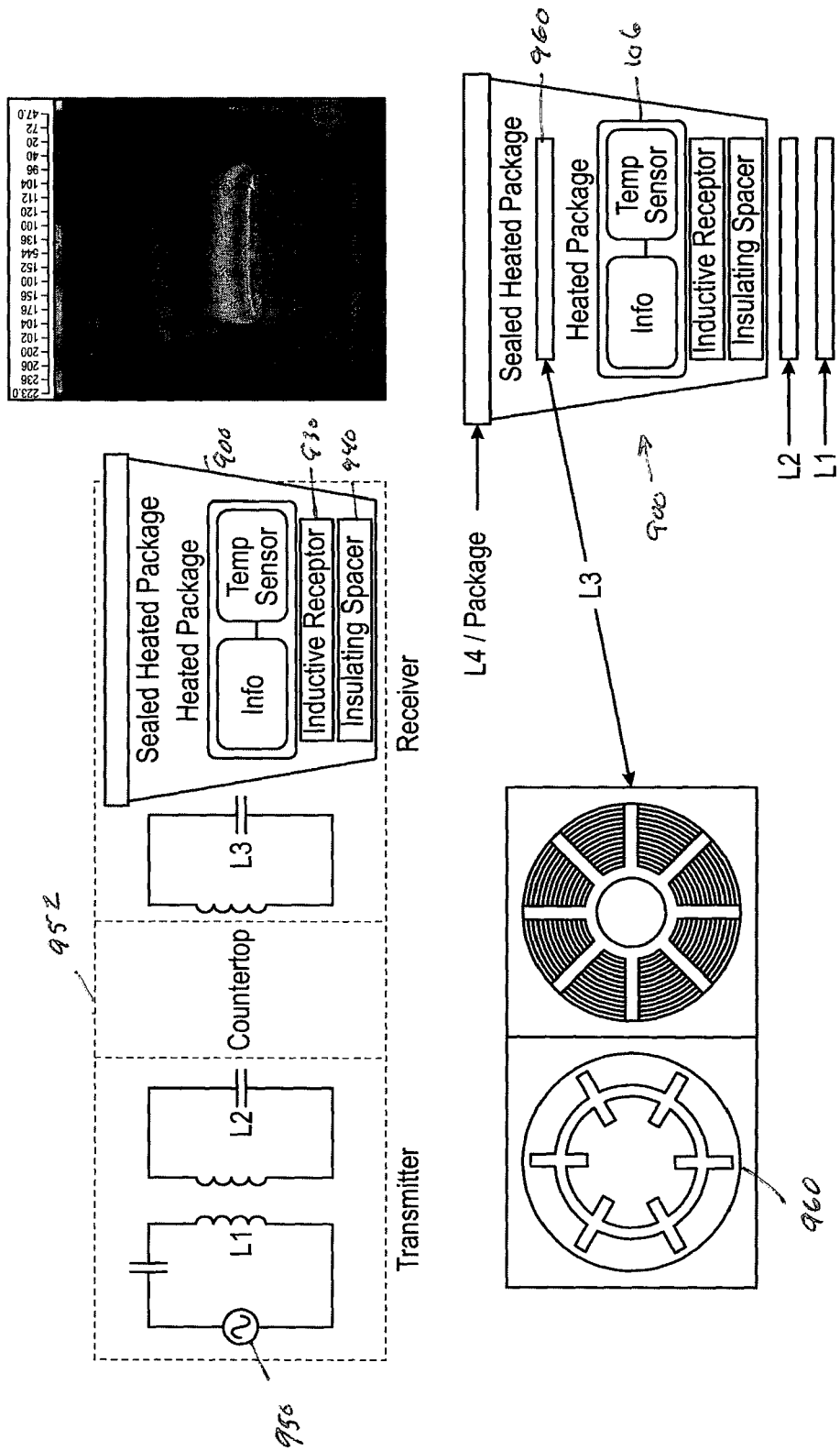
FIG. 9 illustrates an example heating coil configuration that allows heating distance or powering through surfaces for packages.

FIG. 9 illustrates an example of a highly resonant smart package 900 and inductive heating coil configuration that may allow extra heating distance between the inductive coil and receptor. A first inductive coil L1, which may be driven by a driver 950 may induce a second inductive circuit L2, which may induce, through a countertop 952, second inductive coil L3 located within the package 900. Package 900 may function as a fourth inductor L4 and may be tuned in its configuration, such as the materials used and the location and shape of inductive components, including inductive receptor 930, such that inductive heating is maximized and may occur across relatively longer distances than attainable in the prior art. The package coil 960 may be a commercially available stamped conductive coil such as those sold by The A.K. Stamping Company of Mountainside, N.J., USA. This configuration may permit a heating appliance to be disposed beneath a countertop (i.e., granite) having substantial thickness.

Figure 10:
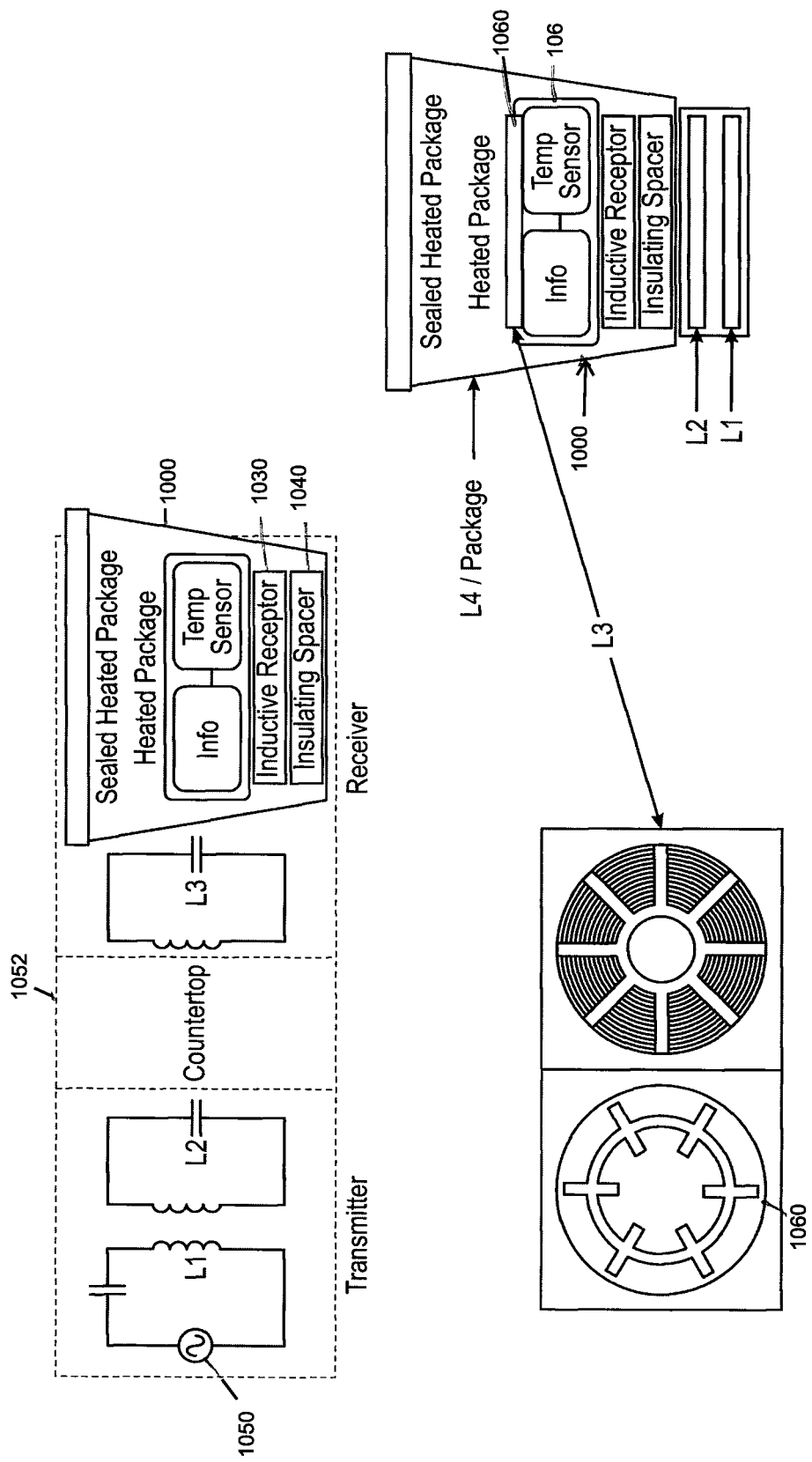
FIG. 10 illustrates another example of heating coil configuration that allows extra heating distance between the coil and receptor.

FIG. 10 is an illustration of another example of a highly resonant smart package 1000 and inductive heating coil configuration that allows extra heating distance between the inductive coil and receptor, where the package may have a receptor 1060 located in the center of the package. Because the inductive coil may transfer energy across a relatively long distance, the package may be configured with an inductive receptor 1060 disposed in a location that is vertically displaced from the package bottom. This may provide more even heating of package contents. The PICM 106 may be disposed on the bottom or side of the package.

Figure 11:
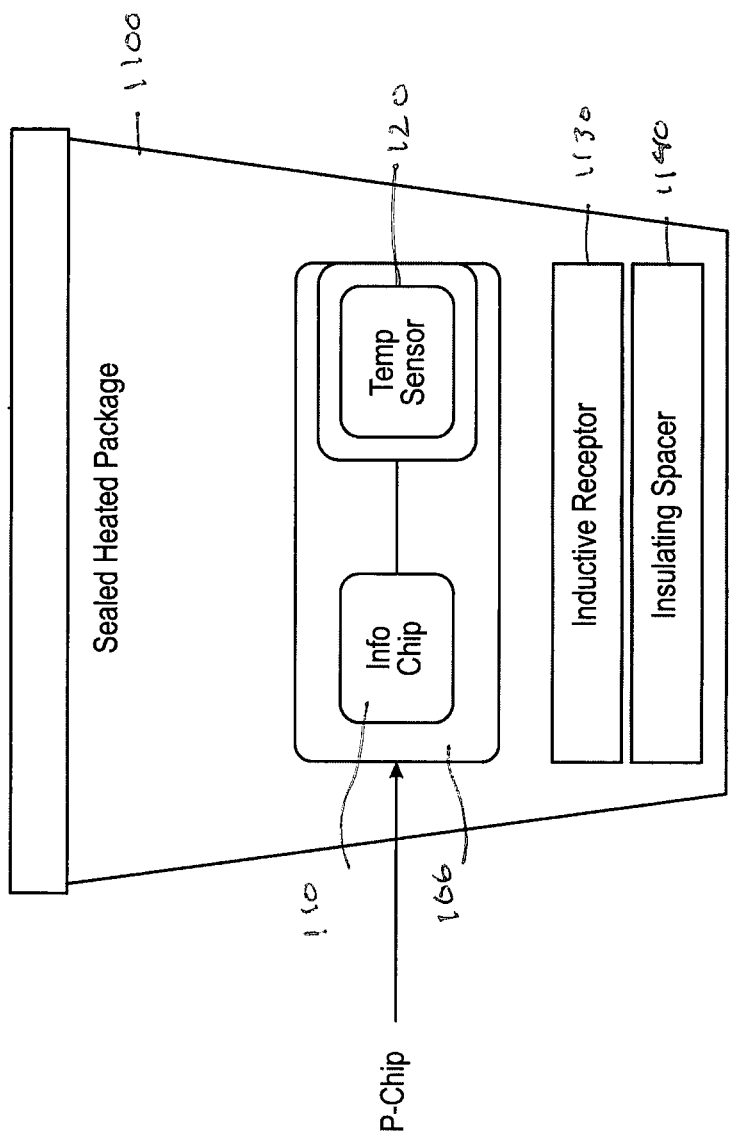
FIG. 11 illustrates example elements of a smart package system including a package, NFC chip with temperature sensor, a receptor of metal material and the spacer that allows the fluids within the package to operate as a simple insulator.

FIG. 11 is an illustration of another example package configuration, including a sealed, heated package 1100, a PICM 106, which may include a light-energized microtransponder 110 and a temperature sensor 120. An inductive receptor 1130 and an insulating spacer 1140 are disposed in a bottom location within the package. The spacer 140 allows fluids within the package to operate as a simple insulator for the receptor and prevents the inductive receptor 1130 from heating package materials excessively or directly. It should be noted that the heating material may be corrugated or have facets or support legs that limit the thermal contact to the outer packaging or insulating material.

Figure 12:
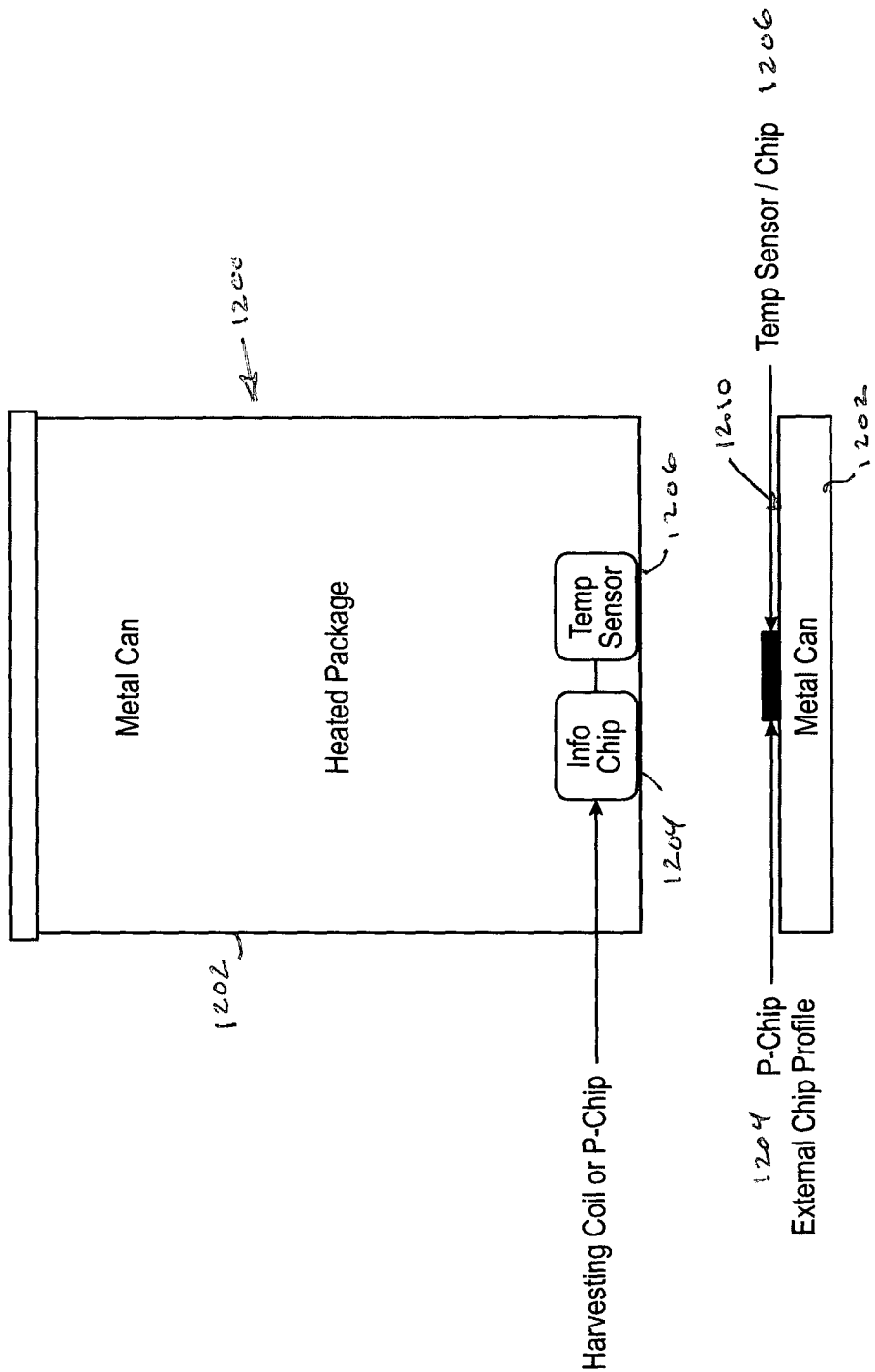
FIG. 12 illustrates an example smart package in the form of a metal can with a shielded NFC tag that allows both heating and reading of the tag.

FIG. 12 illustrates an example package configuration with a shielded near field communication (NFC) tag that allows both heating and reading the tag. The package 1200 may include a metal can 1202 or other container having metallized surfaces. The NFC tag 1204 may include a harvesting coil such as an RFID tag or a LEM. A temperature sensor 1206 may also be provided. Near field communication tag may be located near the bottom of the package. In the case of a P-chip or LEM, the element may be attached to an outer surface 1210 of the metal can 1202 along with the temperature sensor 1206.

Figure 13:
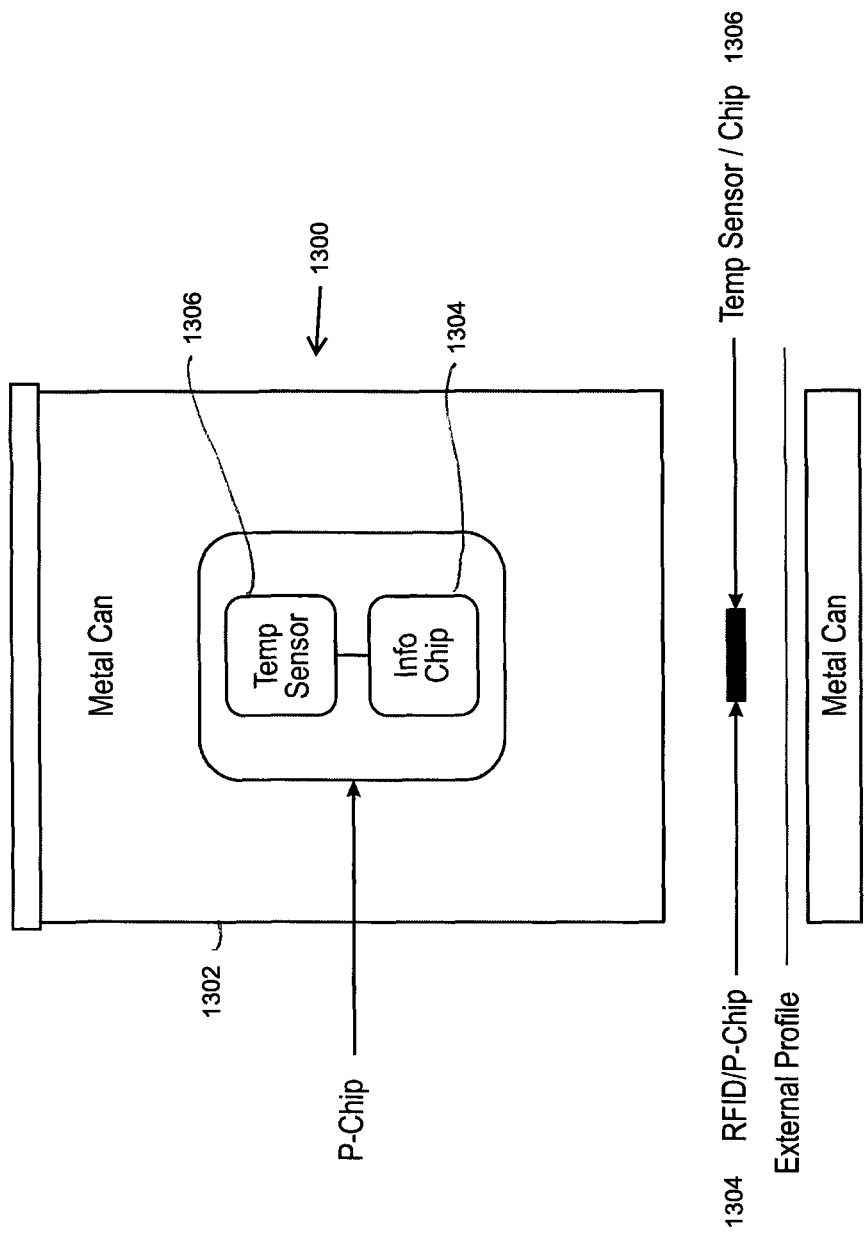
FIG. 13 illustrates an example smart package with a side mounted NFC tag that can wrap all the way around the package, which may be a metal can.

FIG. 13 is an illustration of an example package configuration 1300 that may comprise a metal can 1302 and a side mounted NFC tag 1304 that may be provided as a label or other element that may wrap all the way around a metal can 1302 included as part of the package. As will be understood, the NFC tag coil may be printed on a package label during a printing operation. In the case of an LEM, the LEM may be attached to the label with adhesive or embedded therein during a printing or manufacturing operation. A temperature sensor 1306 may be included.

Figure 14:
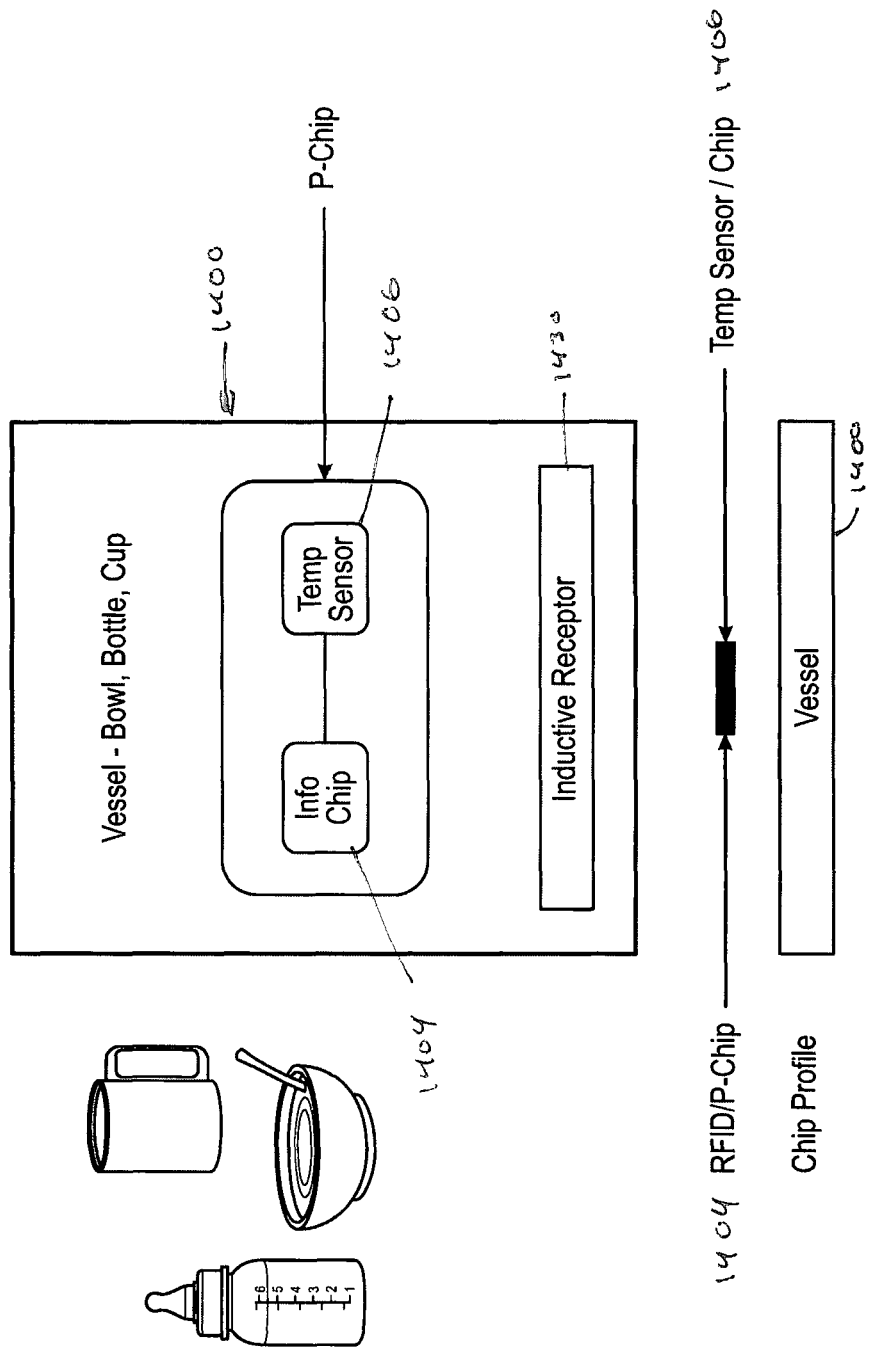
FIG. 14 illustrates an example smart package that has a receptor and smart sensor built into the vessel.

FIG. 14 illustrates an example smart vessel 1400 such as a coffee cup, baby bottle or bowl that may have a receptor 1430, smart sensor 1404 and temperature sensor 1406 built into the vessel, such as by molding therein. The vessel may be a cup, bowl, baby bottle or other cooking or heating vessel. The receptor 1430 may be a discrete component or may be a layer of silver thin-film or a foil laminate on the vessel 1400.

Figure 15:
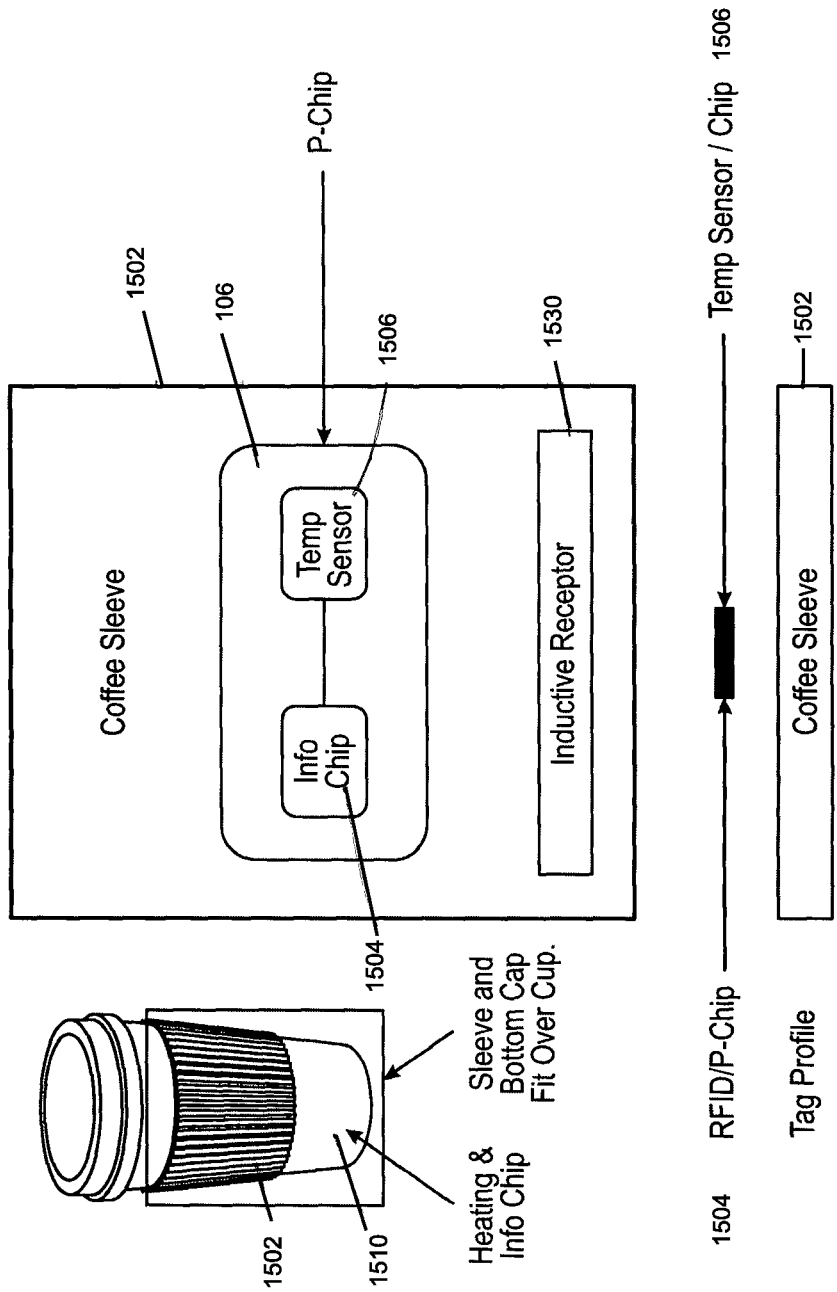
FIG. 15 illustrates an example reusable smart package that may include a smart cup sleeve for insulating and/or heating.

FIG. 15 is an illustration of another package configuration in the form of a reusable insulating an heating sleeve 1502 which may be provided with PICM 106, including an information chip 1504 and temperature sensor 1506. The sleeve may include an inductive element, such as a metallic or foil element to provide heat. Alternatively, the lower area of the cup 1510 may include an outer wrap that may have inductive heating capabilities. The insulating outer sleeve serves is a grip and as an outer surface for the portable heating sleeve.

Figure 16:
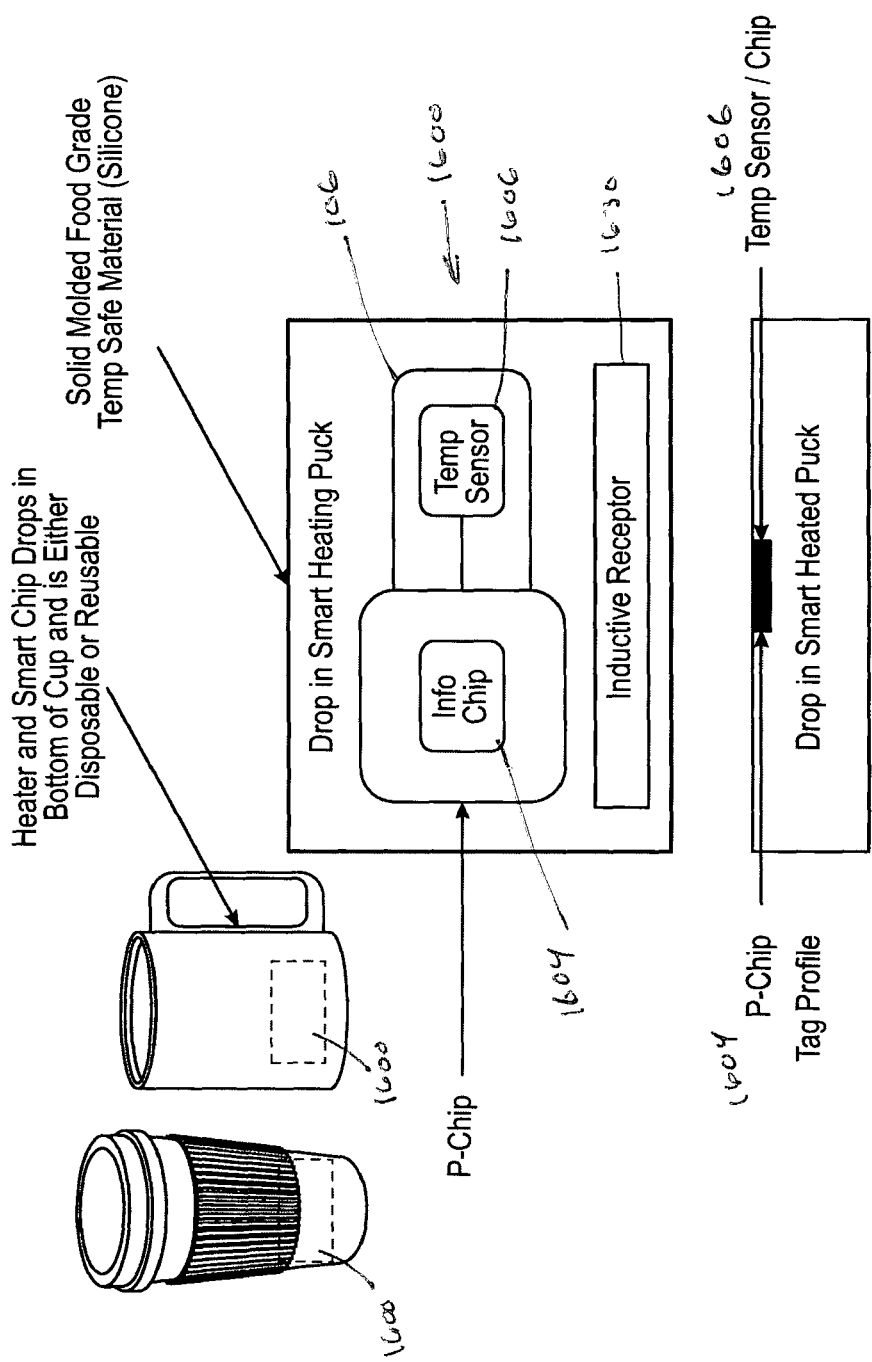
FIG. 16 illustrates an example smart package that utilizes the heating puck that may be dropped into the contents of the package for intelligent heating.

FIG. 16 is an illustration of smart, standalone inductive receptor 1600 that may be in the form of a puck that may be utilized in any type of package for smart heating operations. The puck may include an inductive receptor 1630, PICM 106 with information chip 1604 and temperature sensor 1606 all sealed inside of the puck to avoid contamination or contact with the heated product. Receptor 1630 may be located near outer surfaces of the puck to improve heat transfer to the surrounding liquid or product. The puck may be inserted directly into liquid contained in a package to be heated. The puck may have an annular construction or any configuration that maximizes surface exposure to the liquid contained in the package. The receptor may include silicone to seal and bond components together in a sealed package including the NFC tag and temperature sensor and other electronics.

Figure 17:
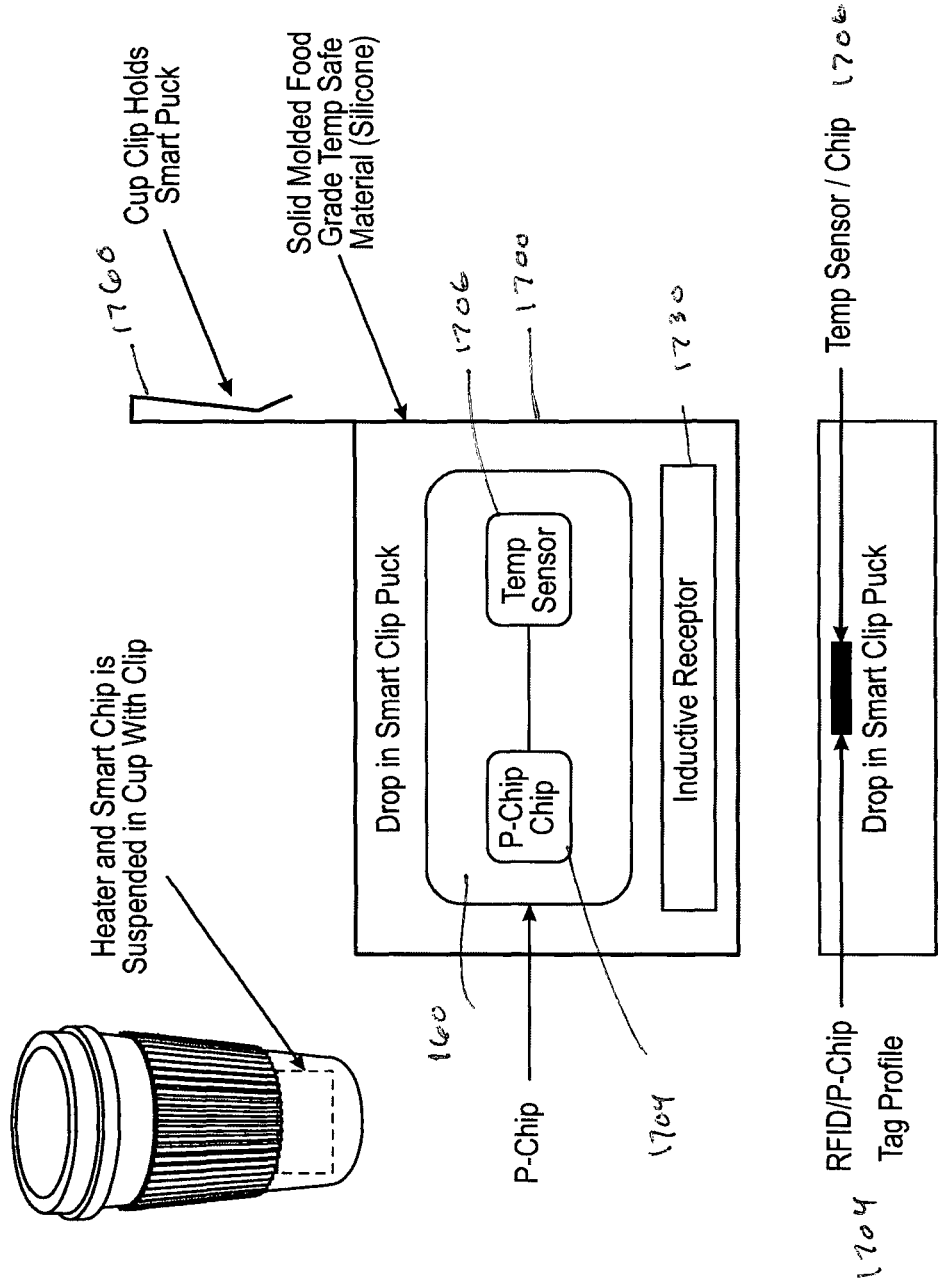
FIG. 17 illustrates another example heating puck with a clip for connection to the side of a container.

FIG. 17 illustrates a further adaptation of the standalone puck of FIG. 16. The puck 1700 may include a clip 1760 to suspend the puck 1700 from the side of the container at an appropriate location within the liquid or product contained therein. Clip 1760 and puck 1700 may be integrally molded from a food grade, high temperature resistant material, such as silicone.

Figure 18:
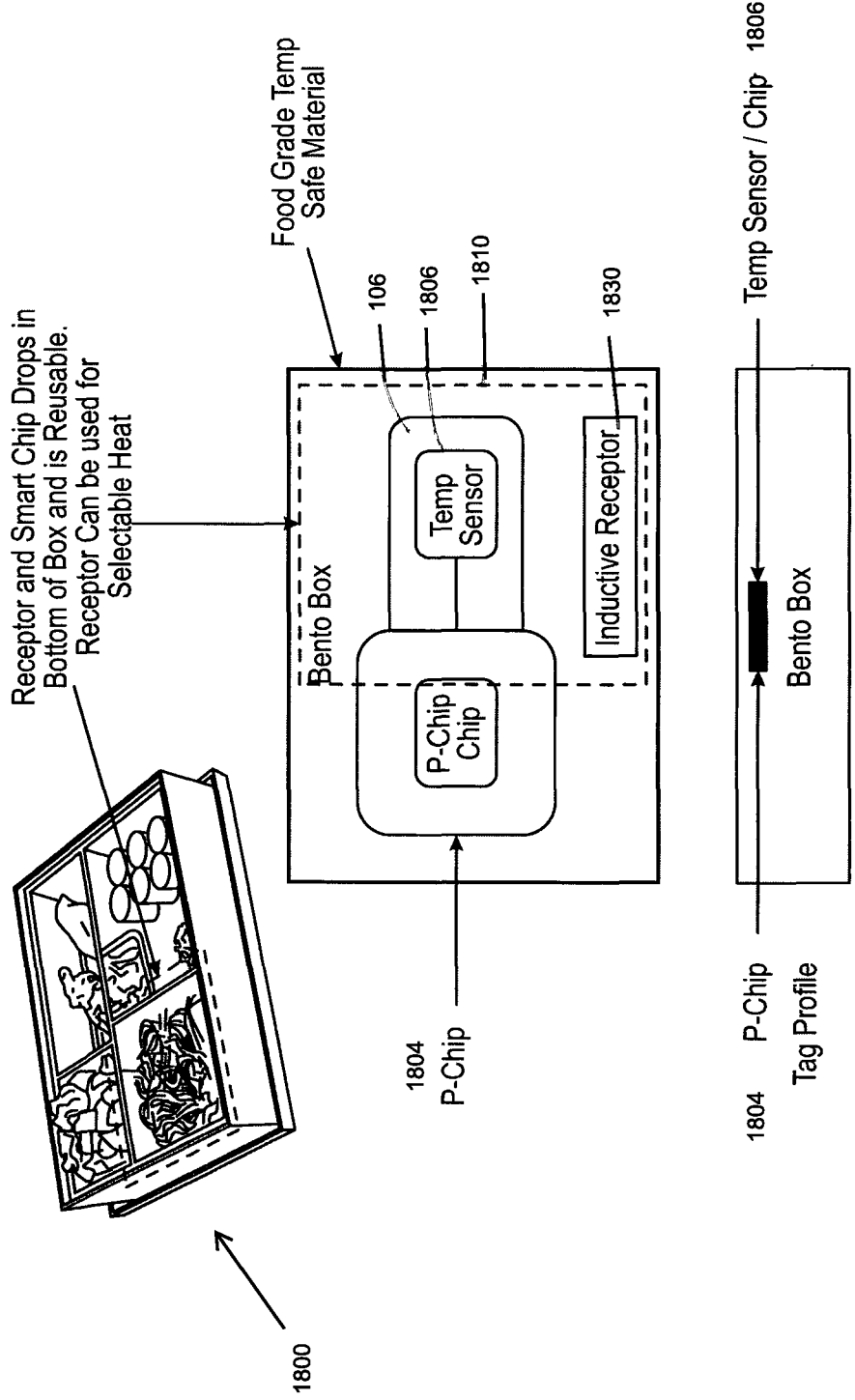
FIG. 18 illustrates another example smart package in the form of a Bento box or compartmentalized tray.

FIG. 18 is an illustration of a smart package configuration including a drop-in portable receptor 1810 that may be used to heat several different sections of a compartmentalized or Bento box 1800. The drop-in portable receptor 1810 may include an LEM or NFC tag and temperature sensor molded therein and may be made of a food grade high temperature material such as silicone and may be used for selectable heating of different compartments on the box. The receptor 1810 may be a standalone receptor that may be inserted into different sections of the box to heat different food portions differently.

Figure 19:
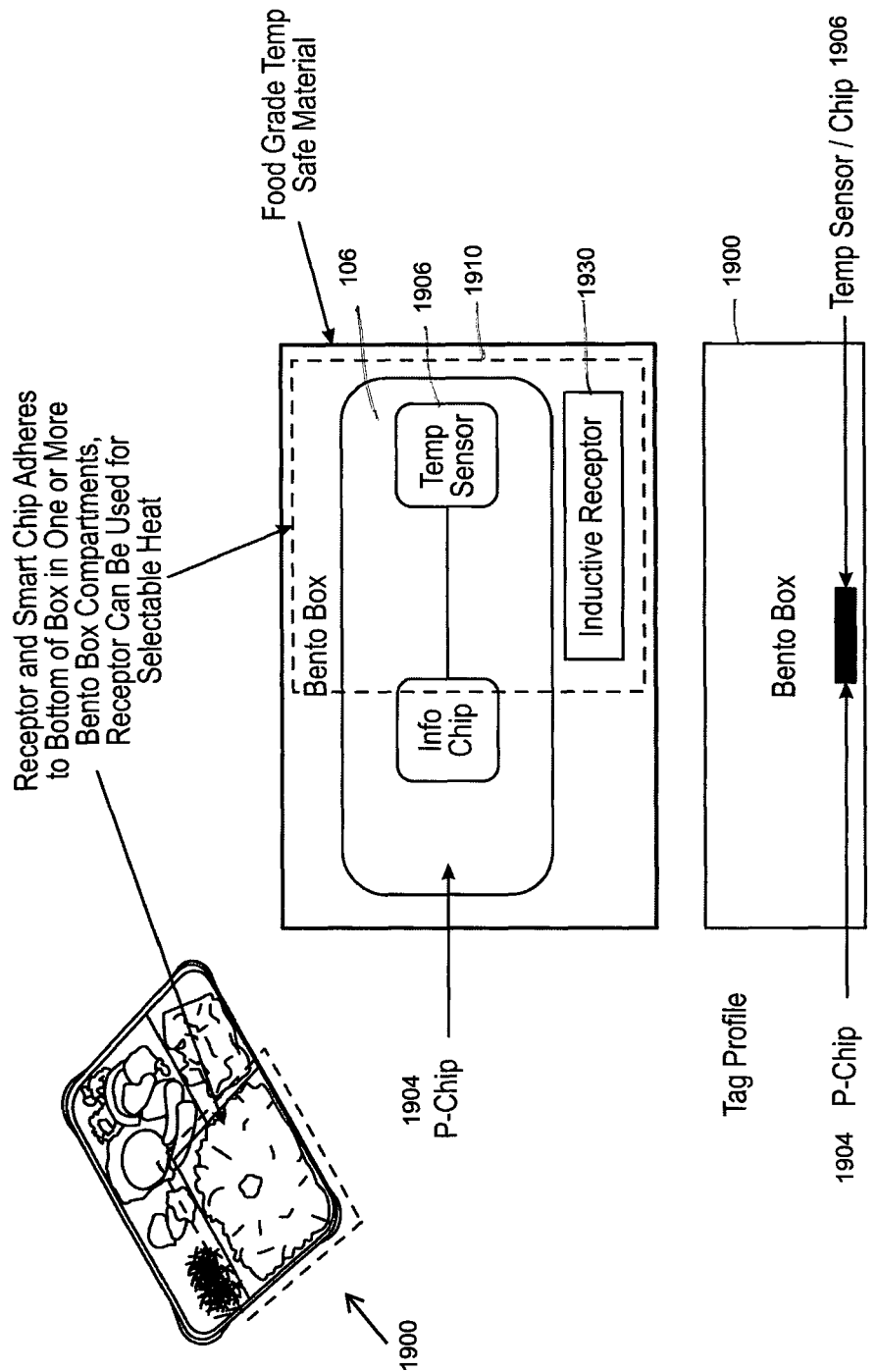
FIG. 19 illustrates another example smart package in the form of a compartmentalized tray.

FIG. 19 is an illustration of another smart package configuration including a compartmentalized or Bento box 1900. In this example, one or more compartments can be heated as desired. The receptor 1930 and PICM 106 may be adhered to the bottom of the box in one or more compartments. Alternatively, separate receptors 1930 may be used in each section.

Figure 20:
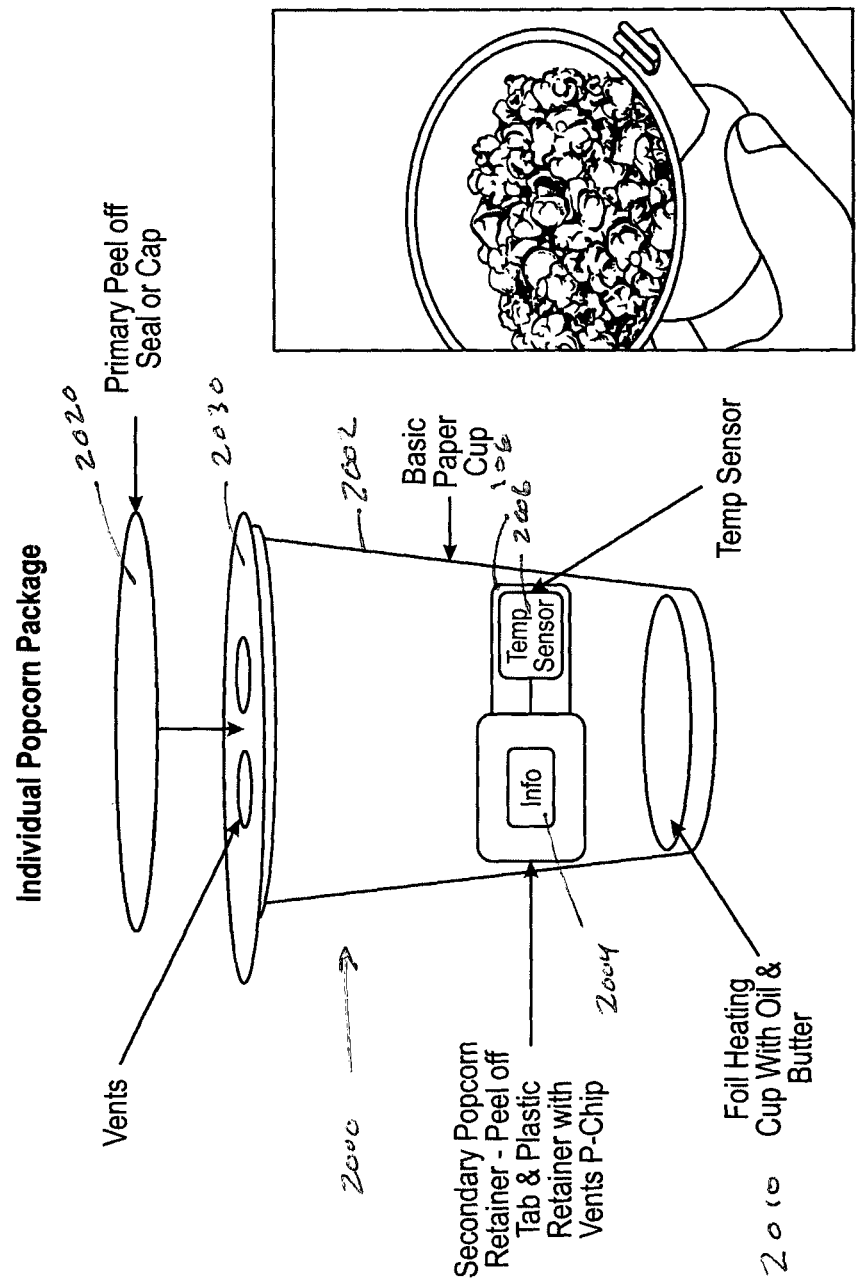
FIG. 20 illustrates an example smart package in the form of a popcorn cup with a peel-off lid and secondary peel-off vent.

FIG. 20 is an illustration of an example smart package configuration in the form of a smart popcorn package 2000. The package 2000 may comprise a cup container or bucket container 2002 made of a paper material. The cup 2002 may be provided with a foil peel off sealed lid 2020 as well as a secondary sealed peel off adhesive vent layer 2030, both of which included tab for permitting and user grip them. The cup may include a foil heating container 2010 disposed at the bottom of the cup 2002 for containing oil and/or butter as well as popcorn kernels. The PICM 106 may be disposed on the interior of the container and may include a temperature sensor to support smart heating of the container and control and monitoring of the heating operation as the popcorn is prepared.

Figure 21:
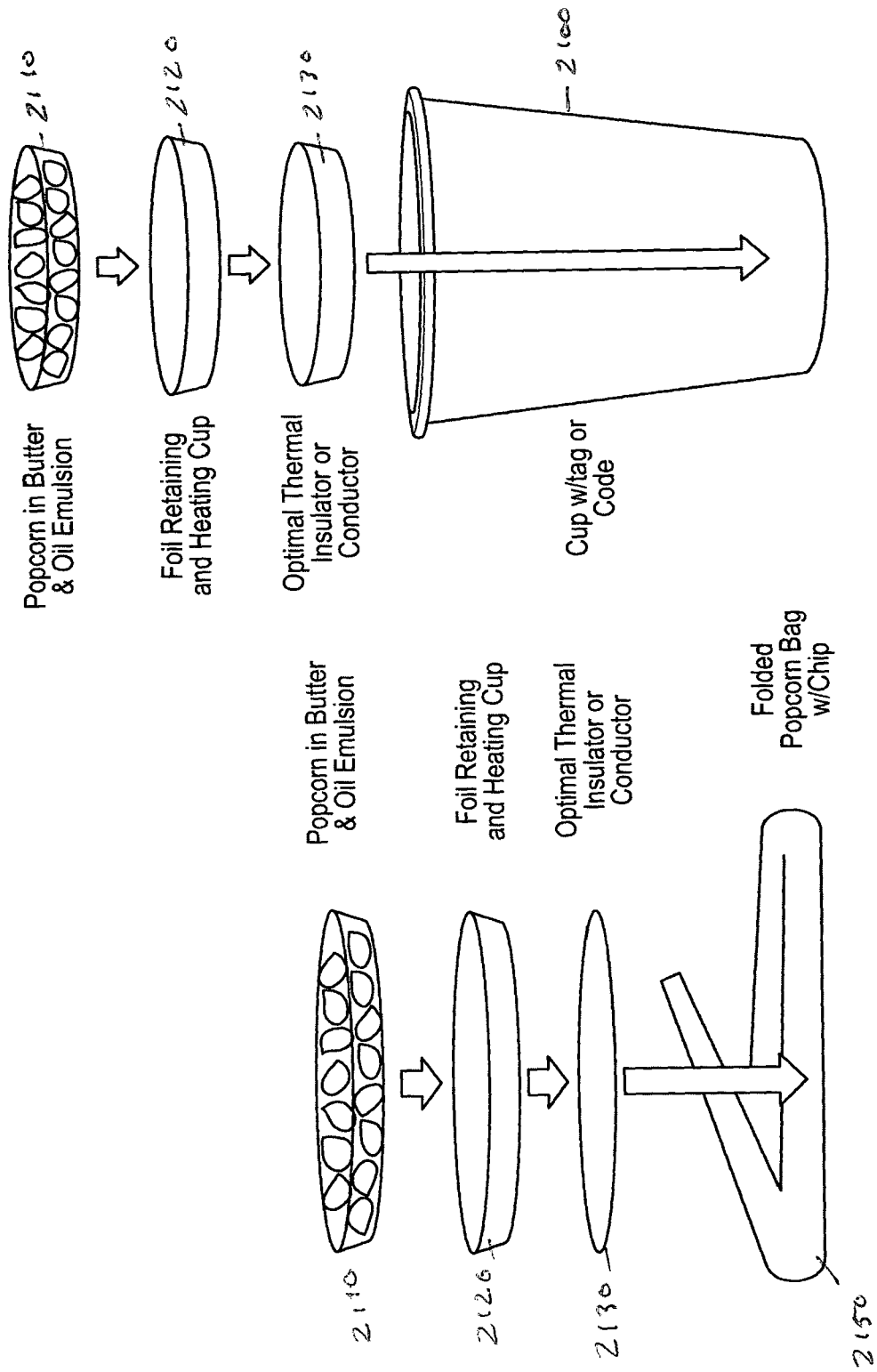
FIG. 21 includes exploded views of a smart packages in the form of a popcorn bag and a personalized cup.

FIG. 21 is an exploded view of internal components and ingredients that may be included in the smart popcorn package configuration of FIG. 20. These may include a top layer of popcorn kernels 2110 in a butter or oil emulsion or paste, which is disposed above or inside a foil retaining and heating cup 2120, which is disposed above or in a thermal insulator or conductor layer 2130. It should be noted that the heating material may be corrugated or have facets or support legs that limit the thermal contact to the outer packaging or insulating material shown in FIG. 21, these layers may be provided in a folded popcorn bag 2150 or in a personalized cup or bucket container 2100, each of which is provided with PICM for facilitating a smart heating operation of the package.

Figure 22:
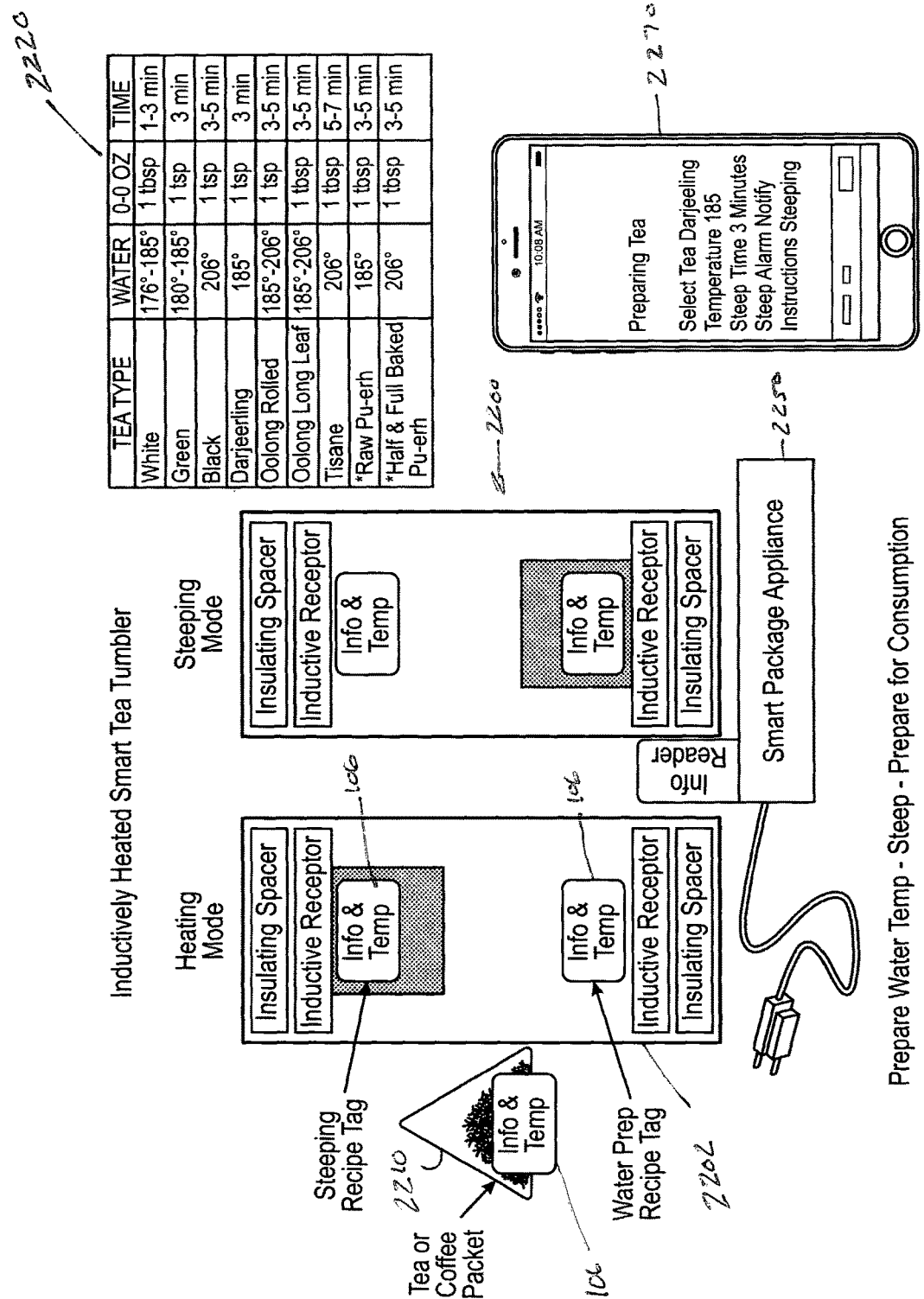
FIG. 22 illustrates an example smart package in the form of a coffee or tea maker.

FIG. 22 shows further details of the smart tumbler 2200 described above relative to FIG. 5 and FIG. 6. This may be a smart coffee/tea maker with two smart heated ends with a custom tea/coffee package 2210 equipped with a PICM. This figure shows a package strainer 2210 for loose-leaf tea or ground coffee, and a tea/coffee package for premade coffee/tea. The mobile device may communicate with the smart package appliance and may set the parameters for heating based on pre-determined parameters and/or user preference. In the case of using an NFC tag and temperature sensor enabled coffee/tea package, the package will automatically communicate with and engage the smart package appliance and mobile device to initiate and control specific heating parameters. The mobile device 2270 includes controls that indicate to the user when it is time to turn the device upside down to remove the coffee or tea from the heated water, and the other heated end of the bottle will maintain the desired, user specified temperature while they consume the contents. Data 2220 may be utilized in the heating operation to automatically select preparation and heating parameters based on a selected product.

Figure 23:
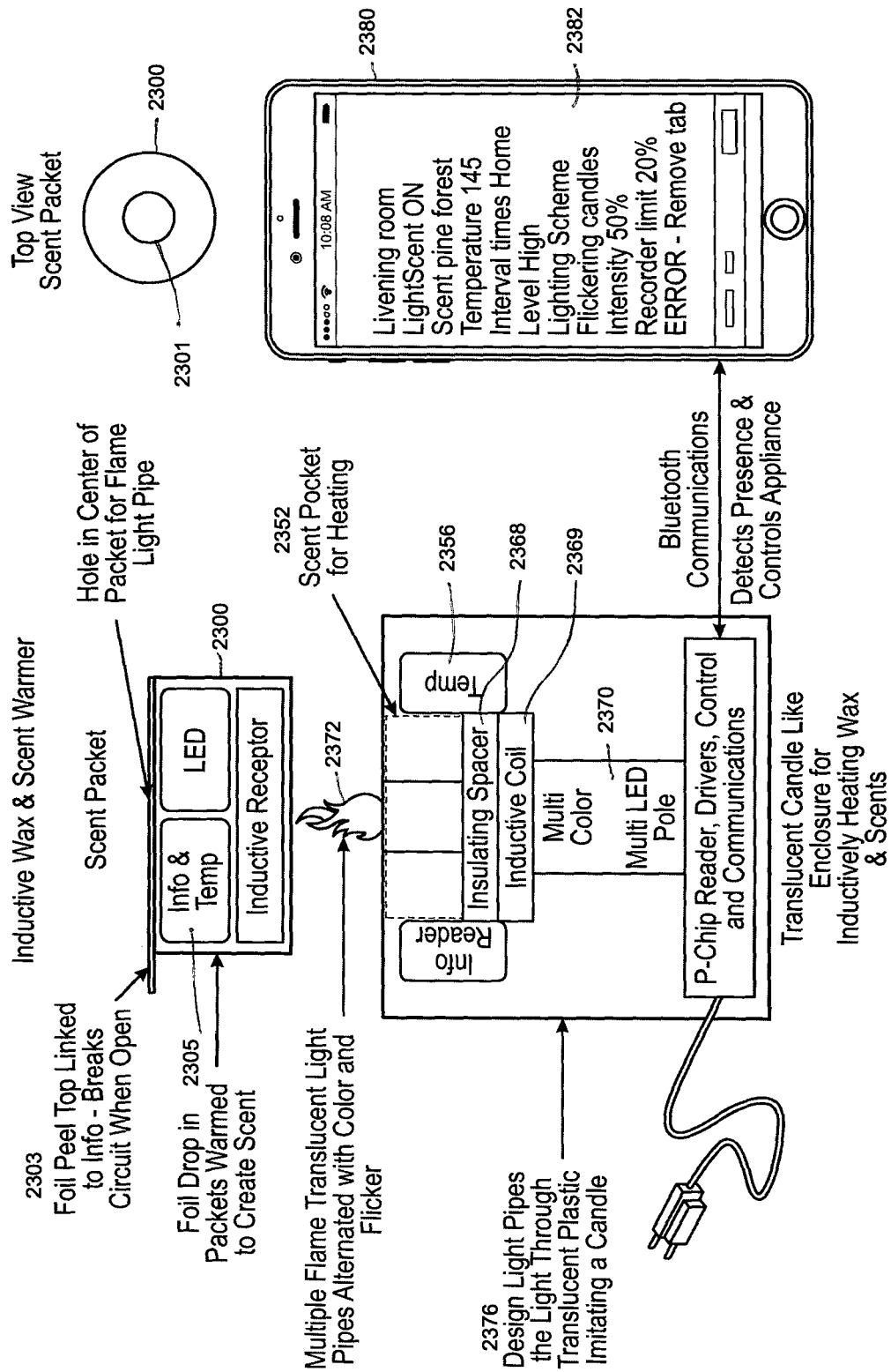
FIG. 23 illustrates an example smart package in the form of the candle or wax package as well as an appliance for simulating a candle.

FIG. 23 illustrates another appliance configuration that may simulate a candle for heating scented waxes and aromatic products. In this case, the smart package 2300 may be in the form of a circular or disk-shaped foil scent packet or wax melt package having an annular shape with a central hole 2301 for receiving a visual effect 2372 projecting from the appliance. The contents may be sealed with a peel off top 2303. A PICM may include an information tag, such as a P-chip, and temperature sensor 2305 within the package 2300, as well as an inductive receptor 2302. Appliance 2350 may include a package receiving recess or pocket 2352 shaped to receive the form of package 2300. A tag reader 2354, which may be a P-chip reader, and temperature sensor 2356 may be disposed near the pocket 2352 to read the package tag and sense the temperature of the appliance. An insulating spacer 2368 and inductive coil 2369 may be controlled with components similar to those in FIG. 1. Multicolor LED lighting 2370 may be included for visual effect and a translucent outer package casing 2376 enables viewing of the internal lighting effects. Light pipes 2372 may convey the light from LED lighting 2370 to the outer package casing 2376. A mobile device 2380 may be configured to use for control and reordering of product. An application may interface with the control components on the appliance 2350 and may provide a visual display 2382 indicating a particular room (Living Room), an appliance status (LightScent ON); a type of scent (Pine Forest); a heating temperature (145 F); an interval parameter; a scent level indicator; a lighting scheme indicator (flickering candles); an intensity level (50%); a limit for automatic reordering (20%); and an error field for indicating errors (i.e., Remove Lid/Tab).

Figure 24:
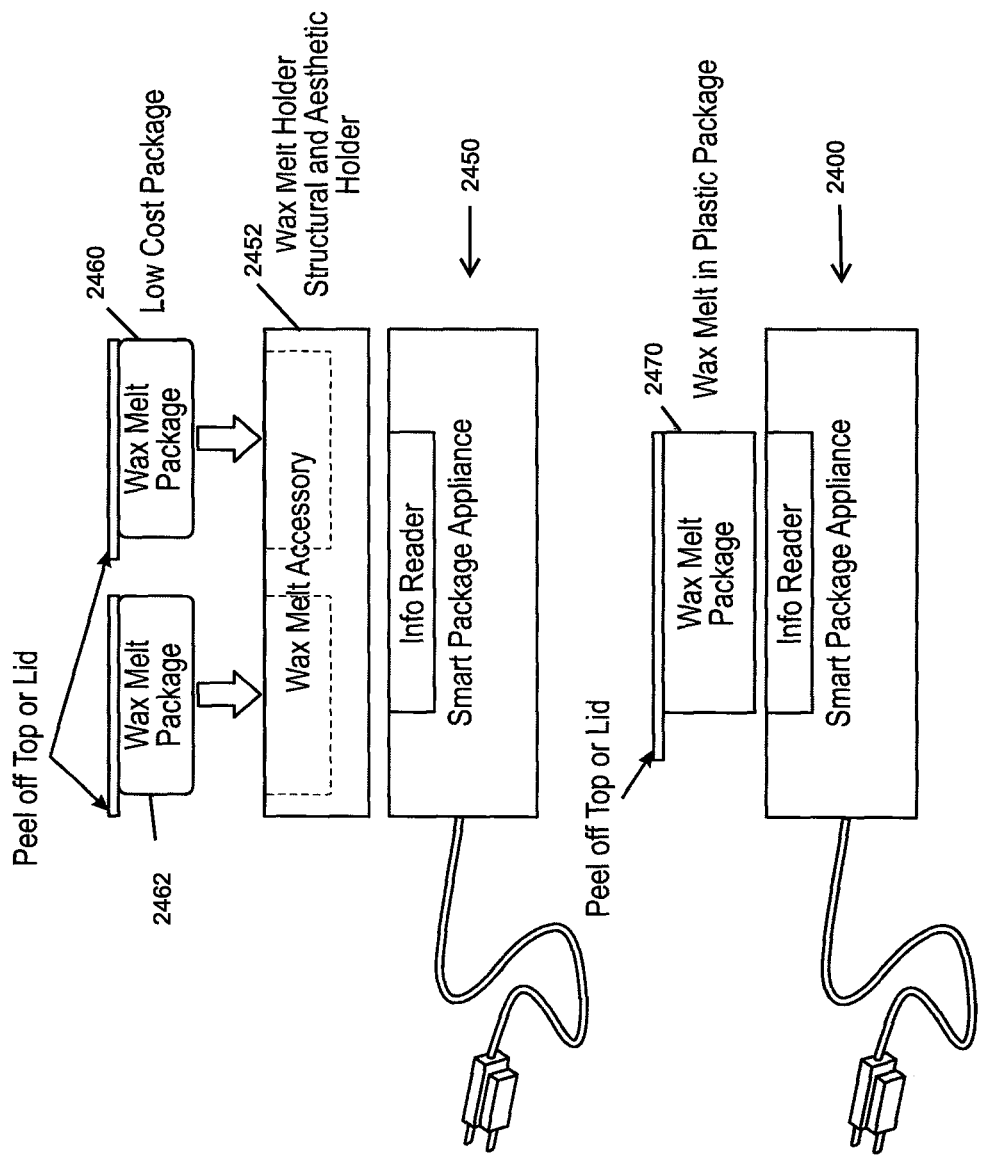
FIG. 24 illustrates two additional example wax package configurations and appliances.

FIG. 24 illustrates additional appliance configurations 2400 and 2450 according to an aspect of the disclosure. In these configurations, the wax melt packages 2470 and 2472 may be made without a discrete inductive receptor and instead metallic components on the package may function to inductively heat the contents. Although not illustrated in this Figure, NFC tags and temperature sensors may be included in the packages and in communication with the appliance reader for increased control of heating and safety operations. The packages may be made of paper or plastic components and a metalized liner or foil added to the package structure to function as an inductive receptor. Appliance 2400 is configured to receive and heat a single package. Appliance 2450 is configured with an adapter 2452 to receive multiple packages 2460 and 2462 in respective recesses in the adapter. Adapter 2452 may include aesthetic features to simulate the appearance of a candle or other item. As will be recognized, with the package configuration 2450, adapter may include inductive heating receptors for each package to save costs such that the wax melt packages 2460 and 1262 can be made from low cost materials that do not necessarily have to function as inductive heating components. As will also be recognized, each of the multiple packages can include a PICM for separate interaction with an information reader and control elements on the smart package appliance 2450 as described above relative to FIG. 1. The mobile device can be used for control and reordering.

According to an aspect of the disclosure, wax containing packages may include waxes with a higher melting point than attainable in the prior art. Controlling the level of heating directed at the Smart Melt package, where it receives more heat to start the initial melt and then reduces the heat to maintain the liquid state, may allow for the use of a higher melt point wax and eliminate the need for temperature controlled shipping while maintaining safe operation through the entire heating cycle.

Figure 25:
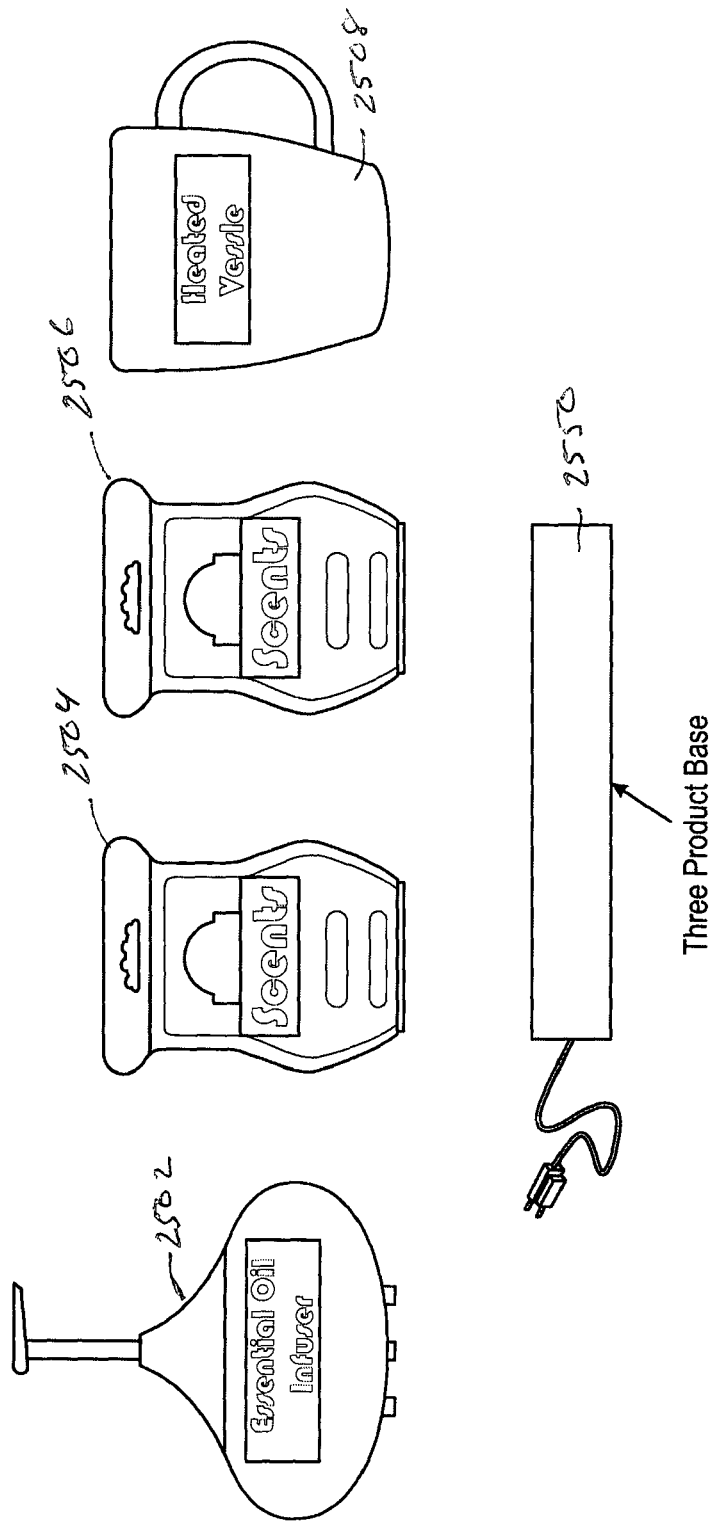
FIG. 25 illustrates four different smart package configurations that may be used with a single smart heating appliance.

FIG. 25 illustrates different package configurations that may be utilized with an appliance that has three spots for heating multiple products. These package configurations may include an oil diffuser package 2502, a first heatable scent package 2504, a second heatable scent package 2506 and a heated vessel 2508, such as a novelty gift or coffee cup. It will be understood that one or more tag readers may be disposed in a base in an appliance 2550 and may interact with PICM elements (not shown) on each of the package configurations.

Figure 26:
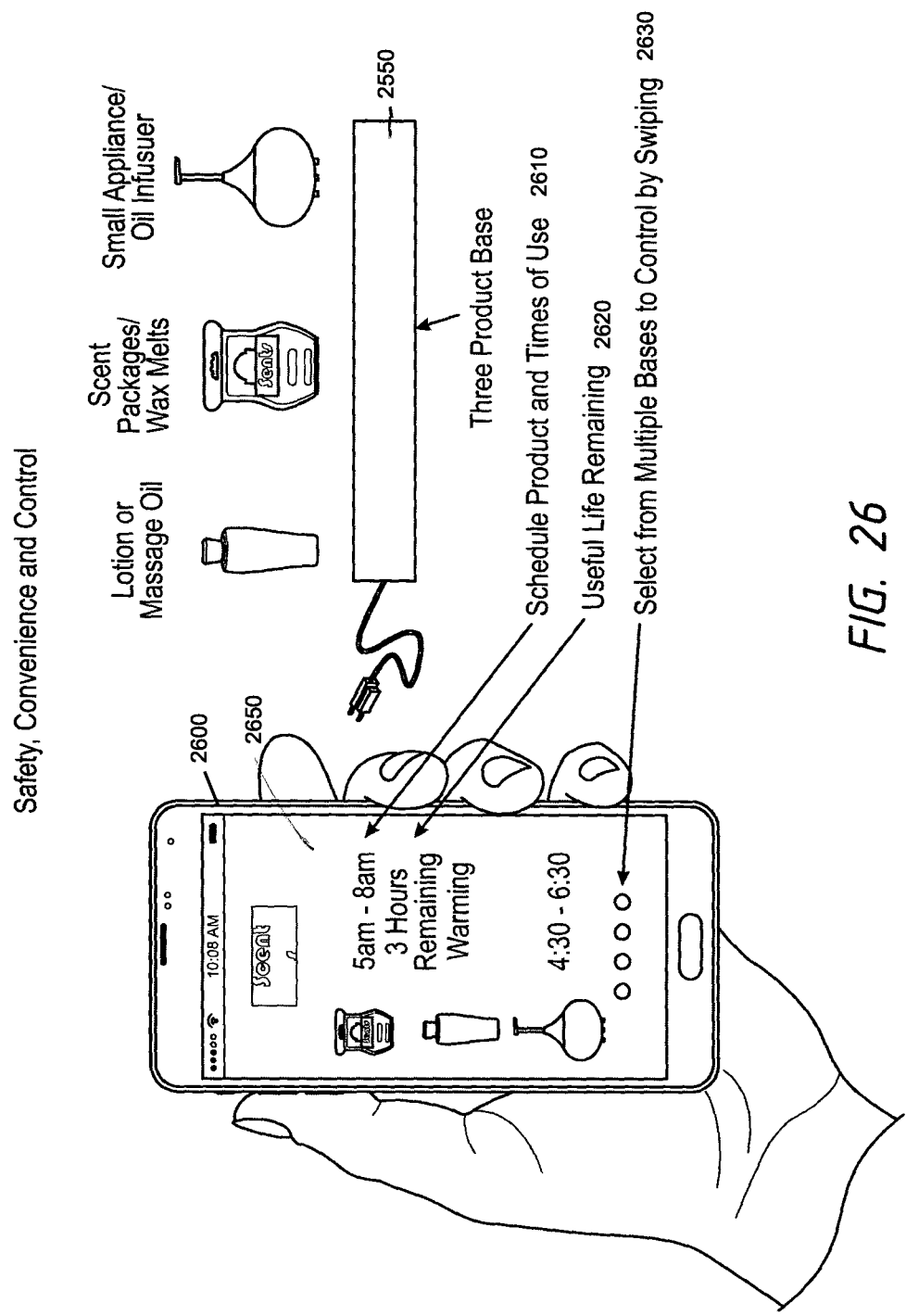
FIG. 26 illustrates a mobile device and example mobile application and user interface for monitoring and controlling heating of a number of different smart packages.

FIG. 26 shows an example smart device 2600 with a mobile application and interface including a display 2650 for permitting a user to interface with appliance 2550 and smart packages being used with the appliance 2550. The user interface may include controls for scheduling product and times of use 2610, indicators for remaining useful life 2620 and a control for selecting one or more bases 2630 to control. The application and smart device may provide for controlling times for heating different products or packages, and the ability to select from multiple smart packaging appliances to control.

Figure 27:
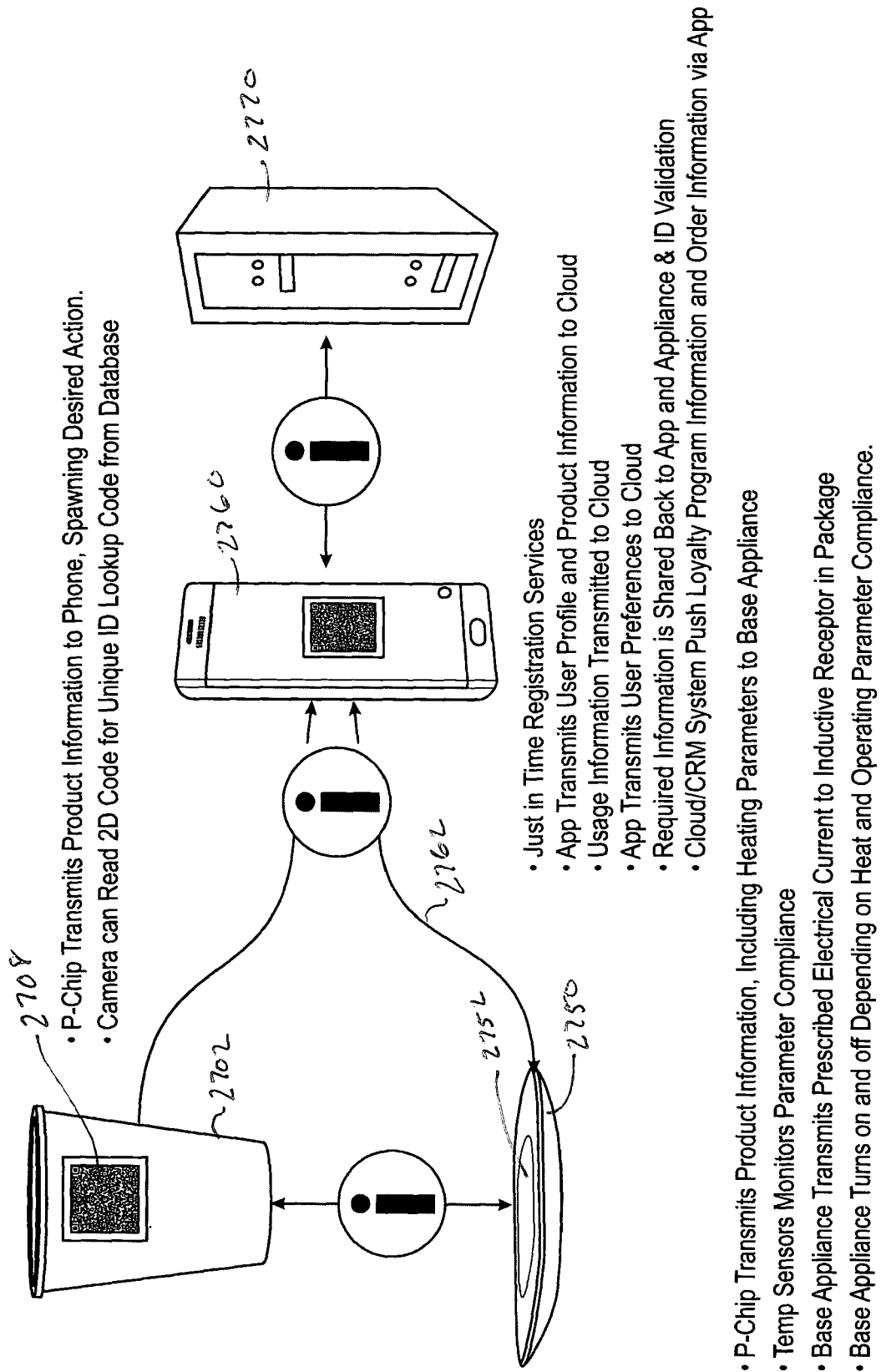
FIG. 27 illustrates an example information exchange scheme for use with smart packages.

FIG. 27 illustrates a P-chip or LEM equipped package 2702 as well as example information exchange configurations according to aspects of the disclosure. Appliance 2750 may include a circular recess 2752 which receives a circular cup 2702 or other circular container. A P-chip transponder 2704 may be located centrally within the base of the cup 2702. A light source, such as a laser may be located in the appliance 2750 and positioned to deliver light to the centrally located P-chip to power it. Data may be read from the transponder to identify the product, packaging and other relevant information. The P-chip may thus convey information to the appliance 2750, which in turn may convey information to a mobile device 2760 via wireless link 2762. The package may alternatively or in addition be provided with a 2-dimensional code 2708 which may be read by a camera on the mobile device 2760 in order to identify the unique ID of the product which may be stored in a cloud database and retrieved. Mobile device 2760 may retrieve information from and send information to a remote server 2770. This information exchange configuration may provide just-in-time registration services for products and users. The mobile device application may transmit a user profile and product information to the cloud. Usage information may also be transmitted to the cloud. User preferences may also be transmitted to the cloud. Required information may be shared back to the application and to the appliance 2750. Identification and validation of packages may also be provided using this information exchange configuration, as will be explained. Cloud based customer relationship management (CRM) systems may send loyalty information to users and may convey order or re-order information.

Figure 28:
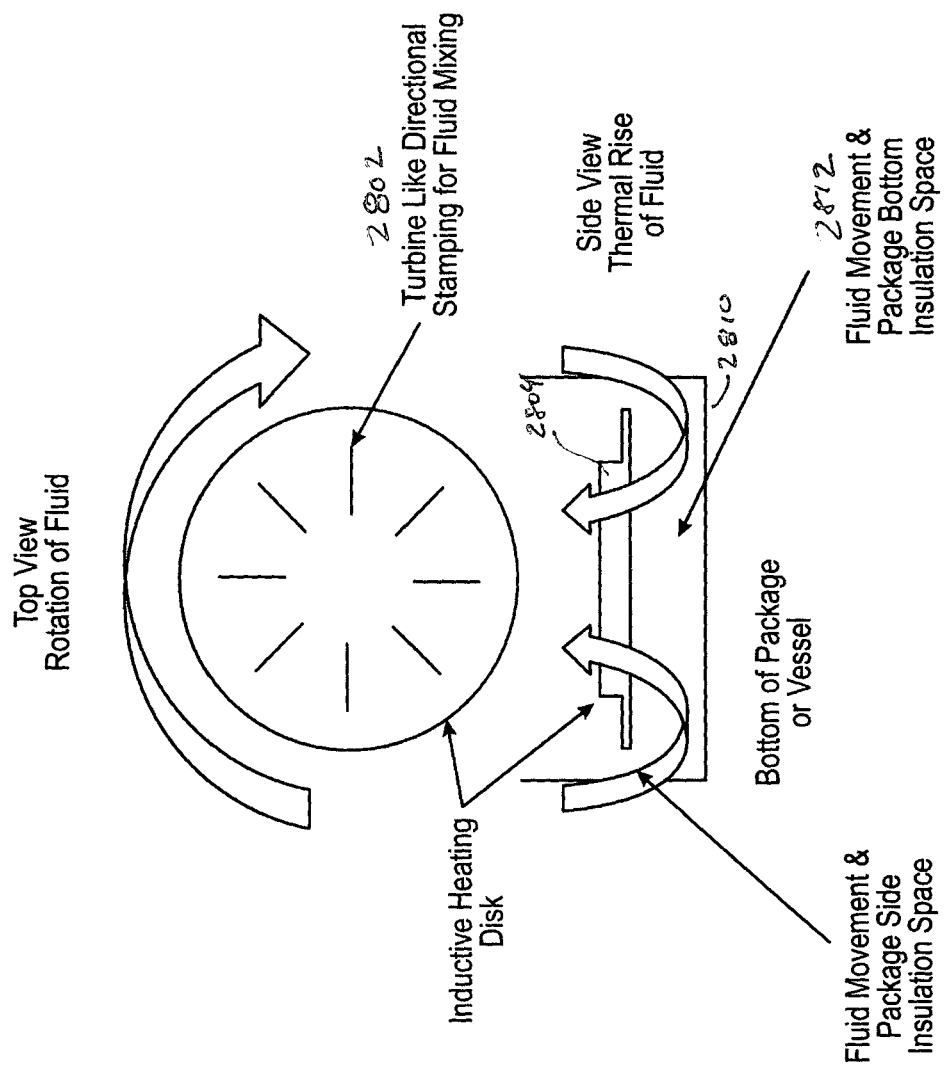
FIG. 28 illustrates and example coated metal stamping for directing fluid and stirring fluid contents in a smart package configuration.

FIG. 28 illustrates a top and side view of an example coated turbine-like metal stamping inductive receptor 2802 that may be used with package configurations according to aspects of the disclosure. The stamping may function as an inductive receptor itself. The stamping may further include an inductive base disk portion 2804. The stamping may be provided with one or more slots that may impart rotational motion to the heated fluid as it rises through the stamping to facilitate improved mixing and heat distribution. The inductive receptor 2802 may be stationary or may be mounted for rotational movement on a central pivot or raised portion of the bottom of the package, such as the apex of a cone-shaped package bottom wall. A lower fluid movement space 2812 may be defined between the receptor 2802 and the container bottom wall 2810. The receptor outer diameter may be chosen to define an annular insulation and/or fluid movement space 2814 between the outer diameter of the disk-shaped receptor and the diameter of the package container in which the receptor is located.

Figure 29:
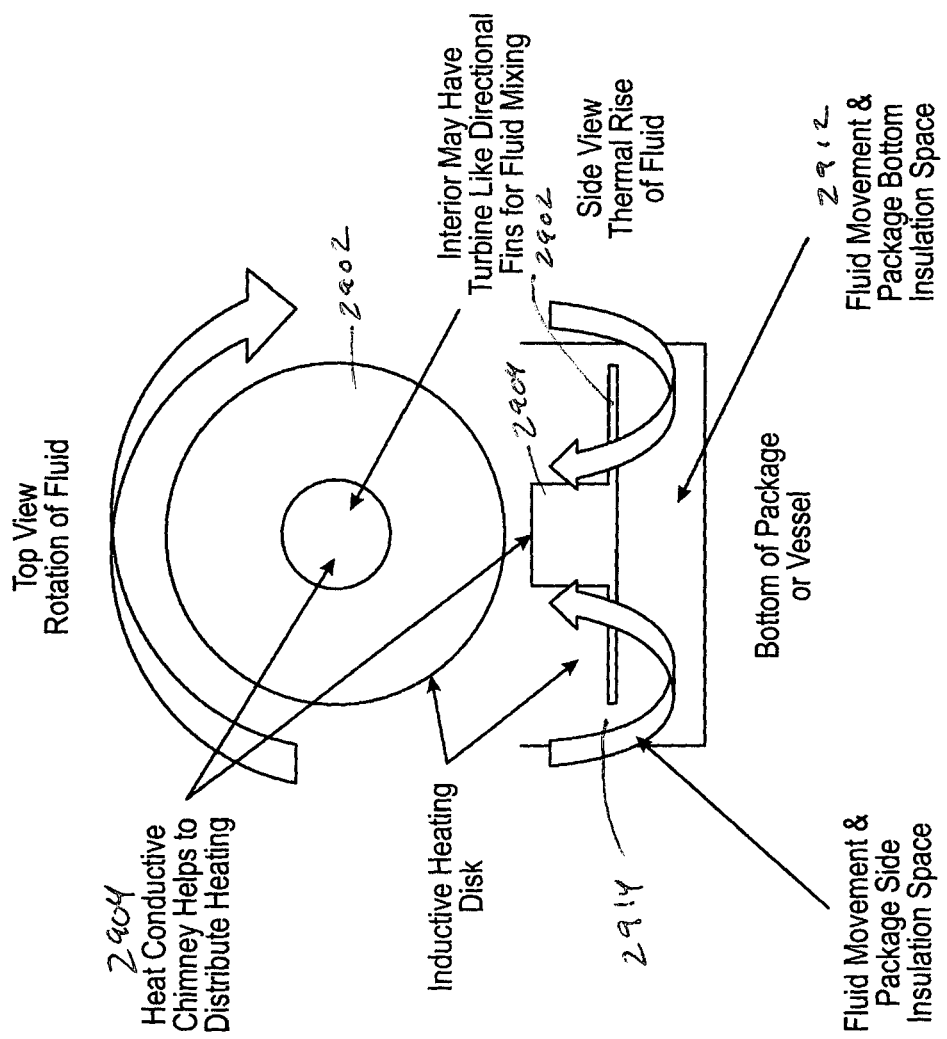
FIG. 29 illustrates another example of a metal stamping that includes a chimney or internal tube for directing fluid.

FIG. 29 illustrates top and side views of another configuration for an inductive receptor that may be used in packaging configurations according to aspects of the disclosure. The receptor 2902 may have a general disk shape with an inner tube or chimney portion 2904 for directing liquid/fluid upwards or causing conductive and convective heat transfer within the fluid/liquid. Features, such as protrusions or fins may be disposed and control/direct flow or to create turbulence within the tube or chimney portion 2904. An outer annular passage or insulating space 2914 may be defined between the outer diameter of the disk-shaped receptor and the package container wall. A bottom insulating space 2912 may be defined between the lower surface of the receptor and the container bottom wall.

Figure 30:
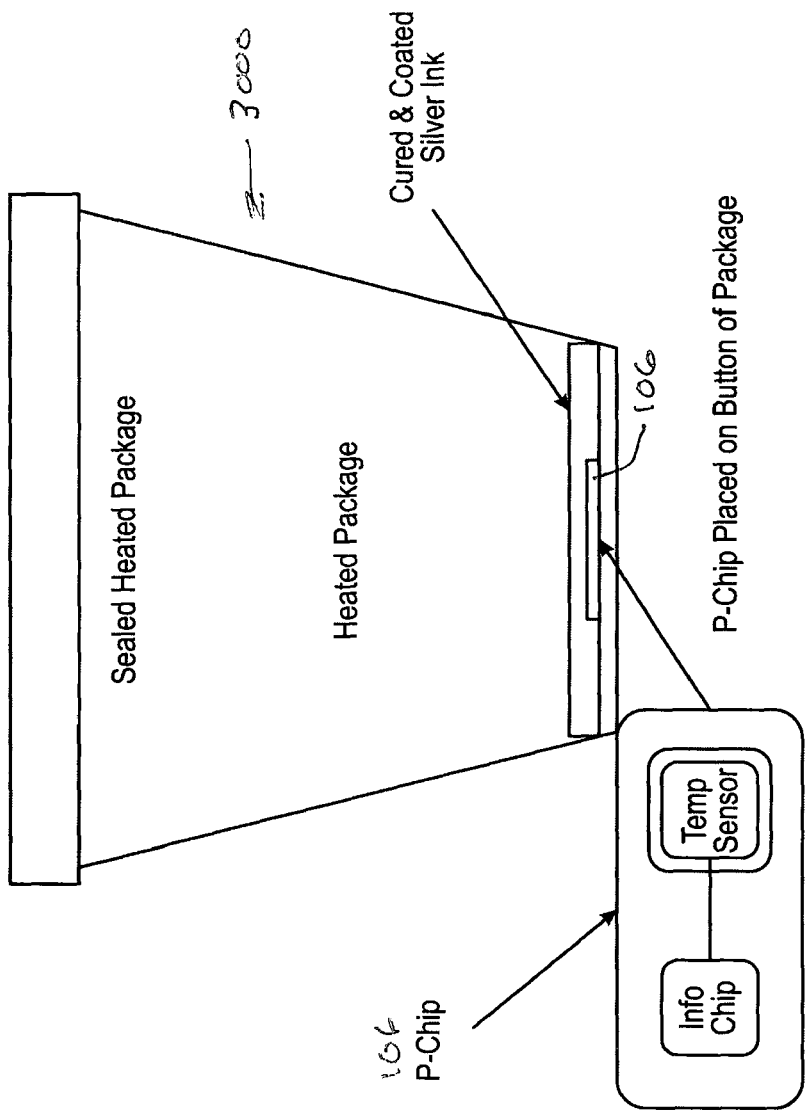
FIG. 30 illustrates an example smart package with tuned materials and which allows an NFC tag to be read from the bottom side in the receptor were to be heated with a lower frequency inductive source.

FIG. 30 is an illustration of an example smart package 3000 with tuned materials that allows the NFC tag 106 to be read from the bottom side and the receptor to be heated from the bottom with a lower frequency inductive source while masking these same materials from microwaves from above. The NFC tag is on the bottom so that the reader may be located in, for example, a carousel that supports the package. The tag is shielded from the conductive materials so that the NFC tag can be read. A cured and coated silver ink may be used.

Figure 31:
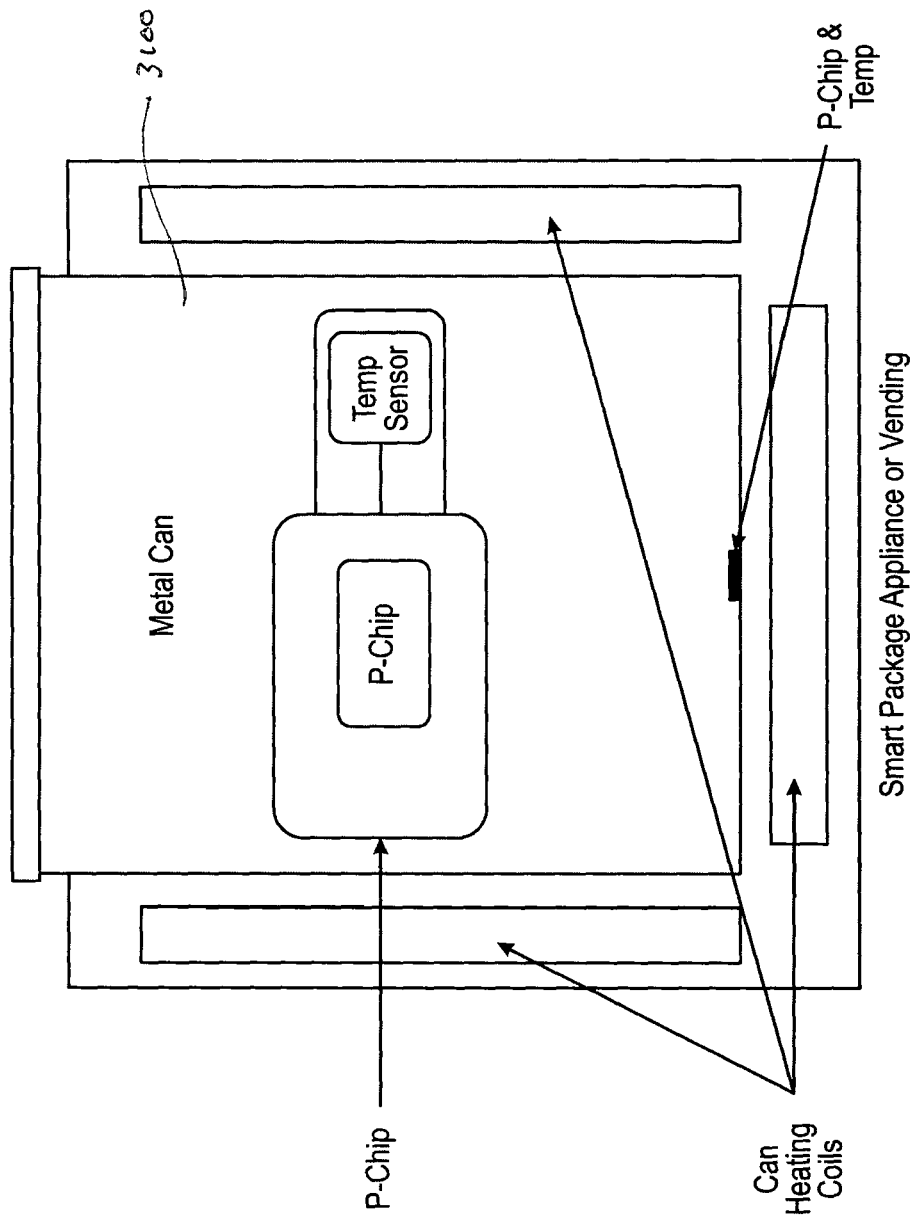
FIG. 31 illustrates the smart package with the metal composition that may be used with a multiple coil appliance for a rapid heating application.

FIG. 31 shows an example package in the form of a metallic can or vessel that may be utilized with an appliance with multiple heating coils or a single coil that may cover a large percentage of the body of the can or vessel. Because the physics of dissipation are greater over more surface area a faster heating can be achieved utilizing a higher surface area with lower overall surface temperatures.

Figure 32:
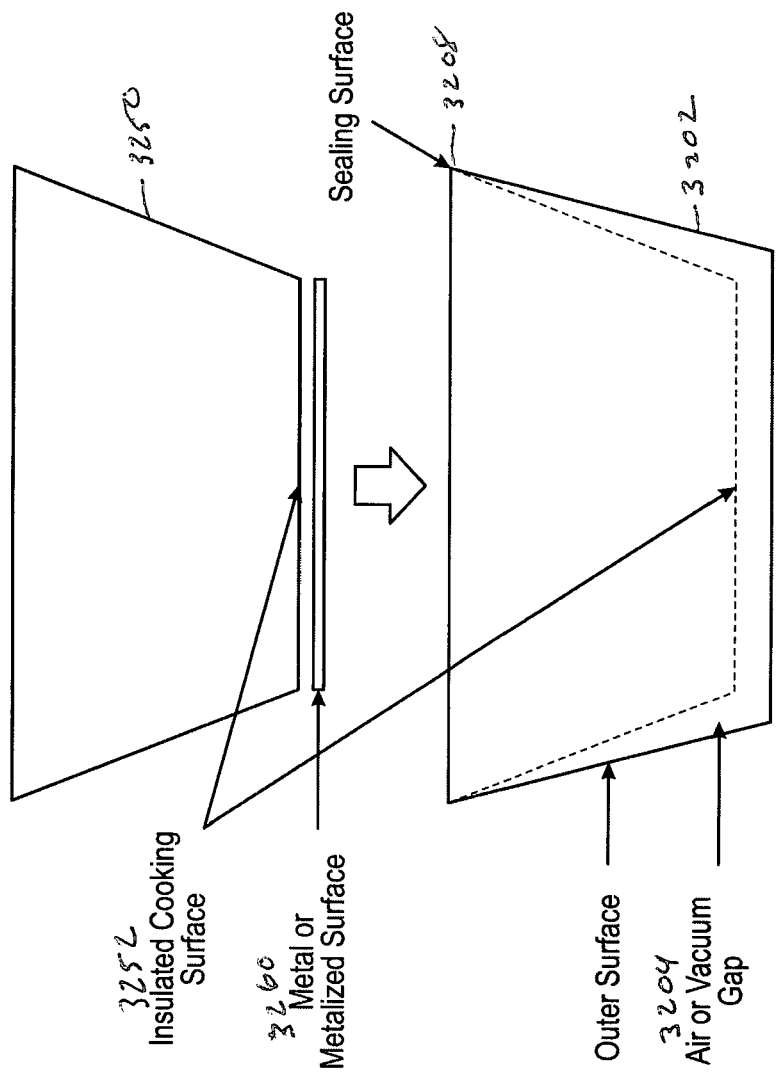
FIG. 32 is an illustration of a package that includes a two-part assembly which defines an internal air or vacuum gap for insulating a cooking surface.

FIG. 32 is an illustration of a package that includes a two-part assembly which defines an internal air or vacuum gap 3204 for insulating a cooking surface 3252. This structure may be advantageous in protecting a user and appliance from the heat of the inductive receptor at the center of the package. This may allow higher temperature materials in cooking to be used without the same exposure to the appliance and user. Such materials may include PYREX®, glass, paper, plastic, PTFE, PET or other materials. An outer container 3202 may include an outer surface and a sealing edge or lip or interlocking ridge 3208 that cooperates with a like component on an inner container 3250 which fits within the outer container 3202. A metal insert 3260 or metallized surface on the inner container 3250 operates as an inductive receptor and may occupy the air or vacuum gap 3204 when the package is assembled. It should be noted that the heating material may be corrugated or have facets that limit the contact to the outer packaging material and may be thermally connected and conducting to the inner surface with heat conducting grease etc. The cooking surface 3252 may be insulated from direct contact with the metal insert 3260 with air or a space in the gap 3204. The metallized surface can be silver ink, foil or a tin plate in the form of a sticker or plate. The plate may also be internal to the inner surface providing even better thermal conduction to the internal product, fluid or food. The liner or gap can also be an insulating material like fiberglass, foams or fibers that are resistant to the heat. Levels of resistance are often used as the control limits for the upper levels.

According to aspects of the disclosure, packaging may include an air space for thermal insulation to permit higher temperature of contents and heating elements without safety risks associated with consumer handling of the package. Corrugated cardboard or higher temperature resistant materials may be used on the interior of the package to insulate outer package surfaces from the heating element and contents.

Figure 33:
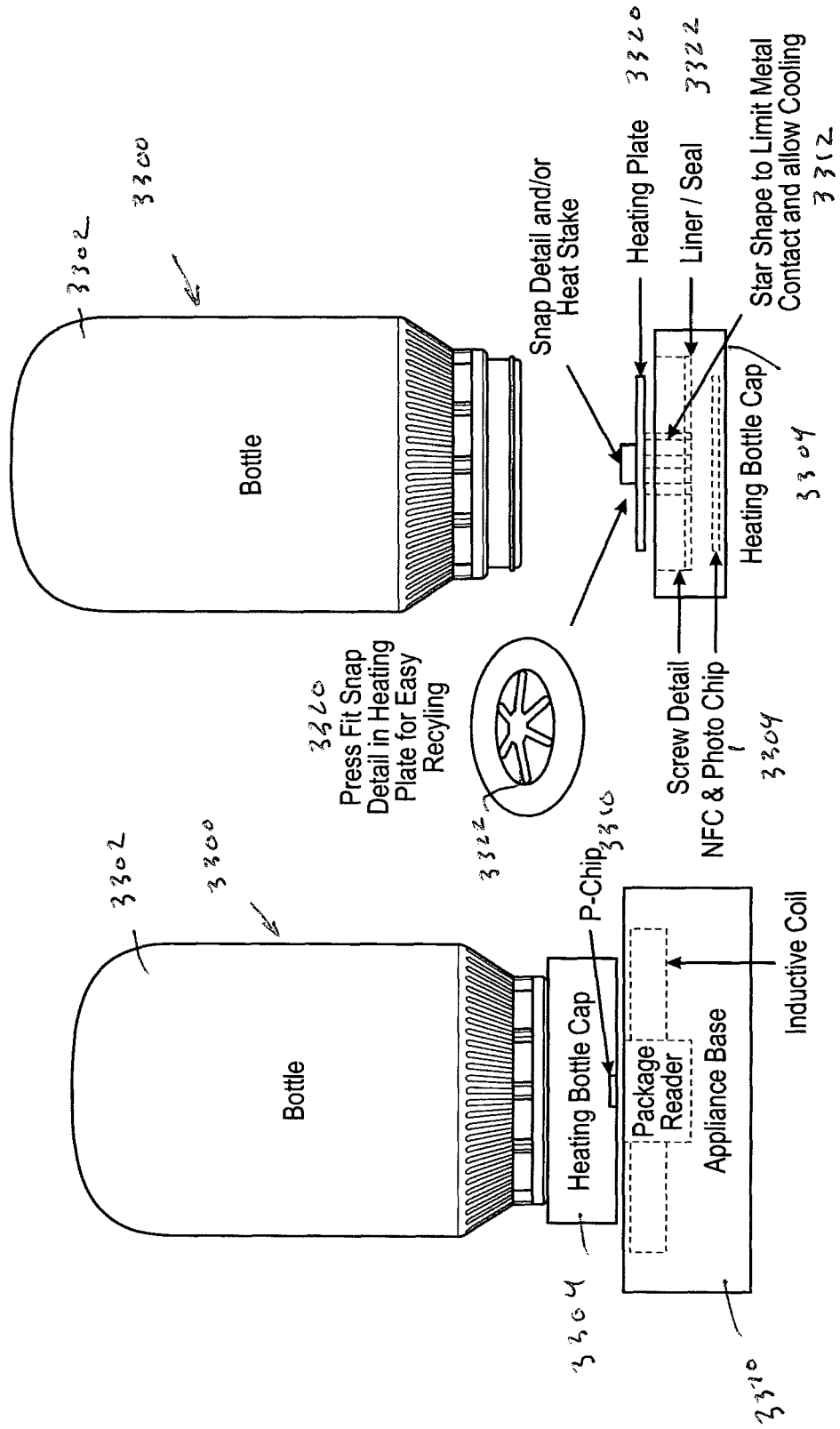
FIG. 33 illustrates an assembled and exploded view of a package that includes a heating cap that may be removably attached to a bottle.

FIG. 33 illustrates an assembled and exploded view of a package 3300 that includes a heating cap that may be removably attached to a bottle 3302 by a threaded or other fastening means such as a snap fit. The bottle cap 3304 may include a P-chip 3310 or NFC tag on a bottom portion thereof. An inductive receptor 3320 may be of a generally circular disk shape with inward projecting tabs 3322 that permit insertion on and securing to a post or stake 3312 that projects from the bottle cap and may be integrally formed therein. The post 3312 may be of a star-shape in cross section to fit complementarily with the inductive receptor 3320. An appliance 3370 may include a package reader for reading the embedded P-chip or NFC tag and an inductive coil for heating the package. A liner or seal 3322 may be included in the cap for sealing engagement with an end of the bottle 3302.

Figure 34:
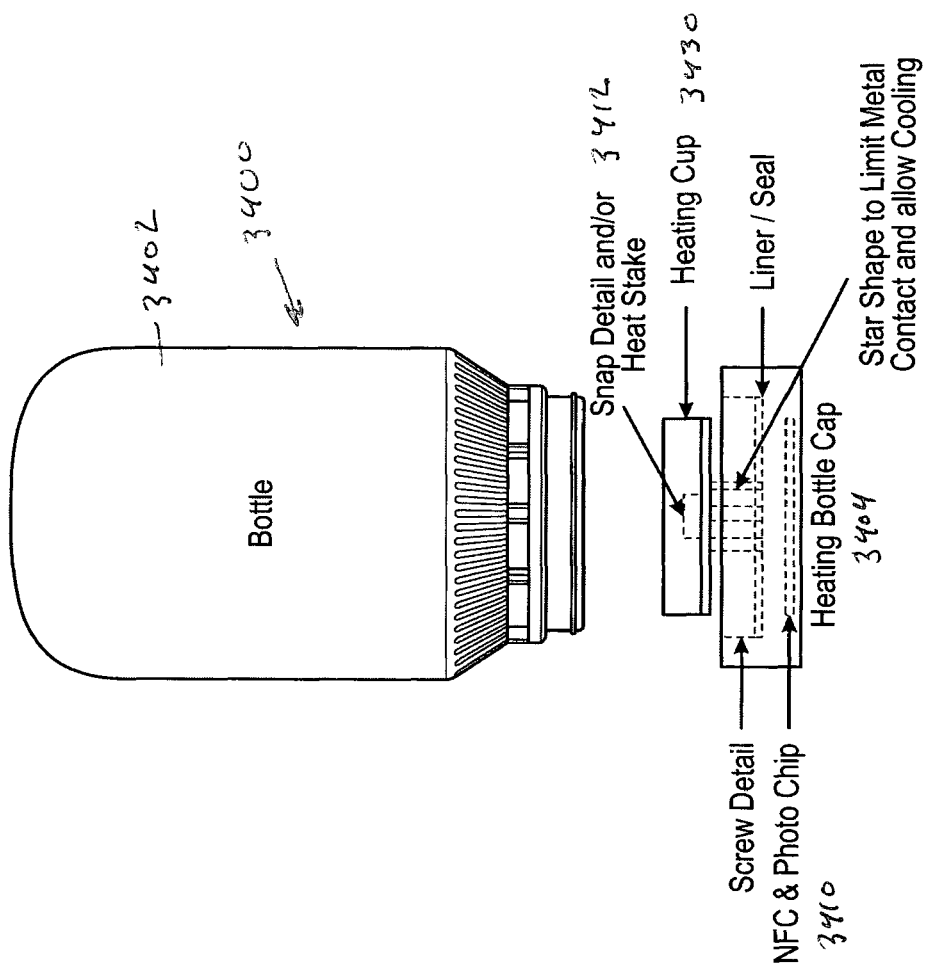
FIG. 34 illustrates an alternative package that includes a heating cap that may be removably attached to a bottle.

FIG. 34 illustrates an exploded view of an alternative package 3400 that includes a screw or snap on heating cap 3404 with an embedded NFC or LEM 3410. A heating cup 3430 may be secured to a post or stake 3412 projecting from the cap bottom.

Figure 35:
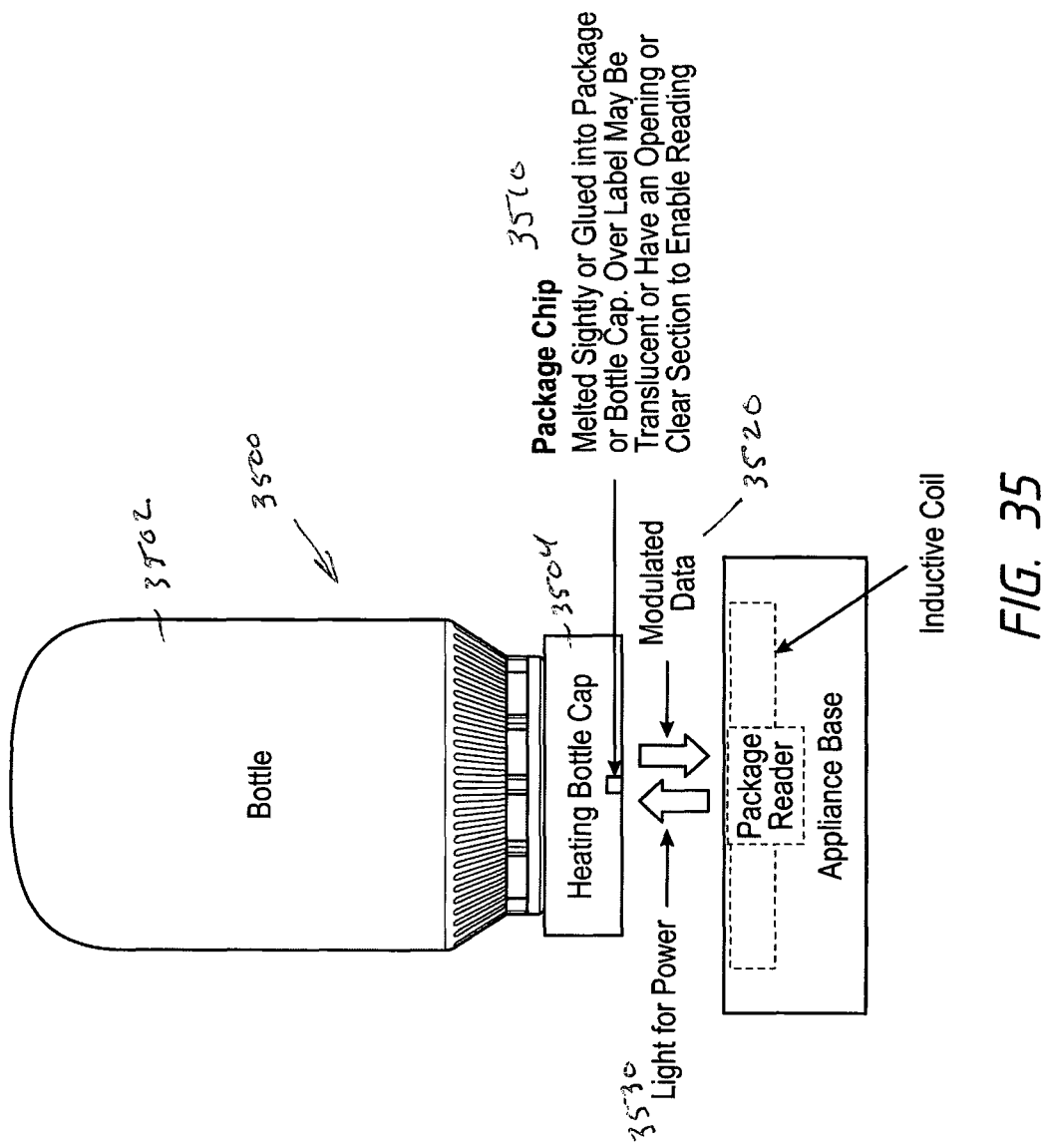
FIG. 35 illustrates an exploded view of an alternative package that includes a P-chip.

FIG. 35 illustrates an exploded view of an alternative package 3500 that includes a P-chip 3510 located in a central location on a heating bottle or jar cap 3504. A package reader in an appliance includes a light source for powering the package P-chip 3510 and potentially other components, such as sensors contained within the bottle cap 3504. The P-chip may generate a modulated data signal 3520 in response to energization by the package reader light source, which may be a laser. The package chip or P-chip 3510 may be attached to the bottle cap 3504 using a melt process or using adhesive. In order to provide for light energization and line-of-sight, an over label may be provided on the cap and may include a transparent, translucent or clear area, or a cutout or recess to enable energization of the P-chip or LEM with the light source. The appliance base may include a recess for receiving the bottle cap to ensure alignment of the P-chip 3510 with the reader light source.

Figure 36:
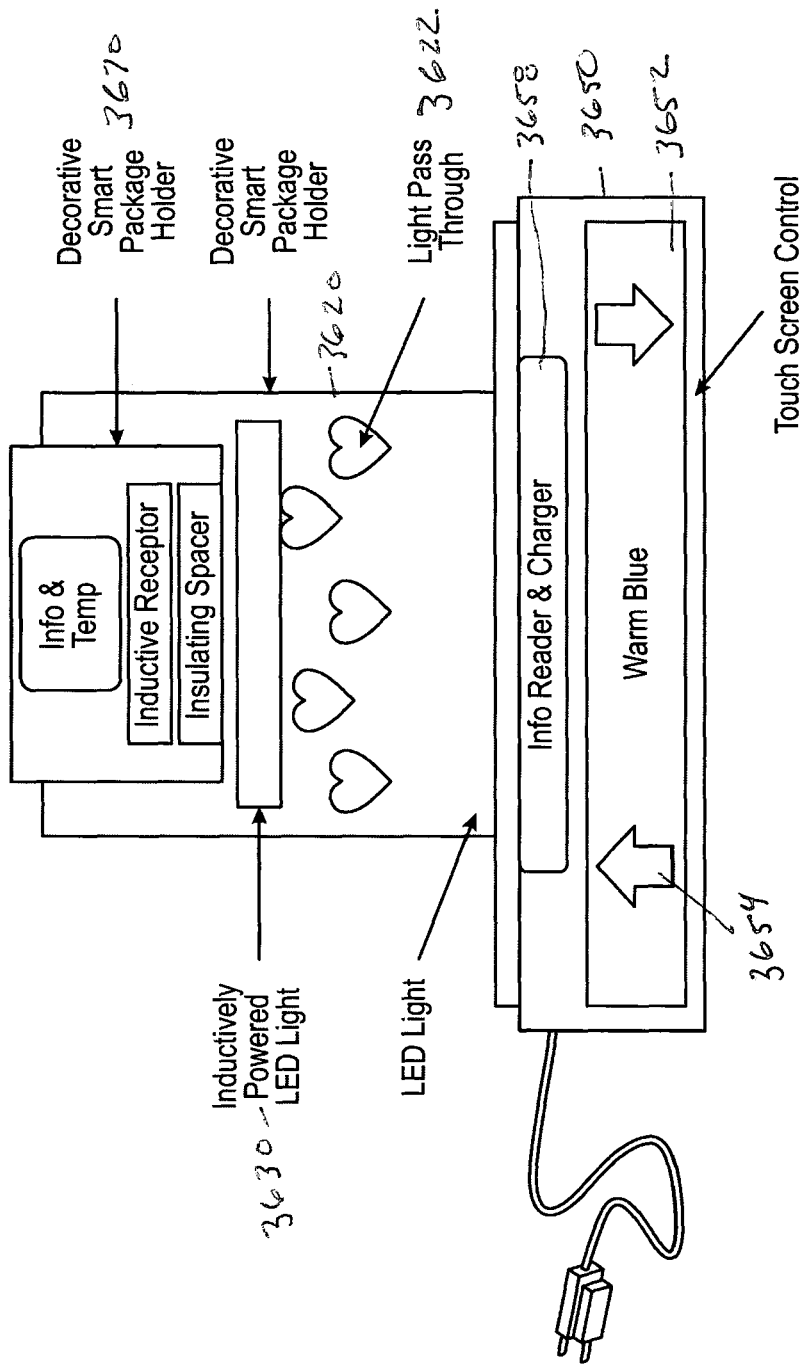
FIG. 36 illustrates a smart package and appliance with a decorative lighting feature.

FIG. 36 illustrates a smart package and appliance with a decorative lighting feature. The smart package 3670 may be a wax melt or aromatic package as described above. A decorative package holder 3620 may be included with the appliance 3650. An inductively powered LED light 3630 may be included in the package, which may have an opaque coating with light pass thru areas 3622 for creating a decorative effect. The appliance 3650 may include a reader and an inductive charger/heating element 3658. The appliance 3650 may also include a touch screen control 3652 for permitting a user to adjust settings such as temperature or lighting effects. The touch screen control may include a display of a current setting and a display of adjustment controls 3654.

Figure 37:
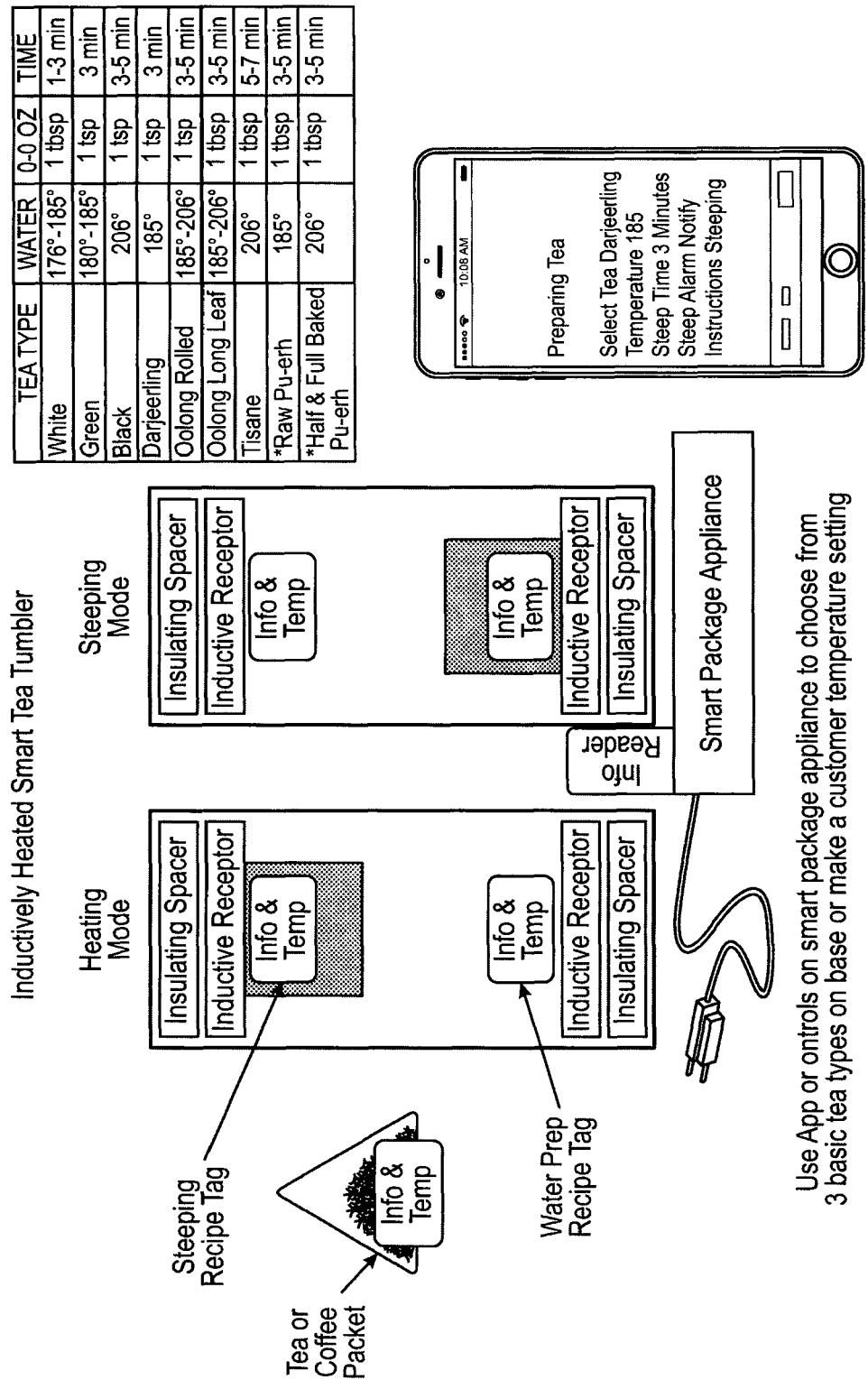
FIG. 37 illustrates further details of a tea/coffee tumbler as described above with reference to FIGS. 5 and 6.

FIG. 37 illustrates further details of a tea/coffee tumbler as described above with reference to FIGS. 5 and 6.

Figure 38:
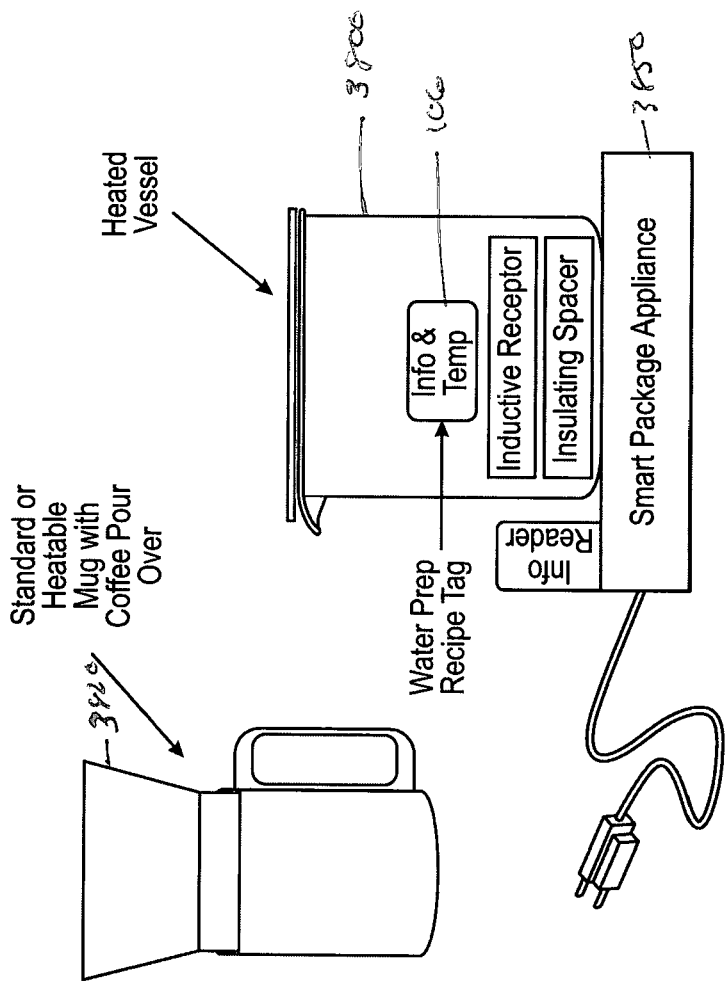
FIG. 38 illustrates an inductively heated vessel with a coffee pour over kit.

FIG. 38 illustrates an inductively heated vessel 3800 with a coffee pour over kit 3820. The heated vessel may be provided with a PICM 106 including a temperature sensor, inductive receptor and insulating spacer. A smart package appliance 3850 may provide smart heating.

Figure 39:
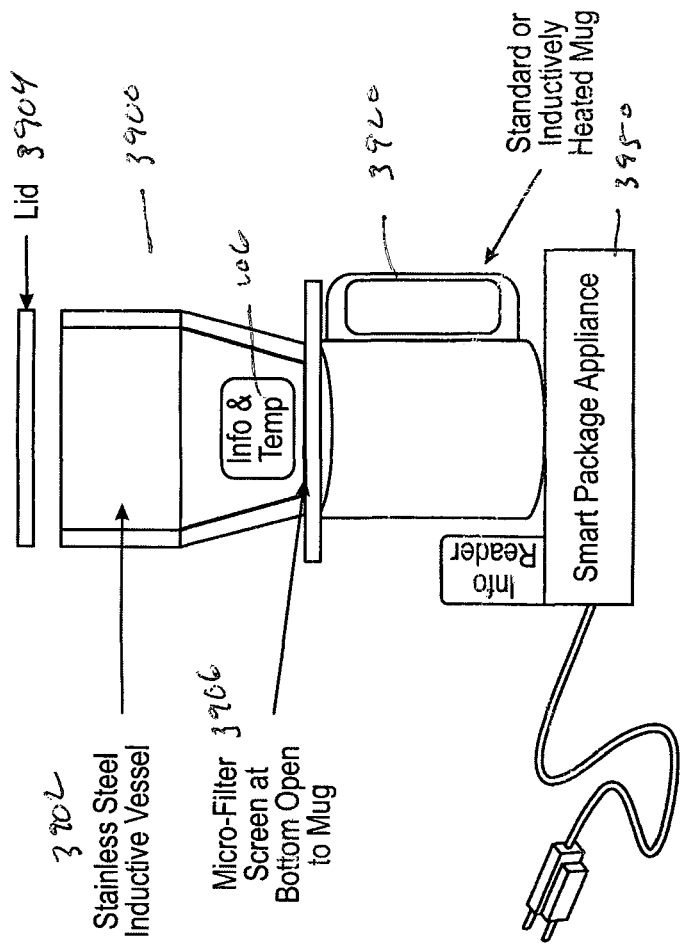
FIG. 39 illustrates an example package configuration in the form of a self-contained inductively heated coffee pour over kit.

FIG. 39 illustrates an example package configuration in the form of a self-contained inductively heated coffee pour over kit 3900, which may include a stainless steel inductive vessel 3902, a lid 3904 and a micro-filter screen 3906 as well as a PICM 106 for smart heating of the kit 3900 by an appliance 3950. A standard vessel (i.e., non-heating) may be used with the kit 3920.

Figure 40:
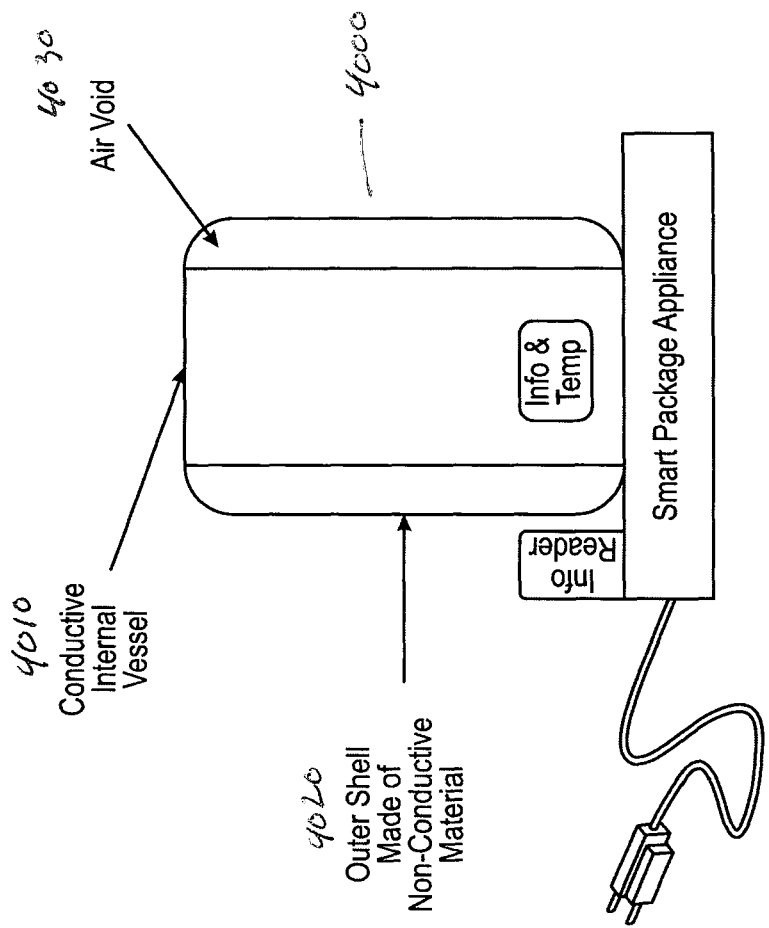
FIG. 40 illustrates an example package configuration in the form of a container having a conductive internal vessel that is insulated from an outer shell by an air void.

FIG. 40 illustrates an example package configuration in the form of a container 4000 having a conductive internal vessel 4010 that is insulated from an outer shell 4020 by an air void 4030. The outer shell 4020 may be made of a non-conductive material. A PICM 106 may be provided in contact with the internal vessel 4010.

Figure 41:
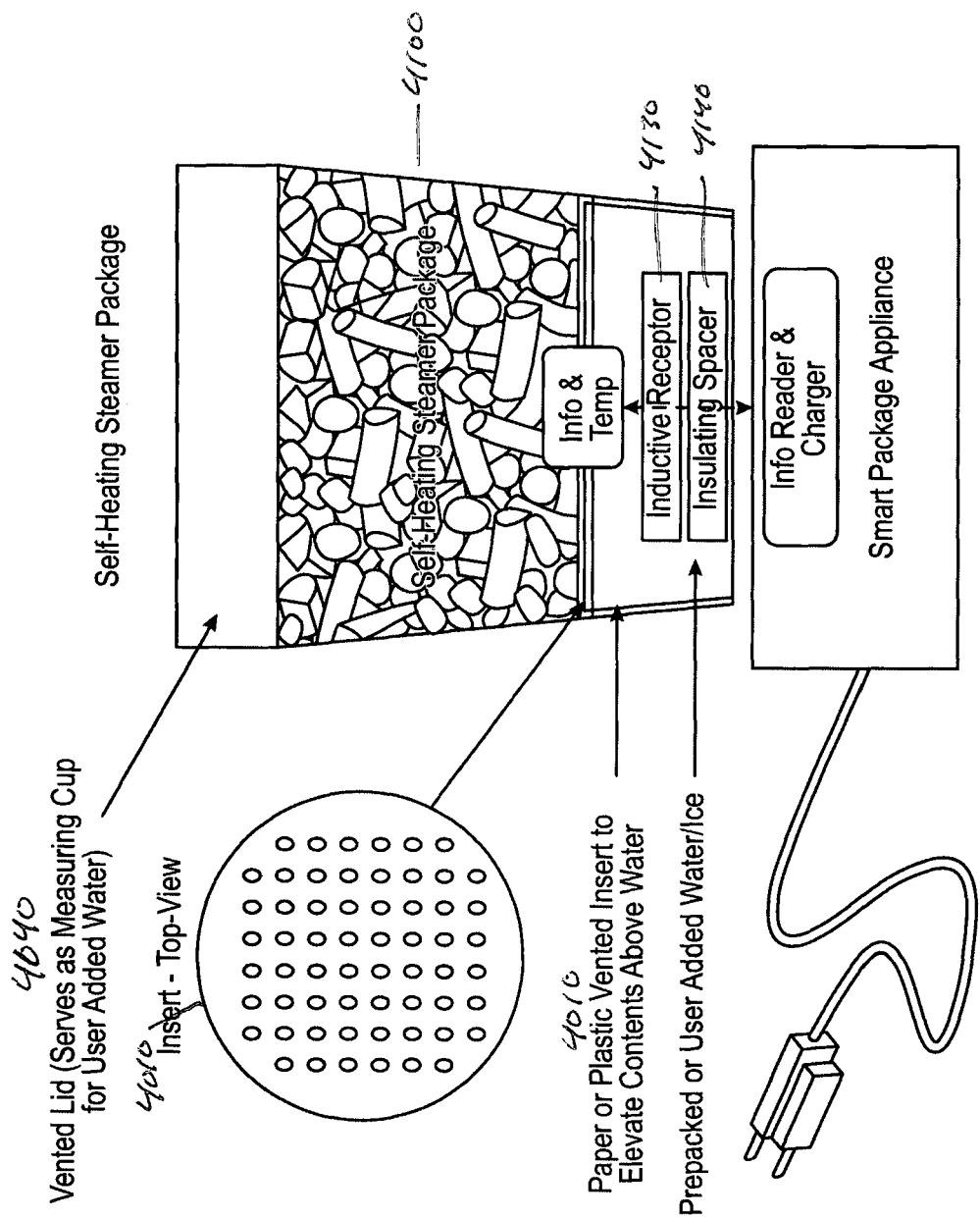
FIG. 41 illustrates a package configuration for steaming food products.

FIG. 41 illustrates a package configuration for steaming food products. The package 4100 may include an offset metal insert for better thermodynamics in a package that maintains a liquid space. The insert may be a stamped element with tabs projecting from the sides for supporting the insert in a position above a bottom panel or surface of a package bottom and above a receptor 4130 and insulating spacer 4140. The insert supports (feet) have limited contact with the food and are submerged in the liquid, which limits and stabilizes the thermal characteristics and exposure of the package. The insert functions as a heat source when inductively energized and it remains in contact with or submerged in liquid during a heating operation. Moreover, the insert is for the most part isolated from and not in thermal contact with the packaging materials, which prevents overheating of the package materials during a heating operation. A vented lid 4040 may also serve as a measuring cup for user addition of water.

Figure 42:
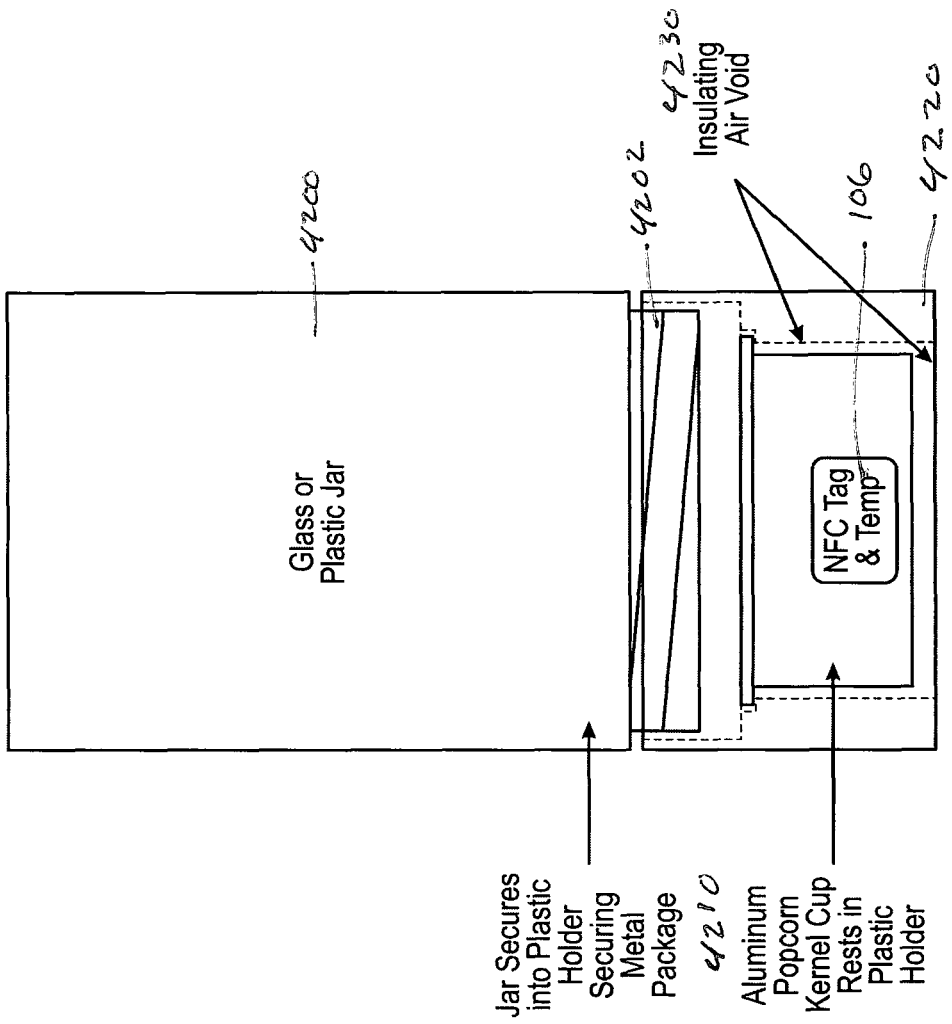
FIG. 42 illustrates an inductive popcorn popper having an inverted glass or plastic jar with a threaded neck.

FIG. 42 illustrates an inductive popcorn popper 4200 having an inverted glass or plastic jar with a threaded neck 4202. An aluminum popcorn kernel cup 4210 may be provided in a threaded cap 4220 and configured to provide an air gap 4230 between the cap and cup 4210. The cup 4210 and may be provided with a PICM 106 for smart heating of the cup.

Figure 43:
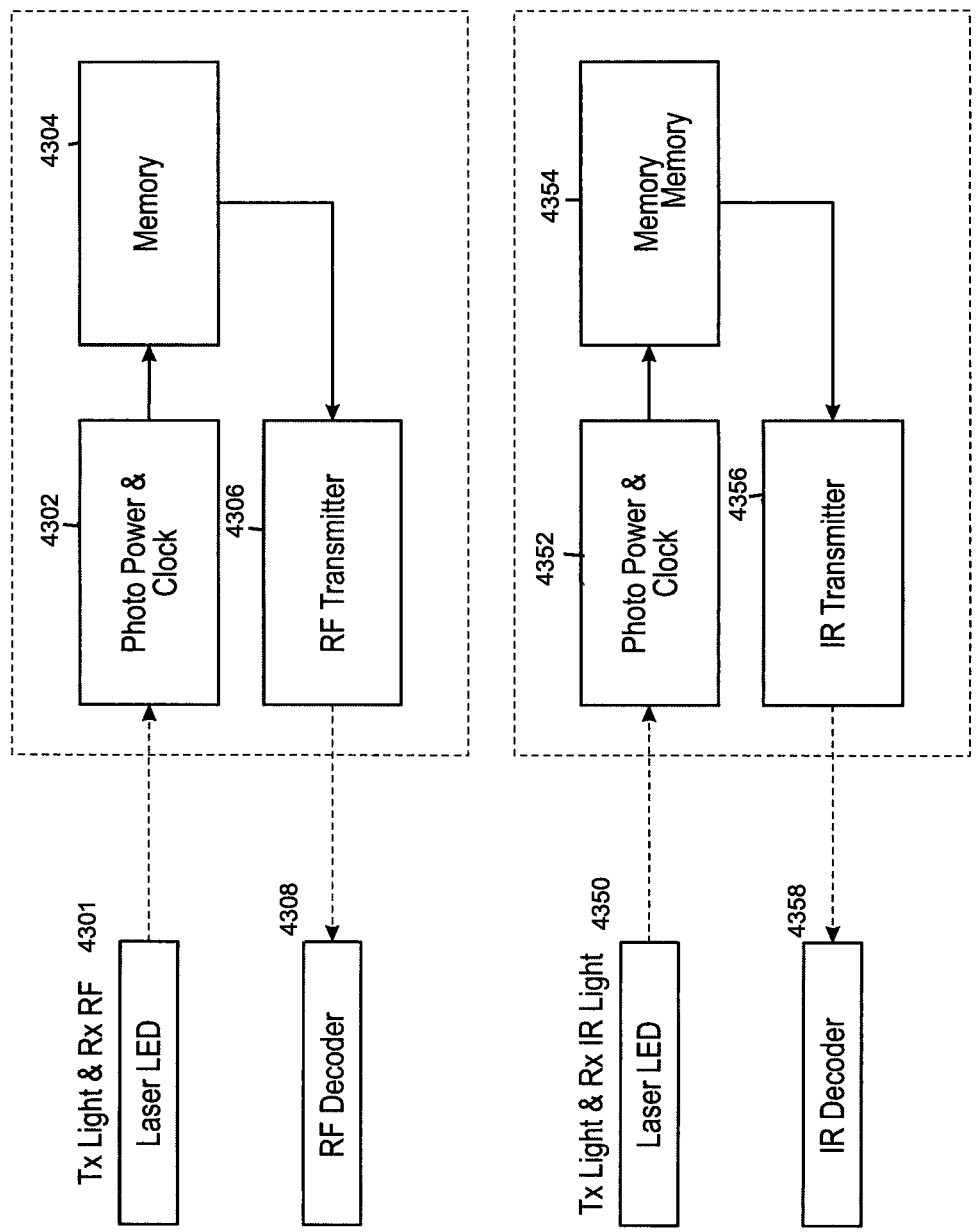
FIG. 43 schematically illustrates components of a light-powered microtransponder suitable for use with packaging described herein.

FIG. 43 schematically illustrates components of a light-powered microtransponder suitable for use with packaging described herein. Laser LED light 4301 may be transmitted from a reader to the photo powered array 4302 which communicates with memory 4304. An RF transmitter 4306 may send signals to the reader based on information stored in the memory 2020. Transmission of signals may also be by infrared in line-of-sight applications, as illustrated in the lower figure in FIG. 21 were an infrared light 4350 may energize photo power and clock component 4352 which communicates with memory 4354. An infrared transmitter 4356 sends encoded infrared data signals to infrared decoder 4358.

Figure 44:
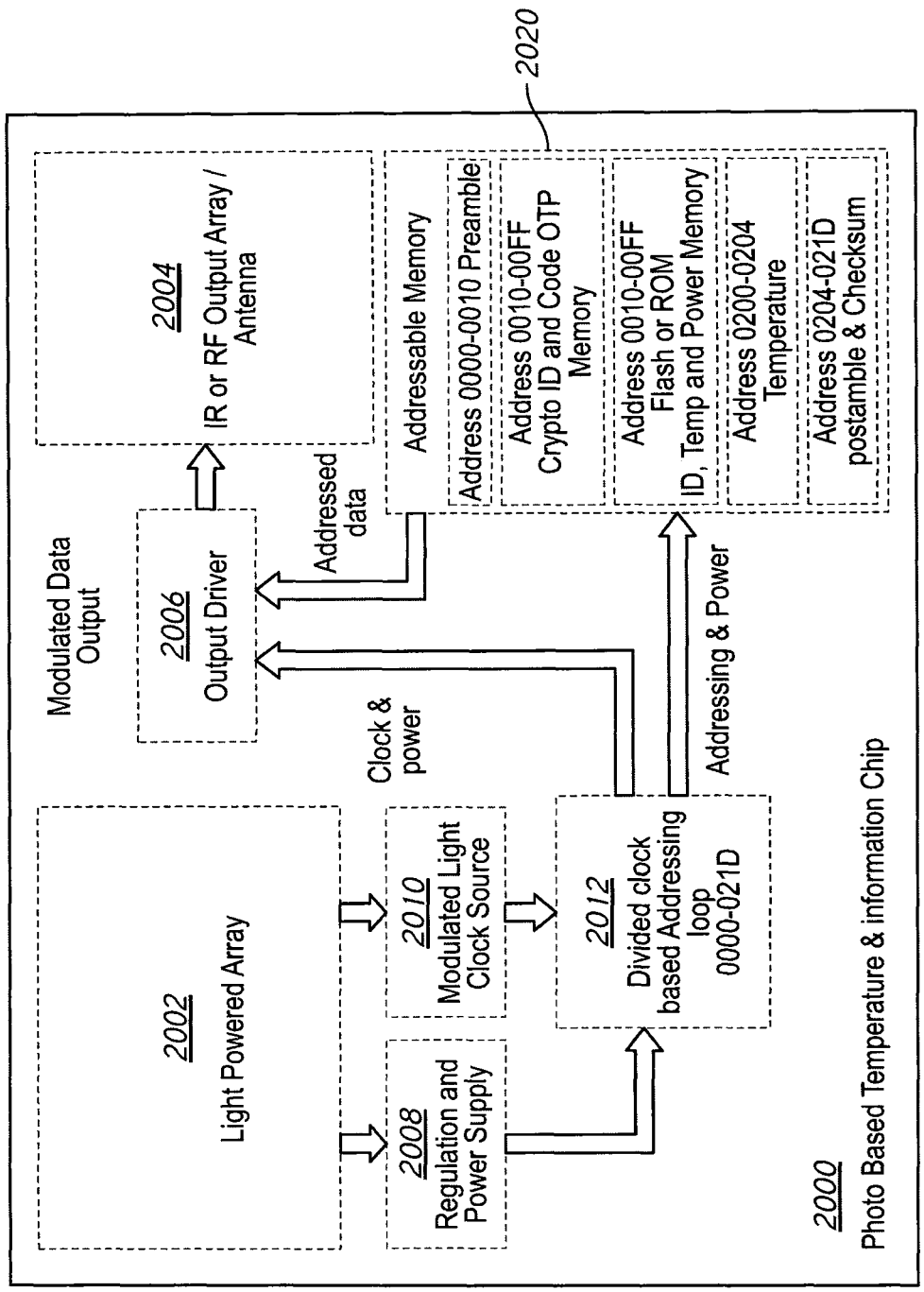
FIG. 44 illustrates components of a photo- or light-powered microtransponder suitable for supporting a PICM according to aspects of the disclosure.

FIG. 44 illustrates components of a photo- or light-powered microtransponder 2000 suitable for supporting a PICM according to aspects of the disclosure. A light powered array 2002 creates power from received light. A regulation and power supply 2008 may include storage for electrical energy generated by the light powered array 2002 as well as voltage regulation to power other components. A modulated light clock source 2010 may provide a clocking signal to a divided clock-based addressing loop 2012, which also receives power from the regulation and power supply 2008. Addressing loop 210 provides a signal to an output driver 2006 which drives an infrared or radio frequency output array antenna to communicate information to a reader. A storage 2020 includes layers of addressable memory that may store data including a cryptographic identifier, temperature and power information and other information.

According to an aspect of the disclosure, example appliances may provide authentication, validation and safety operations on packaging based on the interaction between the appliance and the packaging. Validation refers to ensuring the integrity of a package and its contents, and safety related characteristics, for example, ensuring that no tampering or manufacturing defects are present with regard to a product or product package. Authentication of a package refers to an operation of ensuring that a package is an authentic product that has originated from a trusted source rather than a counterfeit product or that a product may be used with a given appliance. Authentication and validation may involve the use of encrypted information to ensure date integrity and mitigate safety risks. Safety operations may include ensuring that package or product temperature thresholds are not exceeded during cooking operations or during consumption or handling.

Figure 45:
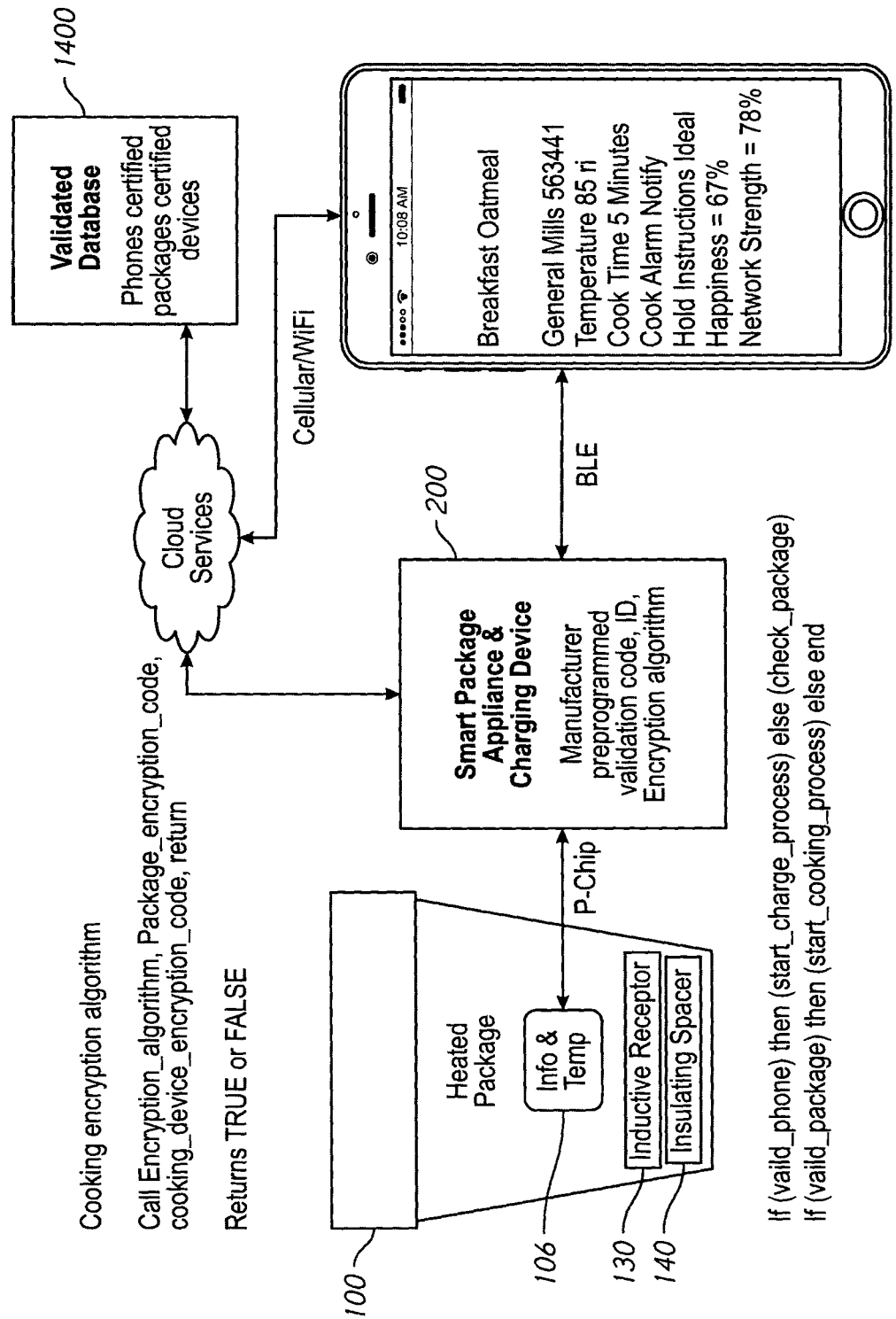
FIG. 45 is a schematic diagram showing the interaction between example system components to achieve validation, authentication and safety.

FIG. 45 is a schematic diagram showing the interaction between example system components to achieve validation, authentication and safety. As explained above, with reference to FIG. 1, a package 100 may have a unique identification information stored in PICM 106, which may include a P-chip, i.e., light powered microtransponder or RFID tag for communicating the unique identifier and other information to the appliance 200. Appliance 200 may include information regarding the appliance manufacturer, a preprogrammed validation code, an appliance unique identifier, and an encryption algorithm for encrypting data. A smartphone or other mobile device may have an application and interface that may also utilize a unique identifier identifying the device and/or user. These unique identifiers may be utilized along with cryptographic algorithm to send encrypted test authentication requests via the cloud to a validation database 1400. The appliance control system may utilize the unique identifiers or a portion thereof to request and receive approval tokens from the validation database 1400. If a positive response is returned from the validation database, the appliance can confirm that a valid package is present. The key element is the certified database that mirrors the unique identifiers. The appliance make implement package validation and authentication via suitable function calls under an operating system governing operation of the microcontroller. For example, a function call to an encryption algorithm may include a package encryption code and a heating appliance (cooking device) encryption code. Logic statements in the algorithm can then incorporate the function call results (i.e., if valid_phone then; if valid_package then) to condition operations based on package authentication and validity. Validation processes may also provide that only predetermined packages may be used with a given appliance. This validation scheme assures that only approved packaging is used with approved appliances and thereby increases safety.

According to an aspect of the disclosure, package validation processes may utilize TLP data, such as that of FIG. 3 or in Table A above to validate package integrity and safety. As discussed above, the profile used in table A may be generated in advance by a calibrated test system used by a package developer, manufacturer or packaging provider. Materials may be tested and resulting parameters may be stored in the database along with measured field data to determine the allowable variations within the field. Safety thresholds may be saved based on testing and flash point data along with safety margins for each material used. The larger database of test and calibration information is designed to allow the material thresholds to be modified based on field data for safety and operational performance tracking. Having multiple data points like surface temperature, package temperature and power may support tracking of foreign objects and user induced failures in the field. This data can then be used to revise thresholds and allow unsafe conditions to be recognized even more accurately for enhanced safety. This same validation and authentication method may be used for package expiration dates and other information.

Figure 46:
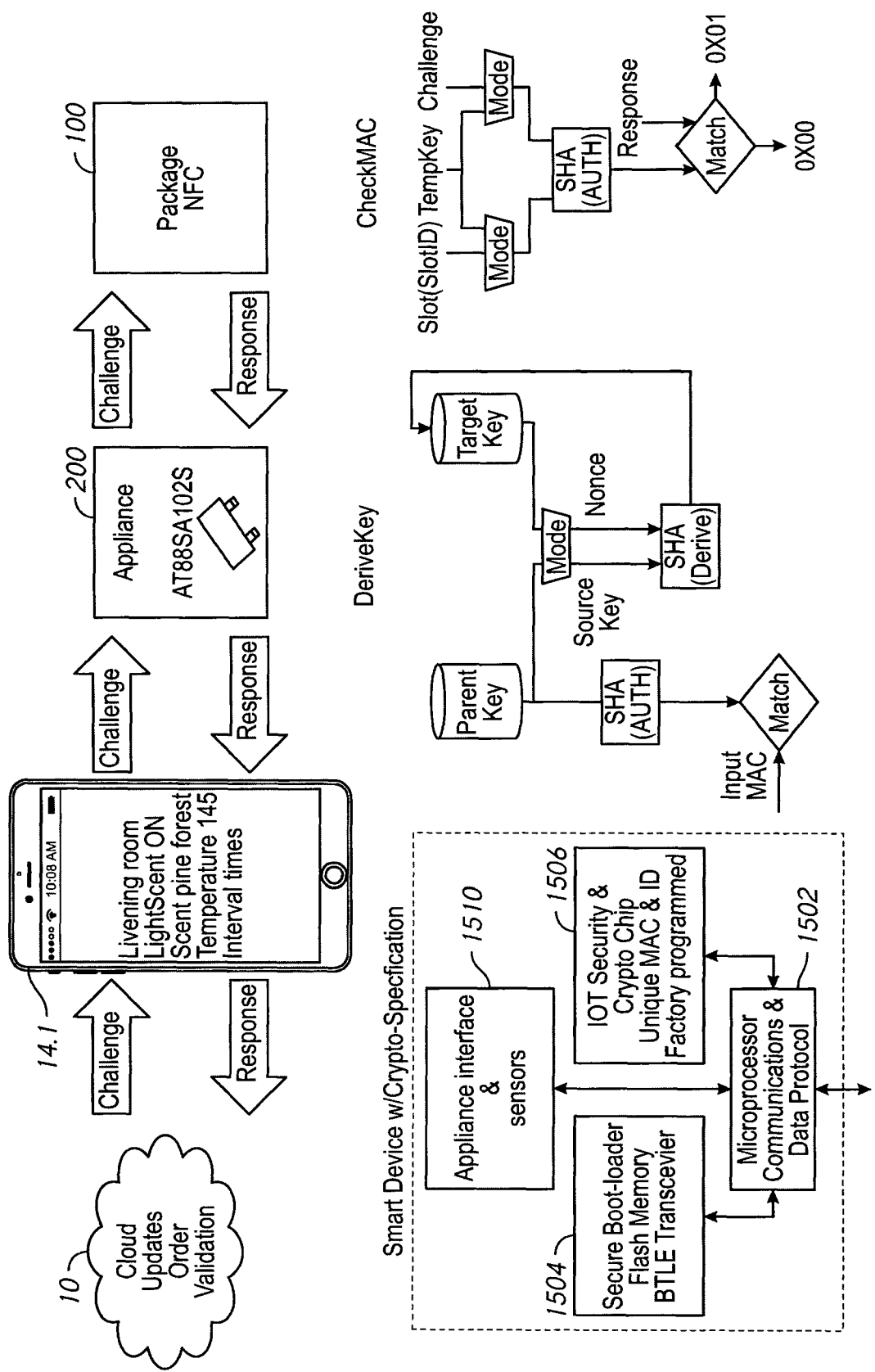
FIG. 46 shows an example security solution and chain of communication applicable to validation and authentication data.

FIG. 46 shows an example security solution and chain of communication applicable to validation and authentication data, including anti-counterfeiting and security, as well as example hardware to support an Internet-of-things (JOT) supported security solution. Security challenges and responses may be implemented between each component in the chain of communication including the package 100, appliance 200, smart device 14.1 and the cloud or WAN 10. The smart device 14.1 may include a crypt-specification implementation wherein a microprocessor 1502, which may be a component of the microcontroller 282 in FIG. 1, in addition to supporting an appliance interface and sensors 1510 may electronically communicate with a secure bootloader flash memory transceiver 1504 and an IOT security and crypto chip 1506 to implement crypto security. Authentication may be based on devices proving their identities to each other. Each device may include a unique device identity (UID) which may be a 48-bit number. The authentication proof is based on the demonstration of the knowledge of a secret code associated with the UID. Cryptographic techniques are used to keep that information secret but verifiable within the code. The AKB based authentication protocol uses techniques called broadcast encryption utilizing a trusted management source of the keys. This provides package suppliers and devices suppliers inclusion or exclusion of products. The encryption may be updated or changed on a based on being hacked or on timely updates by updating appliance firmware. Devices and packages combine the UID and AKB and secret keys to provide two shared secret keys. The devices verify the shared keys using the network challenge/response protocol. The AKB encoding includes Version, Type of AKB, EAK List Start—the byte number in the AKB from where the first encrypted AK is stored, AK Verification Data—the 128-bit value 0x3212445F AF345622BF 44xxxxxx xxxxxxxx encrypted with the Authentication Key encoded in the AKB. Tag Data Stream tags defining the tree stored and the EAK List containing the authentication keys contained in the AKB tree. The unique identifiers coded within the chip or encrypted within the code of the microprocessor are used to generate the test question and an TRUE or FALSE response is used to validate the authentication. DeriveKey shows the crypto authentication process using the unique key and the target key reference for a TRUE/FALSE response.

The smart device 14.1 and other devices, including the appliance 200 and package 100 may utilize Media Access Controller (MAC) addresses for each interface to the network. These may be utilized in validation with function calls, such as the illustrated key derivation call "DeriveKey", which may derive one or more secret keys from a secret value such as a master key, a password, or a passphrase. A CheckMAC function call may be used to validate an encrypted MAC address. Still referring to FIG. 15, an Atmel AT88SA102S chip may be used for crypto generation and unique appliance identifier. The smart appliance uses this device as the unique identifier and generates the challenge request encrypted for response.

Figure 47:
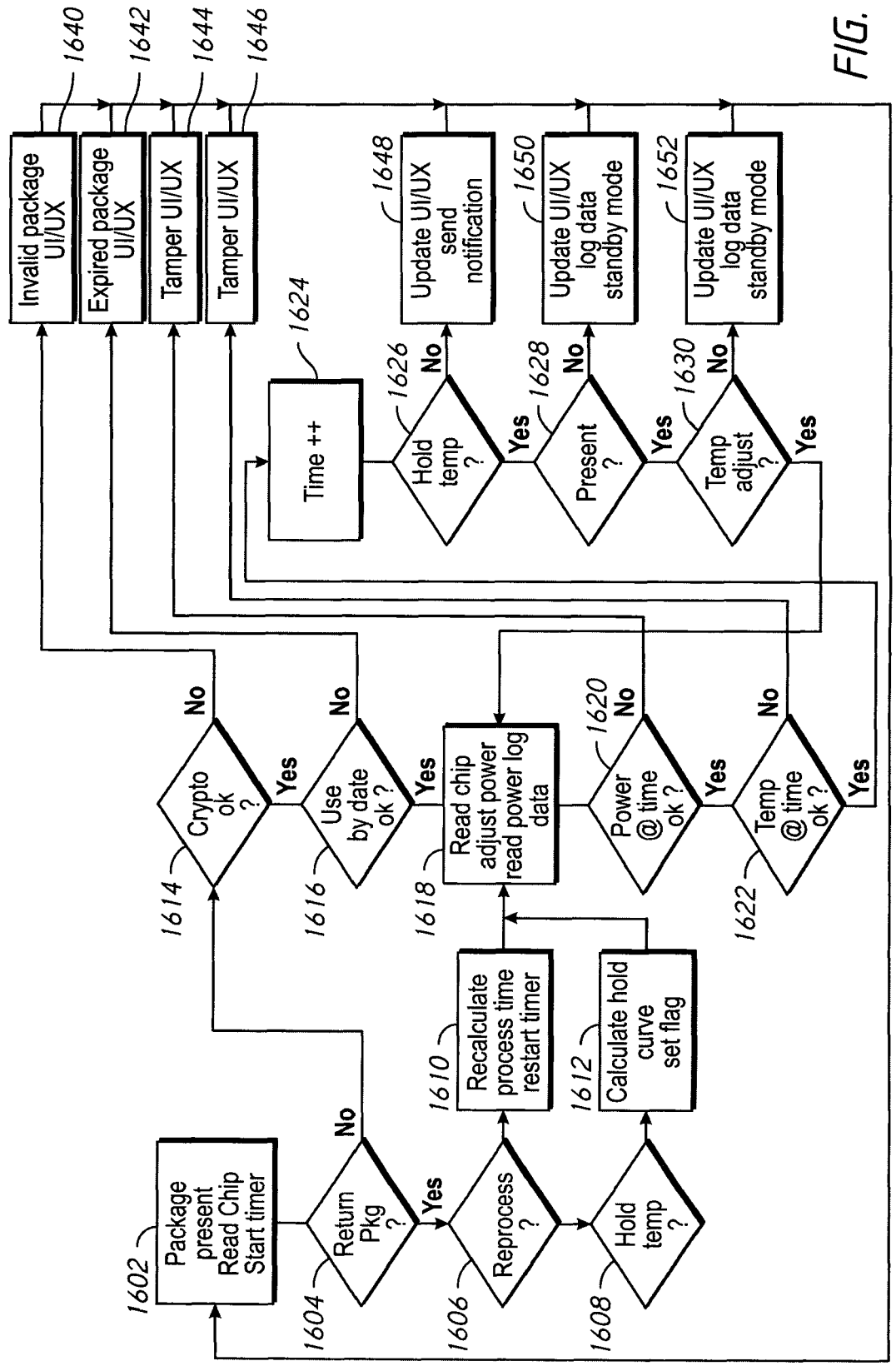
FIG. 47 is an example logic flow for validation and authentication by an example appliance.

FIG. 47 is an example logic flow for validation and authentication by an example appliance. According to aspects of the disclosure, an example process for identifying the package and validating the package may utilize the package chip, the package and potentially factory settings of an appliance and/or package for authentication. An example process may begin at step 1602 where a package is detected as present, an NFC tag is read and a timer is started. At step 1604, the system checks to see if the package has been heated before, for example, if a stirring operation was performed on a heated package. If the package is detected as having been returned, the process may determine at step 1606 if a reprocessing step is needed. If so, at 1608 a determination is made as to whether a hold temperature has been specified. If so, the process at step 1612 calculates a hold curve and sets a hold temperature flag then proceeds to step 1618. If at step 1606 a determination is made that no reprocessing is needed, at step 1610 the system recalculates a process time and resets a process timer, then proceeds to step 1618 where the PICM is read and the power is adjusted and power data is logged.

If at step 1604 a determination is made that the package is not a returned package, the system proceeds to step 1614 where a cryptographic challenge is undertaken. If the package fails this test, an invalid package indicator is expressed to the user through a user interface at step 1640. If at step 1614 the cryptographic challenge is passed, the process may proceed to an expiration date check at 1616 where expiration data related to the package is compared to a current date. If the package fails this test, an expired package indicator is expressed through the user interface at step 1642. If at step 1616 the package passes the expiration date test, then a heating operation is initiated at step 1618 where the PICM is read and the heating power requirements are determined. At step 1620, as a heating operation is initiated, the system check the actual monitored power and time against the calibrated data stored in a TLP for the package, as described above. If at step 1620 the package power vs. time correlation is different than what is stored within the TLP, allowing for variances for offsets, for example, the process goes to step 1644 to indicate that the package has been tampered with or otherwise lacks an expected integrity. This indication may be through the user interface. If at step 1620, the package power vs. time correlation is acceptable compared to the TLP data, the process goes to step 1622 where a temperature vs. time data is monitored. If this data does not comply with the temperature vs. time data represented in the TLP, the process goes to step 1646 to indicate package tampering or lacking structural integrity.

If at step 1622 the package temperature vs. time actual data match the TLP, within expected variances, a heating operational sequence is executed. At step 1624 the heating time is updated and at step 1626 a hold temperature determination is made. The UI/UX for operating parameters and is seen as 1626 holding temperature or exit, 1628 in the package not being removed and in 1630 looking for temp adjustments and commands cycling back to the reading of the package temperature 1618. The update UI/UX for completed or stopping is seen in 1648 and the UI/UX update for removing the package is seen in 1650 the logged information is used to set the flag for 1612 when the package is returned. 1652 indicates either an error mode like temperature cannot be reached or the exit mode as in the end of the process and updates the UI/UX.

Although the present invention has been shown and described in detail the same is to be taken by way of example only and not by way of limitation. Numerous changes can be made to the embodiments shown without departing from the scope of the invention. The present invention may be further modified within the spirit and scope of this disclosure. The application is, therefore, intended to cover any variations, uses, or adaptations of the invention using its general principles. Further, this application is intended to cover such departures from the present disclosure as come within known or customary practice in the art to which this invention pertains.

The invention claimed is:

1. A smart package for use with a smart appliance for intelligently controlling heating of the smart package, the smart package comprising:
   a container for containing known thermodynamic contents to be heated;
   a package intelligence and communication module for storing and communicating package content related data, the package intelligence and communication module including:
   (a) a storage for storing an identifier unique to the package;
   (b) and a transponder for communicating the identifier to a reader on the smart appliance;
   the package content related data including a thermodynamic load profile representing a control curve of a thermodynamic response of the package and contents to dynamic heating energy over a heating operation sequence;
   a temperature sensor for sensing the temperature of the product during a heating operation;
   wherein the thermodynamic load profile includes data representing a heating operation with a plurality of different heating operation steps, wherein the data representing the heating operation includes expected temperature measurements and expected power characteristics for each of the plurality of different heating operation steps; and
   wherein the thermodynamic load profile includes an ambient temperature-based offset.

2. The smart package of claim 1, wherein the thermodynamic load profile includes data correlating an expected internal temperature with power transmitted from a smart appliance over the heating operation sequence.

3. The smart package of claim 1 wherein the package related pre-measured thermodynamics has been calibrated and measured and the thermodynamics related information is included electronically on the package.

4. The smart package of claim 1, wherein the package intelligence and communication module is located on an exterior surface of the package.

5. The smart package of claim 1, wherein the package is a foil package.

6. The smart package of claim 1, wherein the package is a steamer package having an inductive receptor disposed in the bottom of the package beneath a vented insert for permitting steam to pass from the bottom of the package to an upper section of the package containing a product to be steamed without the product touching the receptor.

7. The smart package of claim 1, wherein the package includes a base having a support for supporting an inductive heating plate, the base including the package intelligence and communication module therein, the base including a threaded portion and a bottle having a threaded neck for engaging the base threaded portion.

8. The smart package of claim 1, wherein the base is circular and wherein the package intelligence and communication module comprises a light-powered microtransponder disposed at the center of the circular base.

9. A smart package for use with a smart appliance for intelligently controlling heating of the smart package, the smart package comprising:
   a container for containing known thermodynamic contents to be heated;
   a package intelligence and communication module for storing and communicating package content related data, the package intelligence and communication module including:
   (a) a storage for storing an identifier unique to the package;

(b) and a transponder for communicating the identifier to a reader on the smart appliance;

the package content related data including a thermodynamic load profile representing a control curve of a thermodynamic response of the package and contents to dynamic heating energy over a heating operation sequence;

a temperature sensor for sensing the temperature of the product during a heating operation;

wherein the thermodynamic load profile includes data representing a heating operation with a plurality of different heating operation steps, wherein the data representing the heating operation includes expected temperature measurements and expected power characteristics for each of the plurality of different heating operation steps; and wherein the thermodynamic load profile includes an altitude-based offset.

10. A method using a smart package in a heating operation, the smart package comprising a container for containing contents to be heated; a package intelligence and communication module for storing and communicating package related and package content related data, the package intelligence and communication module including (a) a storage for storing an identifier unique to the package; and (b) a transponder for communicating the identifier to a reader on the smart appliance; the package and package content related data including a thermodynamic load profile representing the thermodynamic response of the package and contents to heating energy; and a temperature sensor for sensing the temperature of the product during a heating operation, the method comprising:

receiving energy with the transponder from a reader on a smart appliance;

retrieving the thermodynamic load profile in response to receiving the energy, the thermodynamic load profile representing a control curve of a thermodynamic response of the smart package and contents to dynamic heating energy over a heating operation sequence;

controlling a heating operation of the package based on the thermodynamic load profile;

wherein the thermodynamic load profile includes data representing a heating operation with a plurality of different heating operation steps, wherein the data representing the heating operation includes expected temperature measurements and expected power characteristics for each of the plurality of different heating operation steps; and wherein the thermodynamic load profile includes an ambient temperature-based offset.

11. The method of claim 10, further comprising the step of authenticating the product package.

12. The method of claim 10, wherein the step of receiving energy comprises receiving light energy.

13. The method of claim 10, further comprising the step of receiving information about the package contents from a remote data storage.

14. The method of claim 10, further comprising the step of sending package related information to a user device linked to the package.

15. The method of claim 10, wherein the thermodynamic load profile includes an altitude-based offset.

16. The method of claim 10, further comprising validating the package contents based on the retrieved thermodynamic load profile.

17. The smart package of claim 9, wherein the thermodynamic load profile includes data correlating an expected internal temperature with power transmitted from a smart appliance over the heating operation sequence.

18. The smart package of claim 9 wherein the package related pre-measured thermodynamics has been calibrated and measured and the thermodynamics related information is included electronically on the package.

* * * * *